(12) United States Patent
Minami et al.

(10) Patent No.: US 6,876,359 B2
(45) Date of Patent: * Apr. 5, 2005

(54) APPARATUS FOR PRODUCING EXPLODED VIEW AND ANIMATION OF ASSEMBLING, AND METHOD THEREOF

(75) Inventors: Shunsuke Minami, Brookline, MA (US); Tomotoshi Ishida, Hitachinaka (JP); Yoshiaki Shinotsuka, Hitachi (JP); Kunio Kumamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 570 days.

This patent is subject to a terminal disclaimer.

(21) Appl. No.: 09/812,834

(22) Filed: Mar. 21, 2001

(65) Prior Publication Data

US 2003/0142091 A1 Jul. 31, 2003

Related U.S. Application Data

(63) Continuation of application No. 08/825,245, filed on Mar. 27, 1997, now Pat. No. 6,295,063, which is a continuation of application No. 08/395,993, filed on Feb. 28, 1995, now Pat. No. 5,619,630.

(30) Foreign Application Priority Data

Feb. 28, 1994 (JP) ............................................. 6-29267
Oct. 6, 1994 (JP) ........................................... 6-242901

(51) Int. Cl.[7] ............................................ G06T 15/00
(52) U.S. Cl. ..................................... 345/419; 345/420
(58) Field of Search ............................... 345/419, 420, 345/422, 424, 427, 672, 679, 473, 474, 475, 964

(56) References Cited

U.S. PATENT DOCUMENTS 5,159,512 A   10/1992   Evans et al. ............ 395/133 X
5,430,837 A   7/1995   Matsuo ....................... 395/155
5,497,453 A * 3/1996   Megahed et al. ........... 345/422

FOREIGN PATENT DOCUMENTS

| JP | 61147375 | 7/1986 |
| JP | 2268369 | 2/1990 |
| JP | 5324779 | 12/1993 |
| JP | 7056971 | 3/1995 |

OTHER PUBLICATIONS

Amitava, "An efficient intersection algorithm for polyhedral cellular decompositions", 1991, ACM.*

Hansen et al., "A Model for n–Dimensional Boundary Topology", 1993, ACM.*

Kusiak "Concurrent Engineering Automation, Tools, and Techniques", John Wiley & Sons, Inc., 1993, pp. 177–205.

Foley, et al, "Computer Graphics Principles and Practice", Addision–Wesley Publishing Company, 1990, pp. 188, 376–381, 521.

"Automatic Generation of Exploded Views by Graph Transformation", by Riaz Mohammad and Ehud Kroll, Proceeding of 9th IEEE Conference [held in 1993] on Artificial Intelligence for Applications, pp. 368–374.

* cited by examiner

*Primary Examiner*—Almis R. Jankus
(74) *Attorney, Agent, or Firm*—Antonelli, Terry, Stout & Kraus, LLP

(57) ABSTRACT

An apparatus and method for producing an exploded view of an assembly. The invention includes an input unit, a geometrical data memory for storing geometrical data of parts composing an assembly, a memory for storing assembling process data composed of parts to be attached and attaching directions, a calculating unit for displaying the assembly to a display based on geometrical data, and apparatus for determining arranged positions of the parts in a disassembled state based on assembling process data and geometrical data, thereby producing an exploded view on the display corresponding to the arranged positions.

50 Claims, 77 Drawing Sheets

| STEP OF PROCEDURE | PART TO BE ATTACHED | ATTACHING DIRECTION |
|---|---|---|
| 1 | 701 | — |
| 2 | 702 | 706 |
| 3 | 703 | 706 |
| 4 | 704 | 707 |
| 5 | 705 | 707 |

| STEP OF PROCEDURE | PART TO BE ATTACHED | ATTACHING DIRECTION |
|---|---|---|
| 1 | 3601 | ---- |
| 2 | 3602 | (0, -1) |
| 3 | 3603 | (-1, 0) |
| 4 | 3604 | (0, -1) |

| STEP OF PROCEDURE | PART TO BE ATTACHED | ATTACHING DIRECTION |
|---|---|---|
| 1 | 3601 | ---- |
| 2 | 3602 | (0, -1) |
| 3 | 3603 | (0, -1) |
| 4 | 3604 | (0, -1) |

3901

| STEP OF PROCEDURE | PART TO BE ATTACHED | ATTACHING DIRECTION |
|---|---|---|
| 1 | 3601 | ---- |
| 2 | 3603 | (0, -1) ~ 4101 |
| 3 | 3602 | (0, -1) ~ 4102 |
| 4 | 3604 | (0, -1) |

FIG. 48
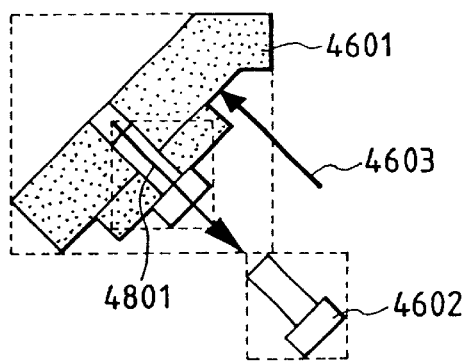
FIG. 49
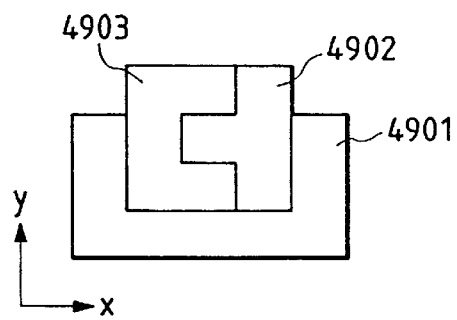
FIG. 50
| ORDER OF STEP | PART TO BE ATTACHED | ATTACHING DIRECTION | LEVEL OF PART |
|---|---|---|---|
| 1 | 4901 | | 1 |
| 2 | 4903 | | 2 |
| 3 | 4902 | -X | 2 |
| 4 | 4902 + 4903 | -Y | 1 |

FIG. 51
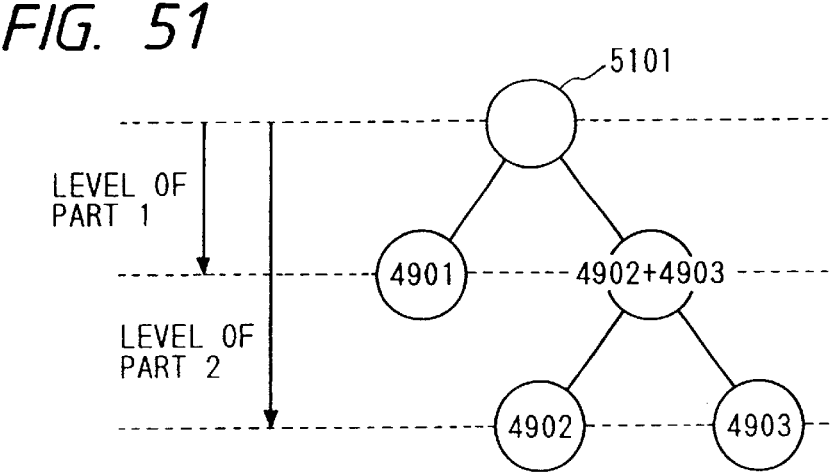
FIG. 53
| | INDEX | NUMBER OF PART | PART NAME LIST |
|---|---|---|---|
| | 1 | 2 | A, B |
| | 2 | 1 | C |
| | 3 | | |
| | 4 | | |
| | ⋮ | | |
5301: 2
5302: NUMBER OF PART
5303: PART NAME LIST
5304, 5305
FIG. 54
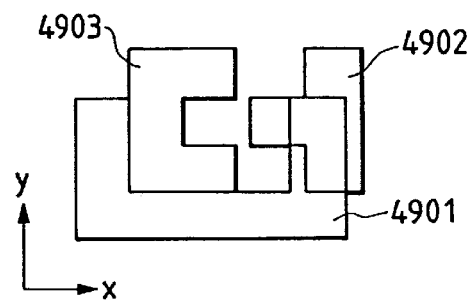

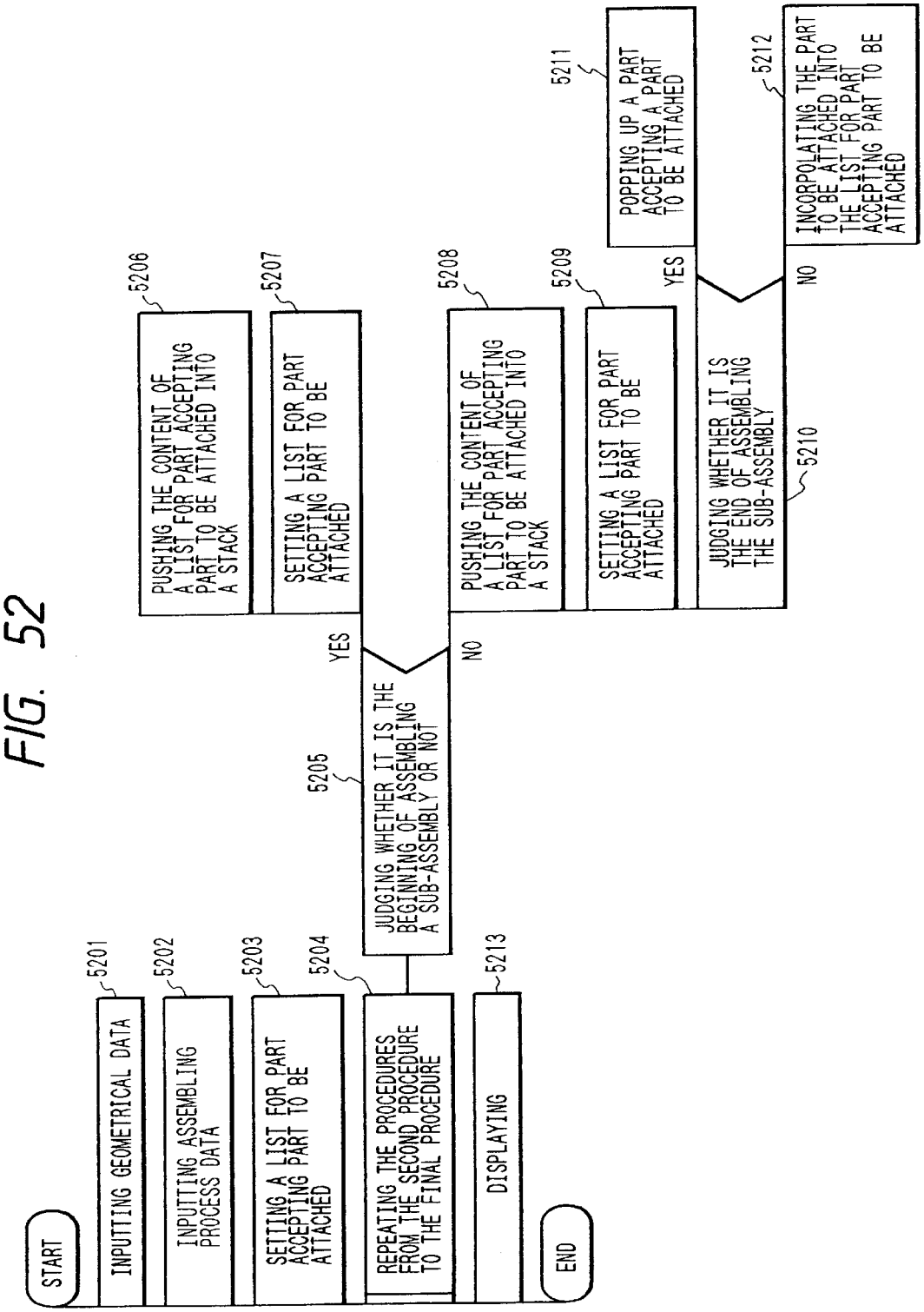

| ORDER OF STEP | PART TO BE ATTACHED | ATTACHING DIRECTION | SUB-ASSEMBLY FLAG |
|---|---|---|---|
| 1 | 4901 |  | 0 |
| 2 | 4904 | -Y | 1 |

| ORDER OF STEP | PART TO BE ATTACHED | ATTACHING DIRECTION | SUB-ASSEMBLY FLAG |
|---|---|---|---|
| 1 | 4903 |  | 0 |
| 2 | 4902 | -X | 0 |

| ORDER OF STEP | PART TO BE ATTACHED | ATTACHING DIRECTION |
|---|---|---|
| 1 | 5901 | -Y |
| 2 | 5902 | -Y |
| 3 | 5903 | -Y |
| 4 | 5904 | -Y |

| ORDER OF STEP | PART TO BE ATTACHED | ATTACHING DIRECTION |
|---|---|---|
| 1 | 5901 | -Y |
| 2 | 5902 | -Y |
| 3 | 5904 | -Y |
| 4 | 5903 | -Y |

| ORDER OF STEP | PART TO BE ATTACHED | ATTACHING DIRECTION |
|---|---|---|
| 1 | 5901 | -Y |
| 2 | 5903 | -Y |
| 3 | 5904 | -Y |
| 4 | 5902 | -Y |

| STEP OF PROCEDURE 7301 | PART TO BE ATTACHED 7302 | ATTACHING DIRECTION 7303 | |
|---|---|---|---|
| | | KIND 7304 | DIRECTION VECTOR 7305 |
| 7306 — 1 | 7201 | — | — |
| 7307 — 2 | 7202 | MOVING | 7206 |
| 7308 — 3 | 7203 | MOVING | 7206 |
| 7309 — 4 | 7204 | MOVING | 7207 |
| 7310 — 5 | 7205 | MOVING | 7208 |

| PART TO BE ATTACHED 7401 | KIND OF OPERATION 7402 | DIRECTION OF OPERATION 7403 | AMOUNT OF OPERATION 7404 | TIME STEP 7405 |
|---|---|---|---|---|
| 7406 — 7202 | STRAIGHT MOVING | −7206 | Dconst | 0.0, Tconst |
| 7407 — 7203 | STRAIGHT MOVING | −7206 | Dconst | 0.0, Tconst |
| 7408 — 7204 | STRAIGHT MOVING | −7207 | Dconst | 0.0, Tconst |
| 7409 — 7205 | STRAIGHT MOVING | −7208 | Dconst | 0.0, Tconst |

| PART TO BE ATTACHED 7401 | KIND OF OPERATION 7402 | DIRECTION OF OPERATION 7403 | AMOUNT OF OPERATION 7404 | TIME STEP 7405 |
|---|---|---|---|---|
| 7901 — 7202 | STRAIGHT MOVING | 7206 | Dconst | ST1=Tconst<br>ET1=Tconst+Tint |
| 7902 — 7203 | STRAIGHT MOVING | 7206 | Dconst | ST2=Tconst+Tint<br>ET2=Tconst+2*Tint |
| 7903 — 7204 | STRAIGHT MOVING | 7207 | Dconst | ST3=Tconst+2*Tint<br>ET3=Tconst+3*Tint |
| 7904 — 7205 | STRAIGHT MOVING | 7208 | Dconst | ST4=Tconst+3*Tint<br>ET4=Tconst+4*Tint |

| 8501 METHOD OF JOINTING | 8502 SPECIAL OPERATION |
|---|---|
| SCREW | REVOLUTION |
| WELDING | FREEZING |
| SOLDERING | FREEZING |
| ⋮ | ⋮ |

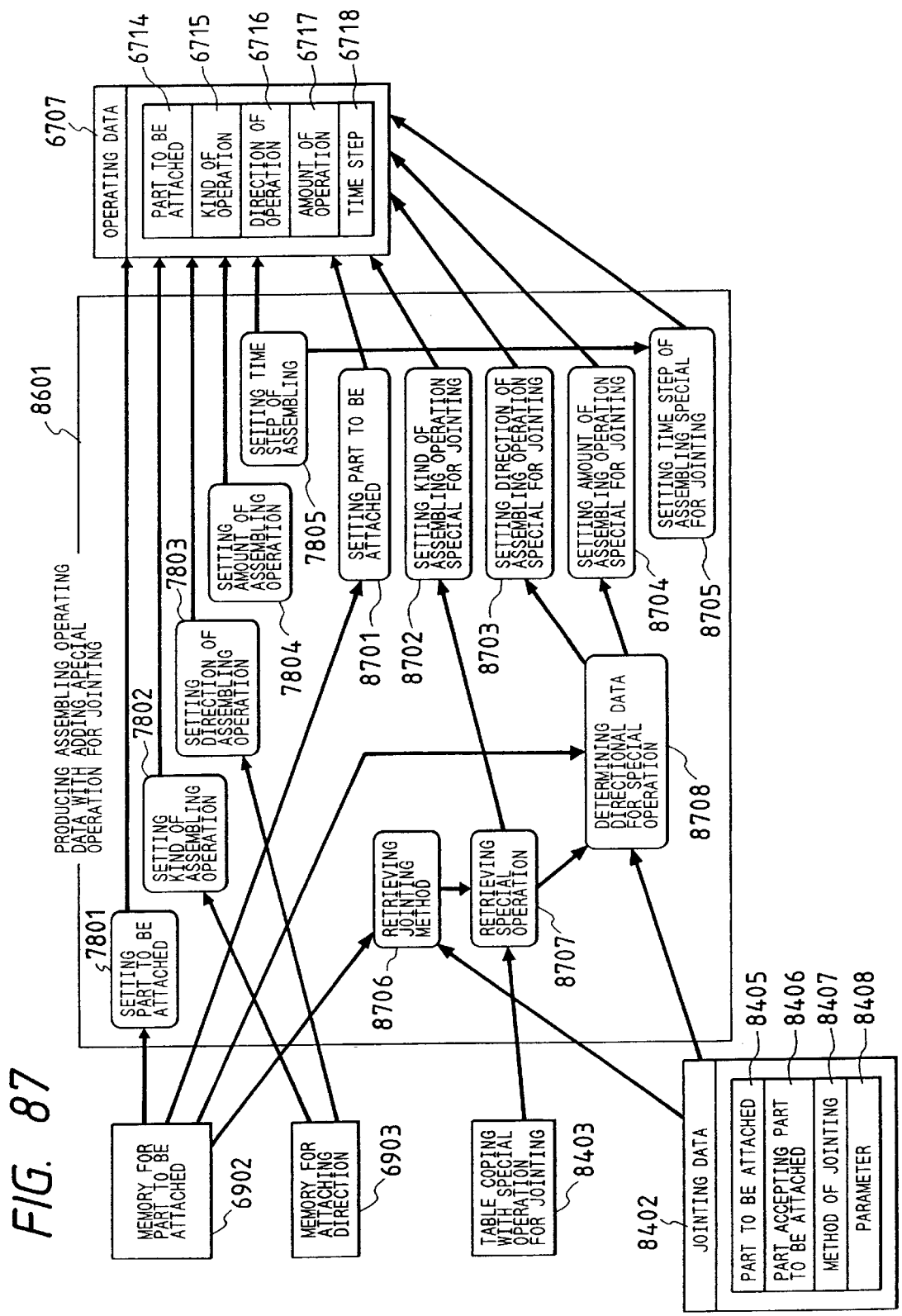

FIG. 89

| STEP OF PROCEDURE | PART TO BE ATTACHED | ATTACHING DIRECTION | |
|---|---|---|---|
| | | KIND | DIRECTION VECTOR |
| 1 | 8801 | — | — |
| 2 | 8802 | MOVING | 8803 |

FIG. 90

| PART TO BE ATTACHED | PART ACCEPTING PART TO BE ATTACHED | METHOD OF JOINTING | PARAMETER |
|---|---|---|---|
| 8802 | 8801 | SCREW | POINT OF CENTER (10.0, 20.0, 30.0) AXIS OF CENTER (0.0, 0.0, 1.0) LENGTH OF SCREW (20.0) |

FIG. 91

| PART TO BE ATTACHED | KIND OF OPERATION | DIRECTION OF OPERATION | AMOUNT OF OPERATION | TIME STEP |
|---|---|---|---|---|
| 9101 ～ 8802 | STRAIGHT MOVING | 8803 | Dconst | ST1=Tconst<br>ET1=Tconst+Tint |
| 9102 ～ 8802 | REVOLUTION | Dv | Drot | ST2=ST1<br>ET2=ET1 |

| METHOD OF JOINTING | SPEED RATIO |
|---|---|
| SNAP | 1.0 |
| SCREW | 1.5 |
| WELDING | 0.2 |
| SOLDERING | 0.2 |

FIG. 99

| STEP OF PROCEDURE | PART TO BE ATTACHED | ATTACHING DIRECTION | |
|---|---|---|---|
| | | KIND | DIRECTION VECTOR |
| 9901 — 1 | 9801 | — | — |
| 9902 — 2 | 9802 | MOVING | 9804 |
| 9903 — 3 | 9803 | MOVING | 9804 |

FIG. 100

| PART TO BE ATTACHED | PART ACCEPTING PART TO BE ATTACHED | METHOD OF JOINTING | PARAMETER |
|---|---|---|---|
| 9802 | 9801 | SNAP | ----- |
| 9803 | 9801 | SCREW | ----- |

FIG. 101

| PART TO BE ATTACHED | KIND OF OPERATION | DIRECTION OF OPERATION | AMOUNT OF OPERATION | TIME STEP |
|---|---|---|---|---|
| 10101 — 9802 | STRAIGHT MOVING | 9804 | Dconst | ST1=Tconst<br>ET1=Tconst+1.0*Tint |
| 10102 — 9803 | STRAIGHT MOVING | 9804 | Dconst | ST2=ET1<br>ET2=ST2+1.5*Tint |

| METHOD OF JOINTING | OPERATION SOUND |
|---|---|
| SNAP | NONE |
| SCREW | "SQUEAK" |
| WELDING | "SWISH" |
| SOLDERING | "FRIZZLE" |
| ⋮ | ⋮ |

FIG. 109
| PART TO BE ATTACHED | KIND OF OPERATION | DIRECTION OF OPERATION | AMOUNT OF OPERATION | TIME STEP | OPERATION SOUND |
|---|---|---|---|---|---|
| 10901~9802 | STRAIGHT MOVING | 9804 | Dconst | ST1<br>ET1 | NONE |
| 10902~9803 | STRAIGHT MOVING | 9804 | Dconst | ST2<br>ET2 | "FREZZLE" |
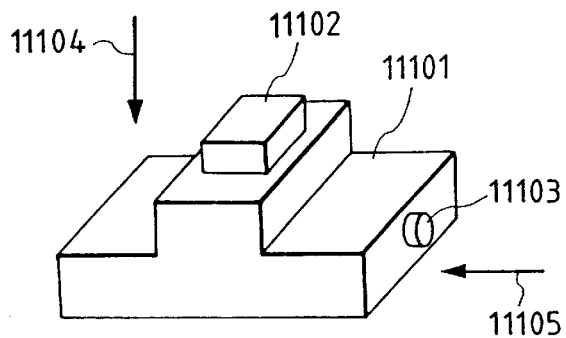
FIG. 111
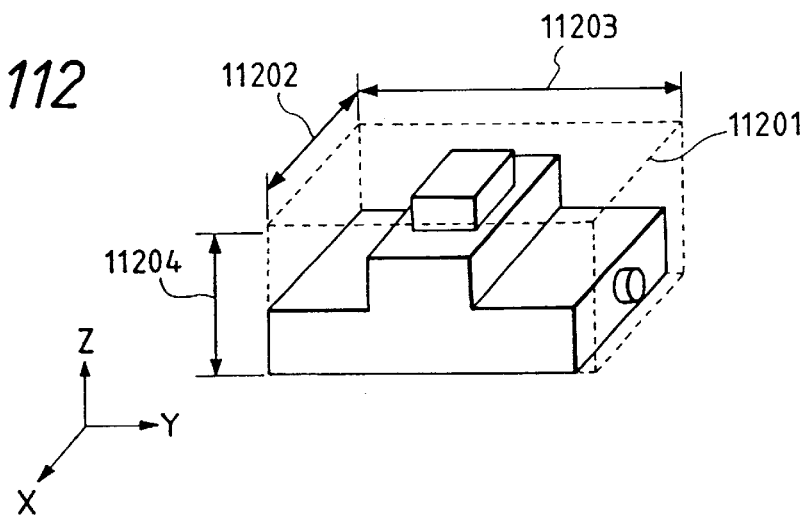
FIG. 112

FIG. 118
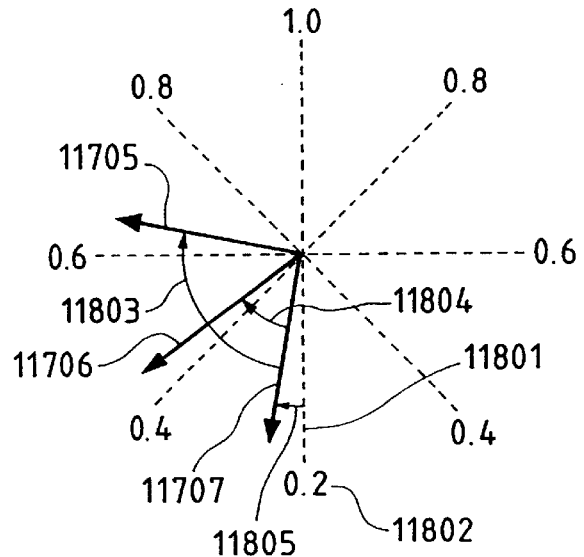
FIG. 119
| 11901 KIND OF WORK | 11902 WORK PARAMETER |
|---|---|
| ARC WELDING | LENGTH OF WELDING (50cm) |
| SPOT WELDING | FORCE OF PRESS-INSERTING (50N) |
| SOLDERING | NUMBER OF SOLDERING POINTS (5 PORTIONS) |
FIG. 120
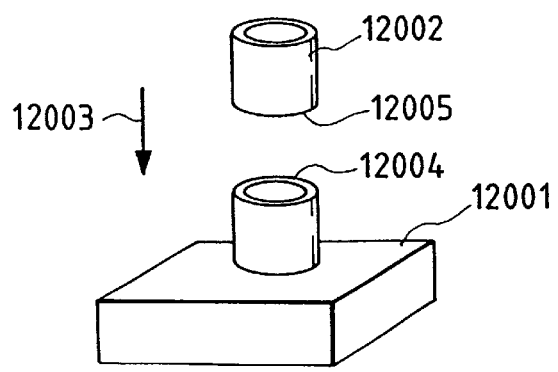

| PART TO BE ATTACHED | KIND OF OPERATION | DIRECTION OF OPERATION | AMOUNT OF OPERATION | TIME STEP | DISPLAY FLAG /12405 |
|---|---|---|---|---|---|
| 12401—9802 | STRAIGHT MOVING | -9804 | Dconst | ST1 ET1 | "NON-DISPLAY" |
| 12402—9803 | STRAIGHT MOVING | -9804 | Dconst | ST2 ET2 | "NON-DISPLAY" |
| 12403—9802 | STRAIGHT MOVING | 9804 | Dconst | ST3 ET3 | "DISPLAY" |
| 12404—9803 | STRAIGHT MOVING | 9804 | Dconst | ST4 ET4 | "DISPLAY" |

| PART TO BE ATTACHED | KIND OF OPERATION | DIRECTION OF OPERATION | AMOUNT OF OPERATION | TIME STEP | DISPLAY COLOR 12904 |
|---|---|---|---|---|---|
| 12901—9802 | STRAIGHT MOVING | -9804 | Dconst | ST1 ET1 | "RED" |
| 12902—9802 | STRAIGHT MOVING | -9804 | Dconst | ST2 ET2 | "BLUE" |
| 12903—9802 | STRAIGHT MOVING | — | — | ST3 ET3 | "GREEN" |

FIG. 131
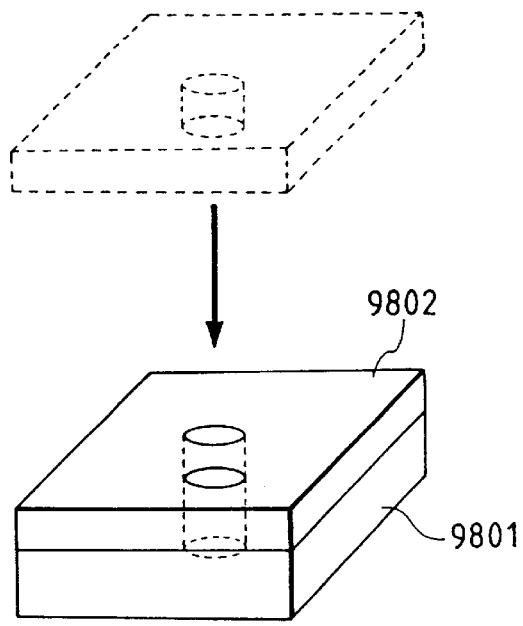
FIG. 133
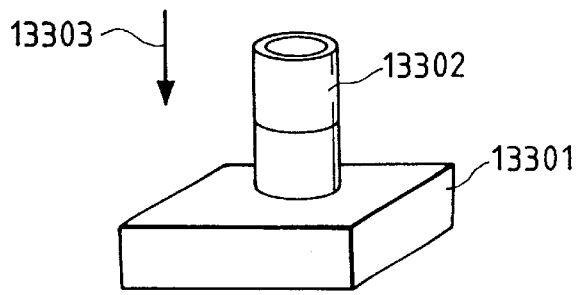
FIG. 134
| STEP OF PROCEDURE | PART TO BE ATTACHED | ATTACHING DIRECTION | |
|---|---|---|---|
| | | KIND | DIRECTION VECTOR |
| 13401 — 1 | 13301 | — | — |
| 13402 — 2 | 13302 | MOVING | 13303 |

| PART TO BE ATTACHED | PART ACCEPTING PART TO BE ATTACHED | METHOD OF JOINTING | PARAMETER |
|---|---|---|---|
| 13302 | 13301 | WELDING | |

| PART TO BE ATTACHED | KIND OF OPERATION | DIRECTION OF OPERATION | AMOUNT OF OPERATION | TIME STEP | MESSAGE |
|---|---|---|---|---|---|
| 13302 <br> ( <br> 13601 | STRAIGHT MOVING | 13303 | Dconst | ST1 <br> ET1 | "UNDER WELDING WORK" |

APPARATUS FOR PRODUCING EXPLODED VIEW AND ANIMATION OF ASSEMBLING, AND METHOD THEREOF

This is a continuation of application Ser. No. 08/825,245, filed Mar. 27, 1997, now U.S. Pat. No. 6,295,063 which is a continuation of Ser. No. 08/395,993, filed Feb. 28, 1995, now U.S. Pat. No. 5,619,630.

BACKGROUND OF THE INVENTION

The present invention relates to a method and an apparatus for producing an exploded view, the exploded view being produced for the purpose of showing the structure of an assembly composed of plural parts, an assembling procedure in a manufacturing process, or a procedure for maintenance and inspection or repairing of the structure, for example.

The present invention relates to a method and apparatus for producing an animation showing assembling of parts by which a structure of an assembly composed of plural parts, or an assembling procedure in a manufacturing process, is confirmed on a screen of a central processing unit.

An exploded view is a drawing in which parts composing an assembly are disassembled from an assembled state into pieces and arranged in an assembling order in the reverse direction of attachment. Such an exploded view is used for the purpose of showing the structure of an assembly composed of plural parts, an assembling procedure in a manufacturing process, or a procedure for maintenance and inspection or repairing of the structure, for example.

In the past, an exploded view has been produced by hand based on a manufacturing drawing, such as an assembly drawing, detail drawing and the like, and with reference to an assembling procedure manual showing an assembling procedure and the like.

In recent years, a CAD system also has been used in the design of products. An operator has made an exploded view by producing an assembly drawing of a product to be produced by using a three-dimensional CAD system and by moving parts with a moving command, taking the assembling procedure into consideration, based on data produced by the three-dimensional CAD system.

In conventional technology, it has taken a very long time to make an exploded view produced by hand. Although, by utilizing geometrical data for assembly of a product obtained by a three-dimensional CAD system eliminates the need to draw at least geometrical pictures of parts, it takes a long time for an operator to move parts one by one by inputting values representing moving directions and moving amounts.

Further, in studying an assembling procedure in preparation for manufacturing, it is necessary to confirm whether the assembling procedure is correct or not. However, since a trial and error method is required in determining the correctness of an assembling procedure, there is a problem in that it takes substantial manpower to revise the exploded view by hand for every procedural change.

In a conventional method for producing an animation of an assembling procedure, an assembled model as a geometrical product in an assembled state is produced using a three-dimensional CAD system, and geometrical data is input in an animation display system. Then, an operating data inputting operation is executed to set operating data as input parameters for an animation display function.

After setting the operating data for each of the parts composing the product, an animation producing process is executed to display the process of assembly of the product by animation.

In the above-mentioned operating data inputting process, a subject part is firstly specified. Next, the kind, the direction and the amount of movement are set for the specified part. Assuming that a part is moved, for example, in a straight line in the positive direction of the z-axis by a distance of "500", it is necessary to set parameters, such as "straight moving", (0.0, 0.0, 1.0), "500.0".

Lastly, the time period of movement is set. The time period indicates the time range of movement of the part, and, in order to confirm the order of assembly of the parts, an operator needs to set the time period so that the time range does not overlap with the time range of another part, taking the order of assembly of each part into consideration.

In a conventional apparatus for producing animation of an assembling procedure, a program for inputting geometrical data takes out geometrical information of an assembly procedure from an input unit and stores it in a geometrical data area. A program for inputting operating data inputs through the input unit operating data as input parameters for the animation display function for each part composing the assembly.

A program for producing animation generates animation data from the geometrical data and the operating data and outputs it to the output unit. As described above, in the conventional method, it is necessary to set operation data for all of the parts composing the assembly, taking the order of assembly into consideration.

The conventional technique is described in, for example, Japanese Patent Application Laid-Open No. 61-147375 (1986), Japanese Patent Application Laid-open No. 5-324779 (1993), Japanese Patent Application Laid-Open No. 4-37960 (1992).

In the conventional technology for producing animation, there is a disadvantage in that the procedure carried out by an operator becomes complicated, since operating data has to be set for each unit of parts. Further, there is a disadvantage in that, when the number of parts in a product is large, it takes a very long time to set operating data for all of the parts, taking the order of assembly of the product into consideration.

Furthermore, there is a disadvantage in that it is difficult for the operator to understand the detailed contents and the degree of difficulty of the assembling work using a simple animation in which all of the parts to be assembled are moved at a constant speed or are expressed with the same attribute.

SUMMARY OF THE INVENTION

An object of the present invention is to provide an apparatus and a method for easily producing an exploded view capable of confirming an assembling procedure with ease.

The object of the present invention can be attained by providing an apparatus for producing an exploded view having an input unit, a geometrical data memory for storing geometrical data of parts composing an assembly and a calculating unit for displaying the assembly to a display unit based on said geometrical data, which apparatus comprises means for determining arranged positions of the parts composing said assembly in a disassembled state based on assembling process data and said geometrical data, an exploded view being displayed in said display unit corresponding to the thus determined arranged positions.

More particularly, said assembling process data is composed of assembling orders and assembling directions, and said arranging position determining means calculates the scalar products of the vertex coordinates of each part and the assembling vector thereby to obtain the minimum value of the scalar products, calculates the scalar products of said read-out vertex coordinates of each part and said read-out assembling direction vector thereof to obtain the maximum value of the scalar products, obtains the differences between the minimum values of the scalar product and the maximum values of the scalar product to determine the distances between the parts composing said assembly in a disassembled state on an exploded view based on the obtained differences, and displays an exploded view in said display unit corresponding to the distances thus determined.

According to the present invention, the arranging position determining means calculates the scalar products of the vertex coordinates of each part and the assembling vector thereof to obtain the minimum value of the scalar products, calculates the scalar products of said read-out vertex coordinates of each part and said read-out assembling direction vector thereof to obtain the maximum value of the scalar products, obtains the difference between the minimum values of the scalar product and the maximum values of the scalar product to determine the distances between the parts composing said assembly in a disassembled state on an exploded view based on the obtained differences, and displays an exploded view in said display unit corresponding to the distances thus determined.

Therefore, an exploded view can be automatically produced, the manpower for producing an exploded view can be decreased by eliminating the operator's conventional work to move parts by individually specifying a moving direction and a moving amount for each part.

Another object of the present invention is to provide an apparatus and a method to easily produce an animation of an assembling procedure by which the detailed contents and the degree of difficulty of the assembling procedure and the assembling work can be easily confirmed.

This object of the present invention can be attained by reading out necessary geometrical data from geometrical data of parts composing an assembly; reading out part-to-be attached data and attaching-direction data from attaching procedure data composed of attaching orders, part-to-be attached data and attaching-direction data; obtaining a corresponding jointing method to this part to be attached read out in the above step from jointing data composed of part-to-be attached data and jointing-method data, obtaining a corresponding special operation for the jointing method obtained in the above step from a table for special-jointing-operation composed of jointing methods and operation data special for said jointing methods; and producing operating data for the part to be attached as an input parameter to an animation display function from the attaching direction and the special operation with reference to the geometrical data of the part to be attached.

The object of the present invention can be attained by reading out necessary geometrical data from geometrical data of parts composing an assembly; reading out part-to-be attached data and attaching-direction data from attaching procedure data composed of attaching orders, part-to-be attached data and attaching-direction data; obtaining a corresponding jointing method for the part to be attached read out in the above step from jointing data composed of part-to-be attached data and jointing method data; obtaining a corresponding animation speed ratio for the jointing method obtained in the above step from a table for animation-speed composed of jointing methods and operating speed ratio data special for said jointing methods; and producing operating data for the part to be attached as an input parameter to an animation display function from the attaching direction and the animation speed ratio with reference to the geometrical data of the part to be attached.

The object of the present invention can be attained by reading out necessary geometrical data from geometrical data of parts composing an assembly; reading out part-to-be attached data and attaching-direction data from attaching procedure data composed of attaching orders, part-to-be attached data and attaching-direction data; obtaining a corresponding jointing method for the part to be attached read out in the above step from jointing data composed of part-to-be-attached data and jointing-method data; obtaining a corresponding sound data for the jointing method obtained in the above step from a table for jointing sound composed of jointing methods and sound data special for said jointing methods; and producing operating data for the part to be attached as an input parameter to an animation display function from the attaching direction and the sound data with reference to the geometrical data of the part to be attached.

The operating data of parts to be attached for producing an animation is produced by making a linkage among the geometrical data of parts to be attached, the attaching-direction data and the jointing method for jointing between parts.

Thereby, there is provided operating data for animation in which a part to be attached in an assembled state is detached from the assembly and is again attached into the assembled state. By applying this operation to all the parts composing the assembly according to the assembling procedure, the operating data for all parts can be obtained and consequently the animation of the assembling procedure which shows the attaching order of the assembly with moving pictures is easily produced.

BRIEF DESCRIPTION OF THE DRAWINGS

FIG. 48 is a diagram showing a state after completion of determining the arrangement position.

FIG. 49 is a diagram showing geometrical data of an assembly with the assembling of a sub-assembly.

FIG. 50 is a diagram showing the data structure of assembling process data with assembling of a sub-assembly.

FIG. 51 is a diagram of an assembly represented by a tree structure.

FIG. 52 is a flow chart showing another method of producing an exploded view coping with assembling of a sub-assembly according to the present invention.

FIG. 53 is a diagram showing the data structure of a stack for a part to be attached.

FIG. 54 is a diagram showing a intermediate state during producing an exploded view.

FIG. 87 is a functional diagram showing an apparatus executing assembling operation data producing process.

FIG. 89 is a diagram showing assembling procedure data.

FIG. 90 is a diagram showing jointing data.

FIG. 91 is a diagram showing operation data for an assembling operation produced by an embodiment according to the present invention.

FIG. 99 is a diagram showing an embodiment of assembling procedure data.

FIG. 100 is a diagram showing jointing data.

FIG. 101 is a diagram showing operation data for an assembling operation produced by an embodiment according to the present invention.

FIG. 109 is a diagram showing operation data for an assembling operation produced by an embodiment according to the present invention.

FIG. 111 is a diagram showing an example of an assembly.

FIG. 112 is a diagram showing a bounding box containing the geometry of the parts of an assembly.

FIG. 118 is a diagram for explaining the principle of operation of an assembling operation data producing process.

FIG. 119 is a diagram showing working data.

FIG. 120 is a diagram showing an example of an assembly detached by a detaching operation.

FIG. 121(A) is a table which shows functions for calculating an animation time for an assembling operation data producing means.

FIG. 121(B) is a diagram showing an animation display based on produced assembling operation data.

FIG. 122 is a block diagram showing an apparatus forming an embodiment according to the present invention.

FIG. 123 is a functional diagram showing the executing of an assembling operation data producing process.

FIG. 124 is a diagram showing operation data for an assembling operation produced by an embodiment according to the present invention.

FIG. 125 is a diagram showing an animation display based on the operation data produced by an embodiment according to the present invention.

FIG. 126 is a diagram showing an animation display based on the operation data produced by an embodiment according to the present invention.

FIG. 127 is a diagram showing an animation display based on the operation data produced by an embodiment according to the present invention.

FIG. 128 is a functional diagram showing the executing of an assembling operation data producing process.

FIG. 129 is a diagram showing operation data for an assembling operation produced by an embodiment according to the present invention.

FIG. 130 is a diagram showing an animation display based on the operation data produced by an embodiment according to the present invention.

FIG. 131 is a diagram showing an animation display based on the operation data produced by an embodiment according to the present invention.

Figure 132:
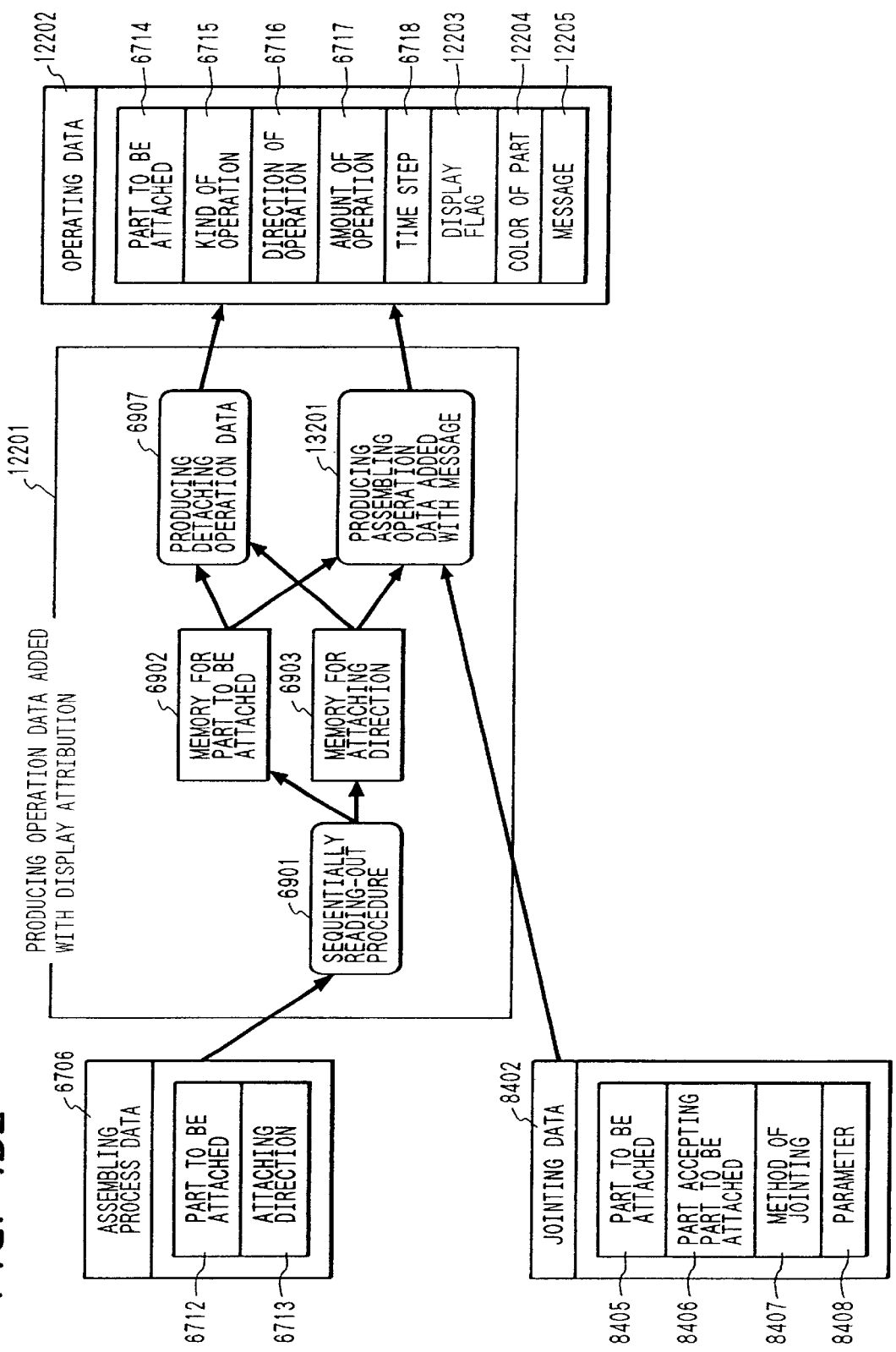

FIG. 132 is a functional diagram showing the executing of an assembling operation data producing process.

FIG. 133 is a diagram showing an example of an assembly.

FIG. 134 is a diagram showing assembling procedure data.

Figures 135, 136, 137:
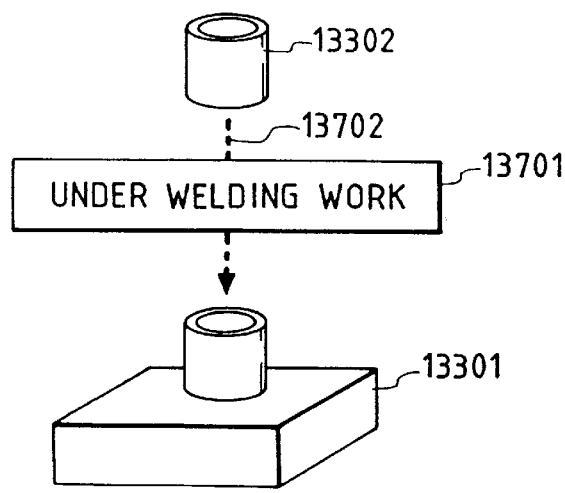

FIG. 135 is a diagram showing jointing data.

FIG. 136 is a diagram showing operation data for an assembling operation produced by an embodiment according to the present invention.

FIG. 137 is a diagram showing an animation display based on the operation data for an assembling operation produced by an embodiment according to the present invention.

DESCRIPTION OF THE INVENTION

Figure 1:
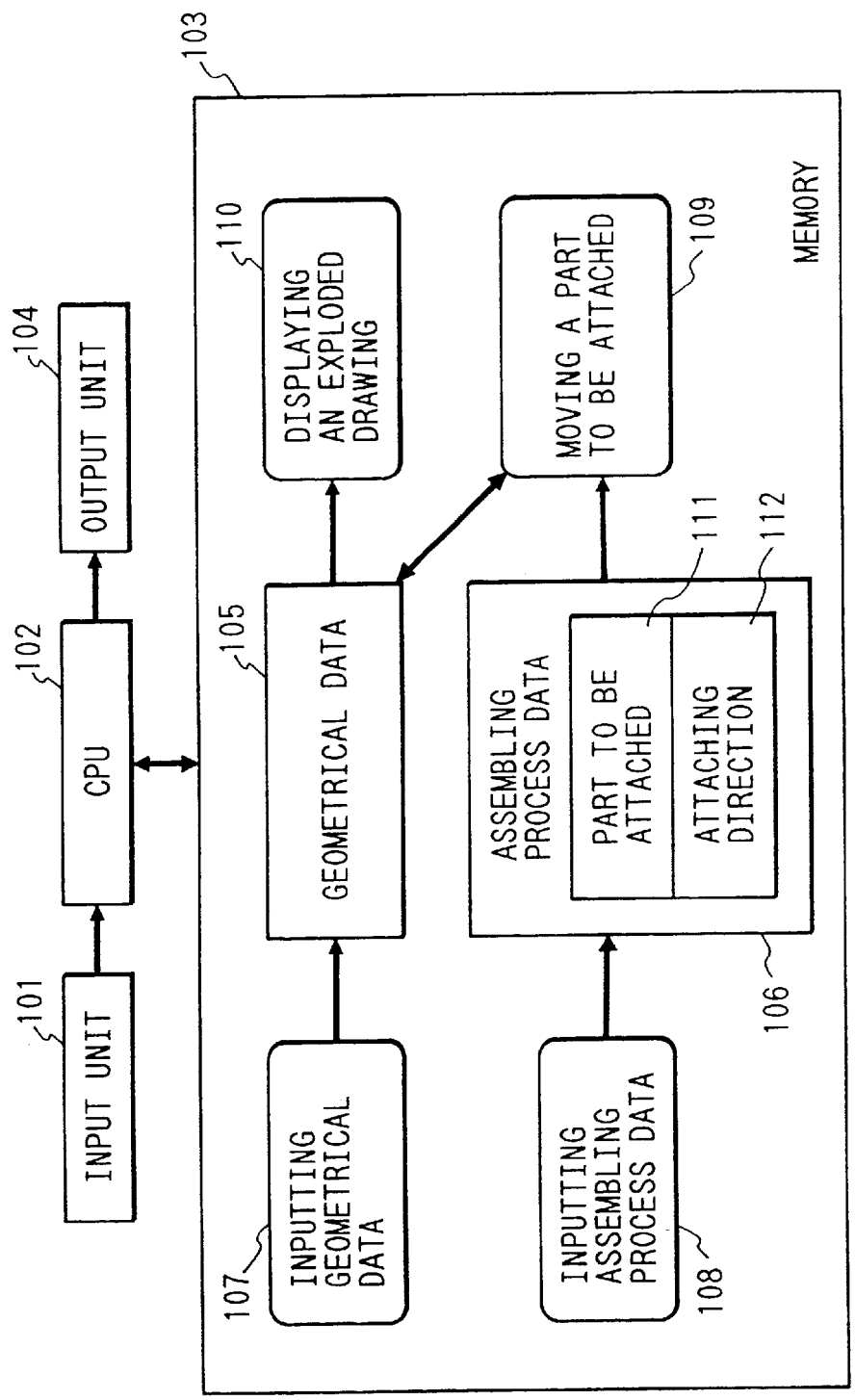
FIG. 1 is a block diagram showing the construction of an embodiment of an apparatus for producing an exploded view according to the present invention.

FIG. 1 shows the structure of an embodiment of an apparatus for producing an exploded view according to the present invention. An input unit 101 is composed of a machine taking instructions from an operator, such as keyboards and a mouse, and a machine receiving data from another computer, such as a communication apparatus and a floppy disk drive.

A central processing unit (CPU) 102 is constructed with a CPU which performs calculations on data received from a memory 103 according to a program stored in the memory 103, and exchanges data between the input unit 101 and an output unit 104. The memory 103 is constructed with random access memories, magnetic disks and so on, and stores programs and data. The output unit 104 is constructed with a display unit, such as a CRT, and machines to transfer data to another computer, such as a communication apparatus and a floppy disk drive.

The memory 103 stores geometrical data 105, assembling process data 106, a program 107 for inputting geometrical data, a program 108 for inputting assembling process data, a program 109 for moving a part to be attached, and a program 110 for displaying an exploded view.

The shapes of the components are stored as part of the geometrical data 105 for every component. The geometrical data area 105 stores geometrical information for an assembly. The assembling process data area 106 stores information concerning parts to be attached 111 and attaching directions 112 in assembling order. The assembling process data might, have been generated automatically from the geometrical data 105 by a program.

The program 107 for inputting geometrical data fetches geometrical information of an assembly from the input unit 101 and stores it in the geometrical data area 105. The program for inputting an assembling procedure fetches parts to be attached and attaching directions from the input unit 101 in an assembling order and stores them in the assembling process data area 106.

The program 109 for moving a part to be attached calculates the position of the part to be attached on an exploded view using the geometrical data of the part to be attached 111, the geometrical data of a part having been attached and an attaching direction 112, and changes the part positions of the parts to be attached in the geometrical data 105. The program 110 for displaying an exploded view outputs the geometrical data 105 to the output unit 104.

Inputting of the geometrical data 105 and the assembling process data 106 is performed by an operator using a mouse and a key-board, or through a net-work or a floppy disk in a case of data prepared by another computer.

Figure 43:
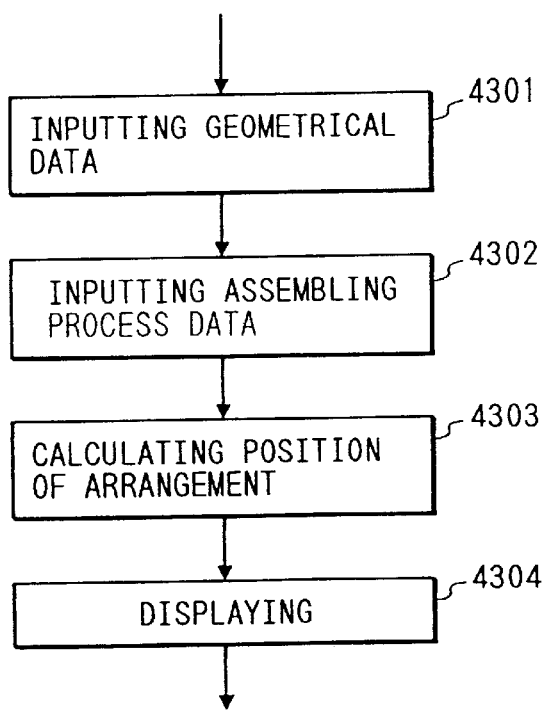
FIG. 43 is a process flow chart of a method of producing an exploded view according to the present invention.

FIG. 43 shows an embodiment of a method for producing an exploded view according to the present invention. In process 4301, geometrical data of parts relating to an object to be assembled and arrangement positions of these parts in the state of completion of the assembling are fetched. In process 4302, the assembling process data composed of data on assembling orders of parts and assembling directions is fetched.

In process 4303, the position of each part composing the assembly in a disassembled state is calculated using the geometry of the part, the arrangement position, the assembling order and the assembling direction. In process 4304, the geometries of the parts are indicated based on the arranging positions obtained in process 4303.

Figure 2:
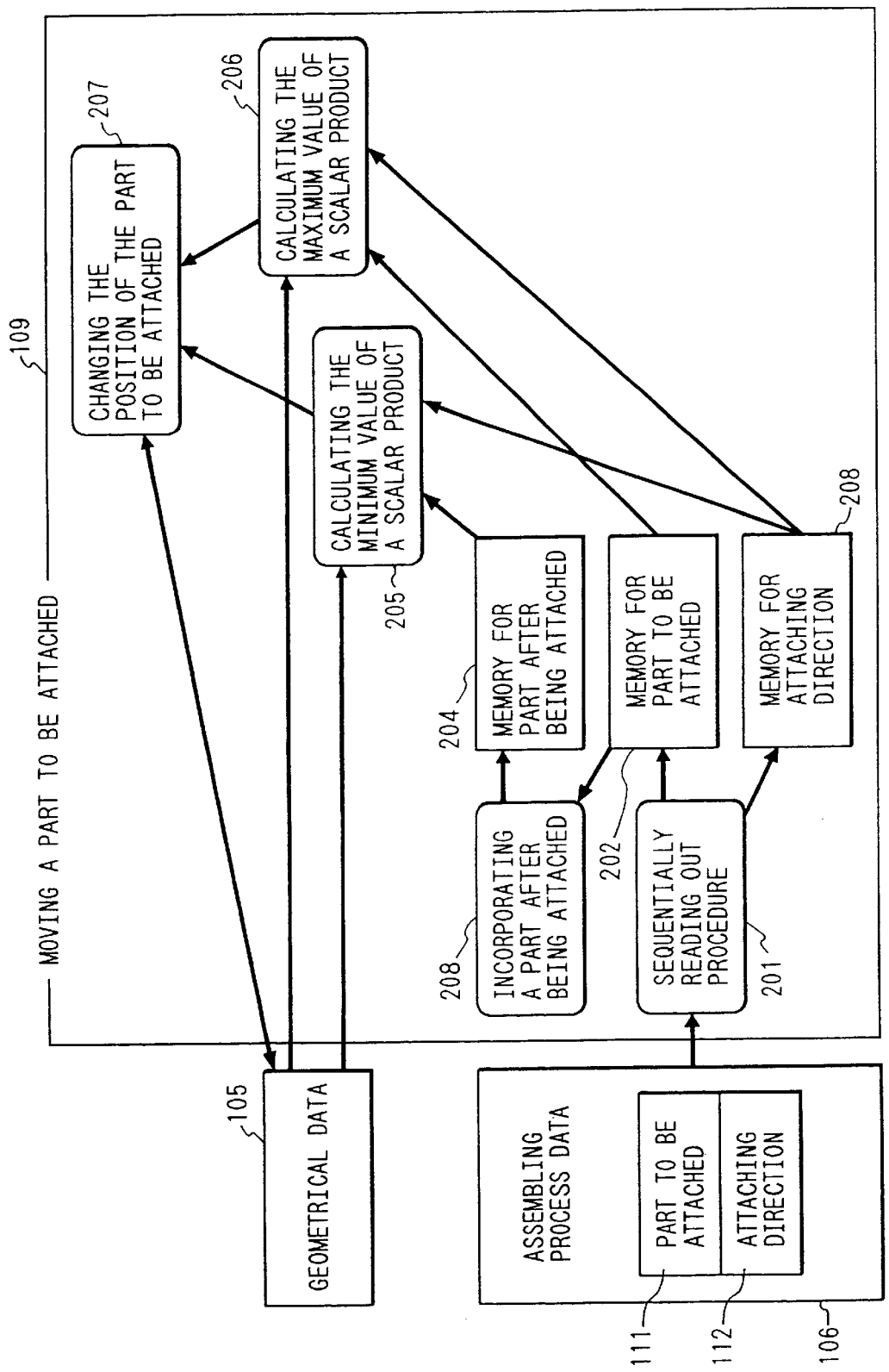
FIG. 2 is a functional block diagram showing the detailed procedure for moving a part to be attached using the apparatus of FIG. 1.

FIG. 2 shows the detailed construction of an embodiment of a program 109 for moving a part to be attached. A program 201 for sequentially reading-out a procedure reads out assembling procedures from the assembling process data area 106 one by one, and stores them into a memory area 202 for a part to be attached and a memory area 208 for an attaching direction. The attaching direction 112 indicates the direction when a part to be attached is attached to a part having been attached, and is a unit vector. Let the vector be $V_a$.

The memory area 204 for a part having been attached stores a list of parts having been attached in the steps of the procedure prior to a certain step of the assembling procedure. The program 205 for calculating the minimum value of a scalar product reads out the list of parts having been attached from the memory area 204 for a part having been attached, calculates the scalar products of the vertex coordinates of the parts and the attaching direction, and calculates the minimum value among them. Let the minimum value be $D_{min}$.

The program 206 for calculating the maximum value of a scalar product reads out a part to be attached from the memory area 202 for a part to be attached, and extracts the vertex coordinates of the part from the geometrical data 105, and calculates the scalar product of the coordinates and the attaching direction to obtain the maximum value among them.

Let the maximum value be $D_{max}$. The program 207 for changing the position of a part to be attached obtains a vector V for moving the part to be attached using the following equation (1). Therein, the value $D_{const}$ is a gap of a certain value determined in advance.

$$V = (D_{min} - D_{max} - D_{const}) \times V_a \quad (1)$$

Then, the position $M_o$ of the part to be attached is fetched from the geometrical data, and multiplied by the moving matrix $M_v$ obtained from the moving vector V to obtain the value M which is written in the geometrical data as a new position of the part. This calculation is performed with the following equation (2).

$$M = M_v \times M_o \quad (2)$$

The program 208 for adding a part having been attached adds the part to be attached which has changed its position into the memory area 204 for a part having been attached.

Description will be made below on the principle of production of an exploded view with the program 109 for moving a part to be attached, referring to a detailed example.

Figure 3:
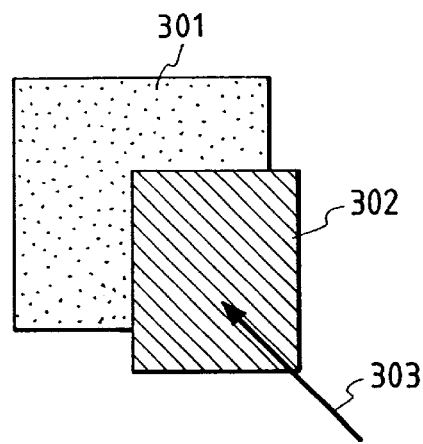
FIG. 3 is a diagram showing an assembled state of an assembly.

FIG. 3 shows an assembled state of two parts 301 and 302. Let the part 301 be a part having been attached and the part 302 be a part to be attached. A vector 303 indicates the attaching direction of the part 302. By the program 205 for calculating the minimum value of a scalar product, the minimum value of the scalar product of the vertex coordinates of the part having been attached 301 and the attaching direction 303 are obtained.

Figure 4:
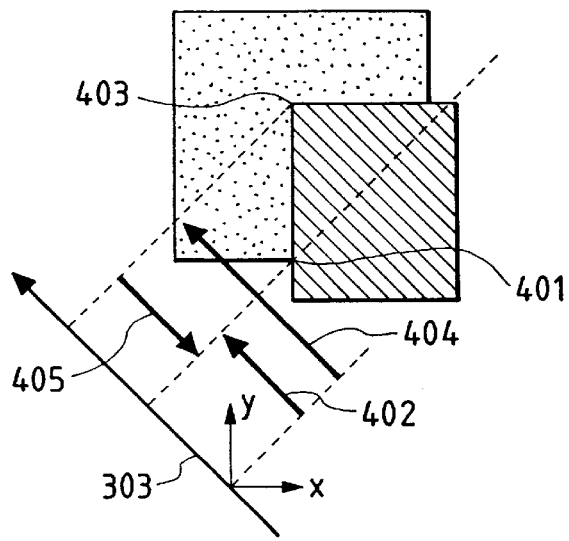
FIG. 4 is a diagram explaining the operational principle for moving a part to be attached according to the procedure of FIG. 2.

In the case of FIG. 3, the scalar product of the vertex coordinate 401 and the attaching direction becomes the minimum as shown in FIG. 4, and the value is a magnitude indicated by the arrow 402. That is, the geometry of the part having been attached 301 exists in a domain larger than the minimum value of the scalar product 402 when the attaching direction 303 is thought of as a number line.

On the other hand, by the program 206 for calculating the maximum value of a scalar product, the maximum value of the scalar product of the vertex coordinates of the part to be attached 302 and the attaching direction 303 are obtained.

In the case of FIG. 3, the scalar product of the vertex coordinate 403 and the attaching direction becomes a maximum, as shown in FIG. 4, and the value is a magnitude indicated by the arrow 404. That is, the geometry of the part to be attached 302 exists in a domain smaller than the maximum value of the scalar product 404 when the attaching direction 303 is thought of as a number line.

Therefore, subtracting the maximum value 404 from the minimum value 402 produces a value indicated by the arrow 405. As the part to be attached is moved in the attached direction by the distance indicated by the arrow 405, the existing domains of the part having been attached 301 and the part to be attached 302 do not overlap with each other on the number line of the attaching direction 303.

Figure 5:
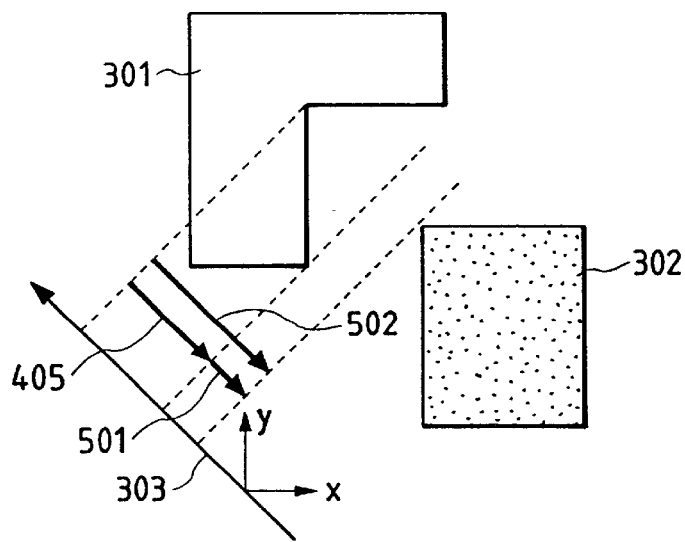
FIG. 5 is a view explaining the operational principle for moving a part to be attached according to the procedure of FIG. 2.

Since the domains, however, contact each other in this state, a pre-set constant value 501 is subtracted from the value 405. Then the moving amount becomes the distance indicated by the arrow 502, as shown in FIG. 5. As the part to be attached 302 is moved in parallel to the attaching direction 303 by the moving amount 502, it is possible to obtain an exploded view in which the part having been attached 301 and the part to be attached 302 are separated from each other.

Figure 6:
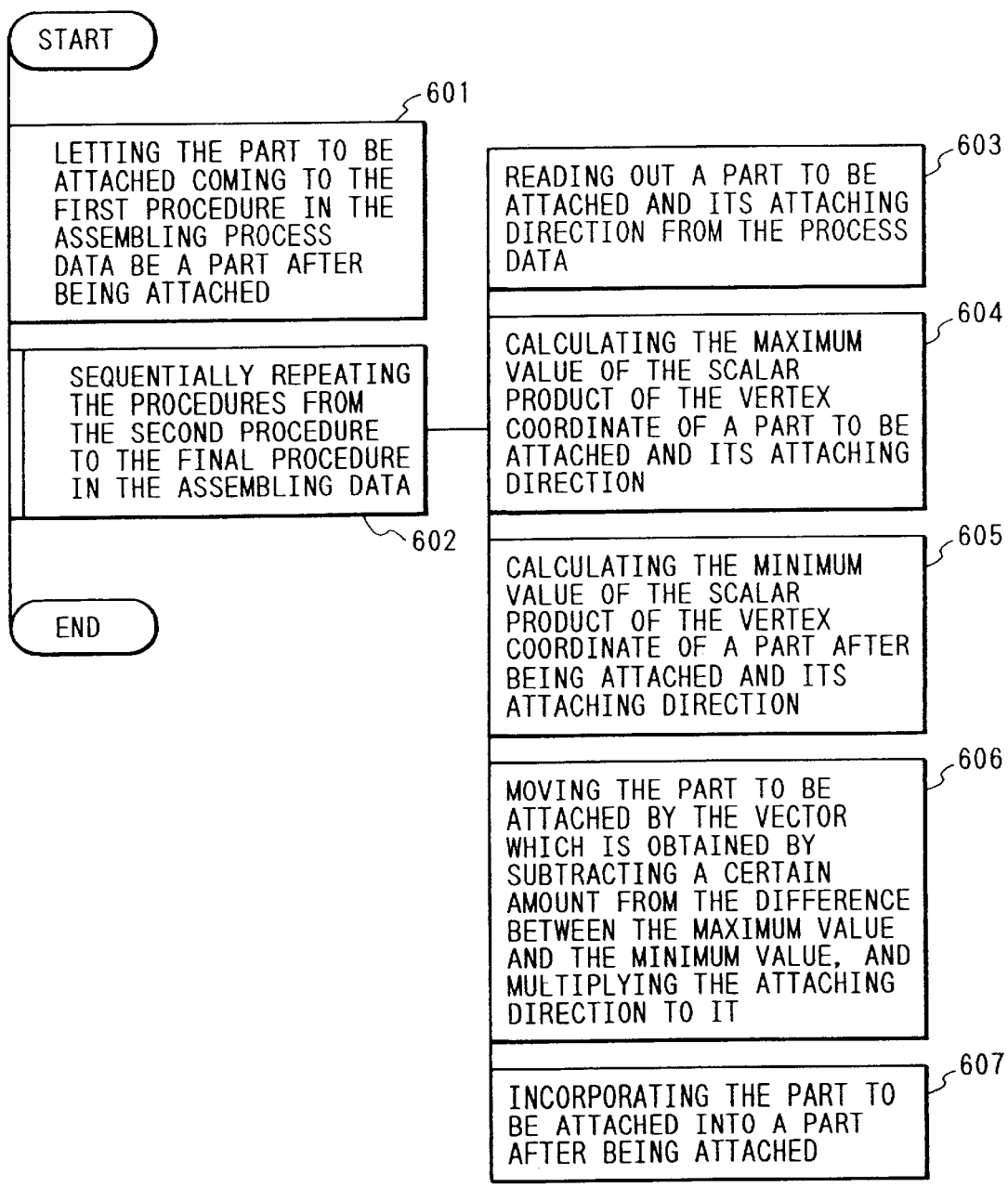
FIG. 6 is a flow chart of the processing procedure for moving a part to be attached.

FIG. 6 shows the process flow of the program for moving the part to be attached. In process 601, a part to be attached in the step of the first procedure in the assembling process data is assumed to be a part having been attached.

In process 602, the processes of process 603 to process 607 are sequentially repeated from the second procedure step to the final procedure step. In process 603, a part to be attached and an attaching direction in the procedure step now are read out from the attaching procedure data.

In process 604, all vertex coordinates of the part to be attached are read out from the geometrical data, and the scalar product of each of the vertex coordinates and the attaching direction are calculated, and the maximum value is obtained among the values.

In process 605, all vertex coordinates of the part having been attached are read out from the geometrical data and the scalar product of each of the vertex coordinates and the attaching direction are calculated, and the minimum value is obtained among the values.

In process 606, the part to be attached is moved by a vector which is obtained by subtracting the maximum value and a certain value from the minimum value and by applying the attaching direction to the result. In process 607, the part to be attached, which has been brought into the disassembled state by the movement is added to the part having been attached.

Figures 7, 8:
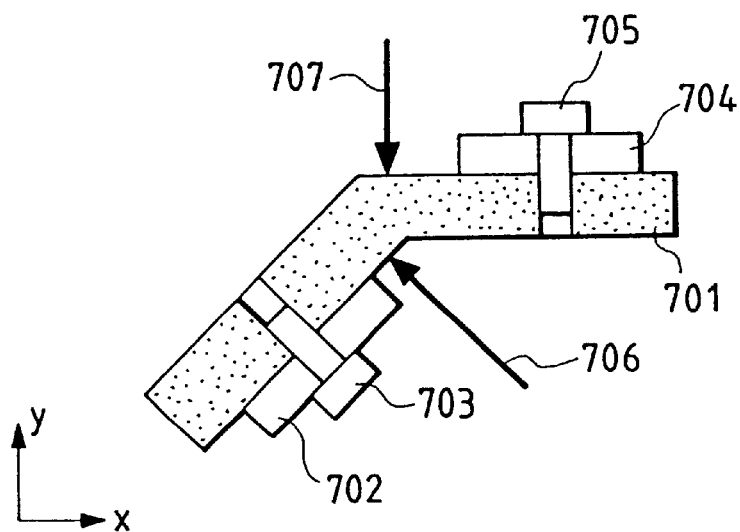
FIG. 7 is a diagram showing another assembled state of an assembly.
FIG. 8 is a diagram showing the data structure of the assembling process data.

The process of producing an exploded view through the process flow in FIG. 6 will be described below, referring to a detailed example. FIG. 7 shows the geometry of an assembly used in the explanation. The structure of the assembly includes a part 702 fixed to a plate 701 with a bolt 703, and a part 704 fixed to the plate 701 with a bolt 705.

The attaching direction of the part 702 and the bolt 703 is indicated by the directional vector 706, and the attaching direction of the part 704 and the bolt 705 is indicated by the directional vector 707.

The assembling process data for the assembly in FIG. 7 is shown in, for example, FIG. 8. The column including the step of procedure 801 shows sequence numbers 804 to 808 for the assembling procedure, and assembling is performed in the order of these numbers.

The column including the part to be attached 802 shows parts to be attached in corresponding steps of the procedure. Each number in the column 802 in FIG. 8 corresponds to the symbol attached to each part in FIG. 7.

The column including the attaching direction 803 shows direction vectors expressing attaching directions of the parts in the corresponding steps of the procedure. Each attaching direction in the column 803 in FIG. 8 corresponds to the symbol attached to each directional vector in FIG. 7. Since the first procedure step 804 relates to a case of setting a part at the beginning, there is no need to specify the attaching direction.

Firstly, a part to be attached 701 in the step of the first procedure 804 is designated as a part having been attached. At this stage, the assembly is in an assembled state, as shown in FIG. 7.

Herein, for the purpose of explanation, a part having been attached is shown by dot-shading and part to be attached is shown by inclining-hatching in order to discriminate between a part to be attached and a part having been attached.

Figure 9:
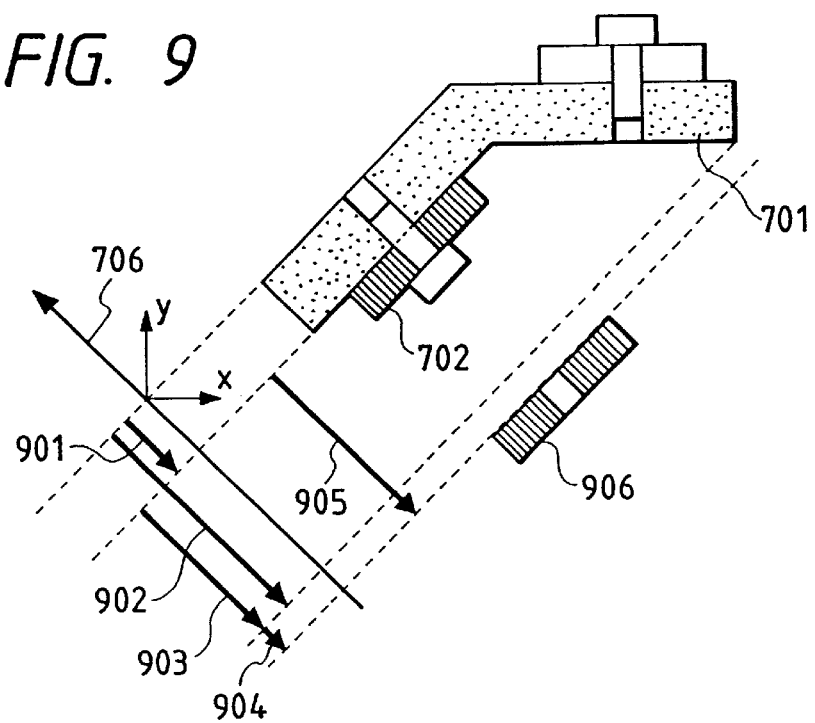
FIG. 9 is a diagram for explaining the operation for moving a part to be attached in the assembly shown in FIG. 7.

In the state of FIG. 7, the part 701 is a part having been attached. Next, in process 602, the processes of process 603 to process 607 are sequentially repeated for each of the procedure step 1 to the procedure step 5. As the process 603 is performed in the second procedure step 805, the part to be attached is part 702. This state is shown in FIG. 9.

By performing process 604, the maximum value of scalar product 901 is obtained, and by performing process 605 the minimum value of scalar product 902 is obtained. By performing process 606 the difference between the minimum value and the maximum value 903 is obtained.

By letting a certain gap value be the amount 904, the moving vector 905 is obtained and the position of the part to be attached 702 becomes the position 906. By performing process 607 the part to be attached 702 becomes a part having been attached 906.

Figure 10:
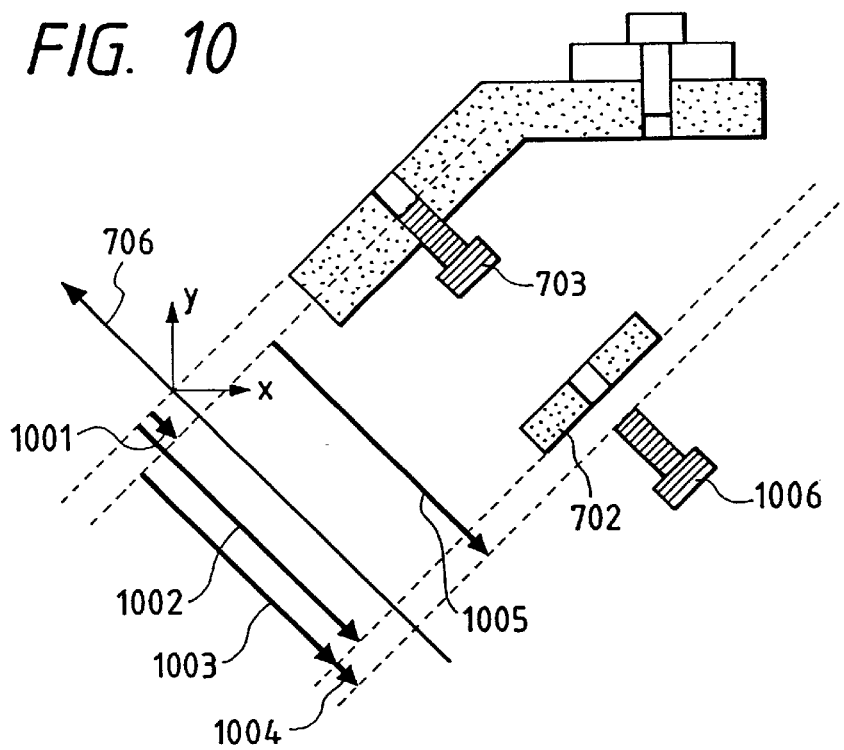
FIG. 10 is a diagram for explaining the operation for moving a part to be attached in the assembly shown in FIG. 7.

FIG. 10 shows a feature where process 603 to process 607 are being performed in the third procedure step 806. The part to be attached is the bolt 703 and the attaching direction vector is shown by an arrow 706.

By performing process 604 the maximum value of the scalar product is shown by the arrow 1001 since the part-to-be attached is the bolt 703. By performing process 605, the minimum value of the scalar product is shown by an arrow 1002, since the part having been attached is the part 701 and the part 702.

The value 1003 is obtained by subtracting the value 1001 from the value 1001, and the value 1005 is obtained by further subtracting a certain value 1004 from the result. As the part 703, which is a part to be attached, is moved in the attaching direction 706, the position of the part 703 becomes the position 1006. And, the part 703 becomes a part having been attached in the position 1006. Similarly, the part to be attached is the bolt 703 and the attaching direction vector is shown by an arrow 706.

Figure 11:
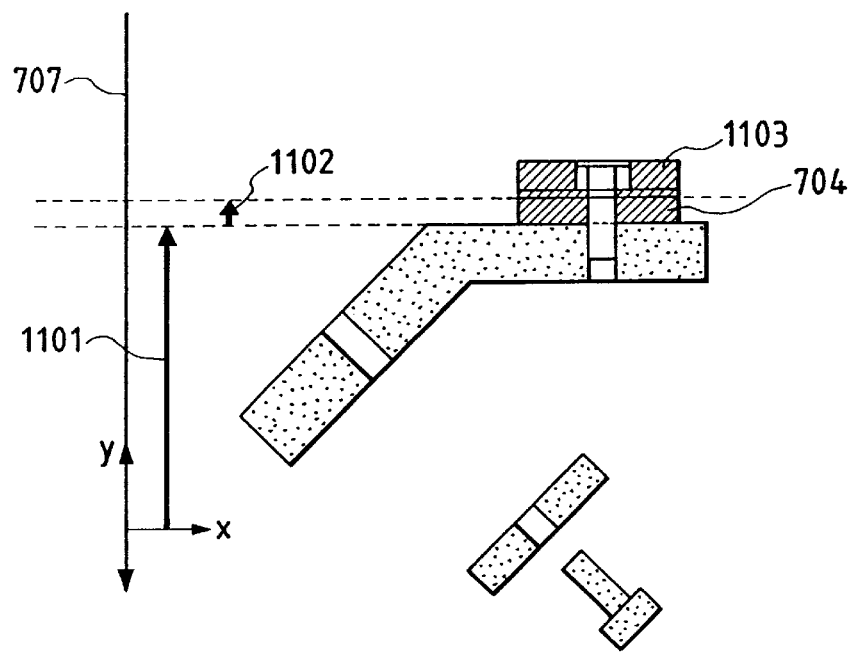
FIG. 11 is a diagram for explaining the operation for moving a part to be attached in the assembly shown in FIG. 7.

FIG. 11 shows a feature where process 603 to process 607 are being performed in the fourth procedure step 807. In this case, the maximum value of the scalar product is equal to the minimum value of the scalar product and is shown by the arrow 1101 in FIG. 11. Therefore, the moving amount is the gap distance 1102. Therefore, the position of the part 704 after being moved is the position 1103.

Figure 12:
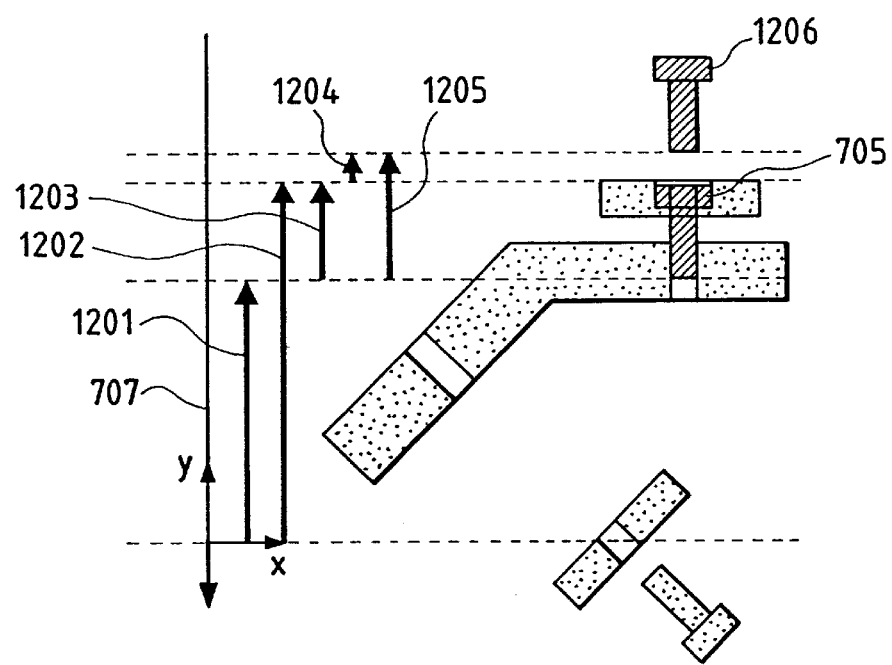
FIG. 12 is a diagram for explaining the operation for moving a part to be attached in the assembly shown in FIG. 7.

Further, FIG. 12 shows a feature where process 603 to process 607 are being performed in the fifth procedure step 808. The maximum value of the scalar product of the vertex coordinate of the part to be attached 705 and the attaching direction 707 is the magnitude shown by the arrow 1201.

The minimum value among the scalar products of the vertex coordinates of the parts having been attached 701 to 704 and the attaching direction 707 is the amount shown by the arrow 1202.

The difference between the minimum value and the maximum value is the amount shown by the arrow 1203. Letting the gap be the amount shown by the arrow 1204, the moving amount becomes the distance 1205. Therefore, the position of the part 705 after being moved is the position 1206.

Figure 13:
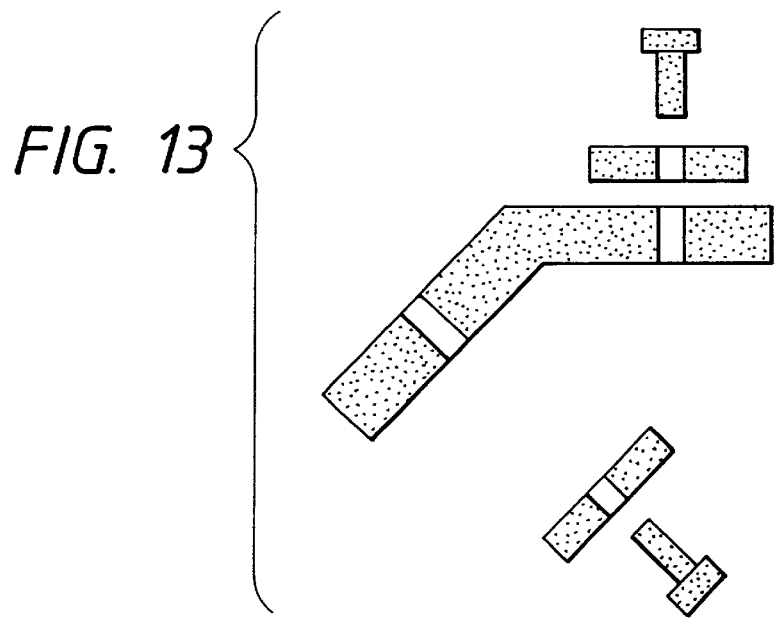
FIG. 13 is a diagram of an exploded view produced by an embodiment according to the present invention for the assembly shown in FIG. 7.

FIG. 13 shows the geometrical arrangement after completion of the processes. An exploded view can be obtained by displaying this data.

Figure 14:
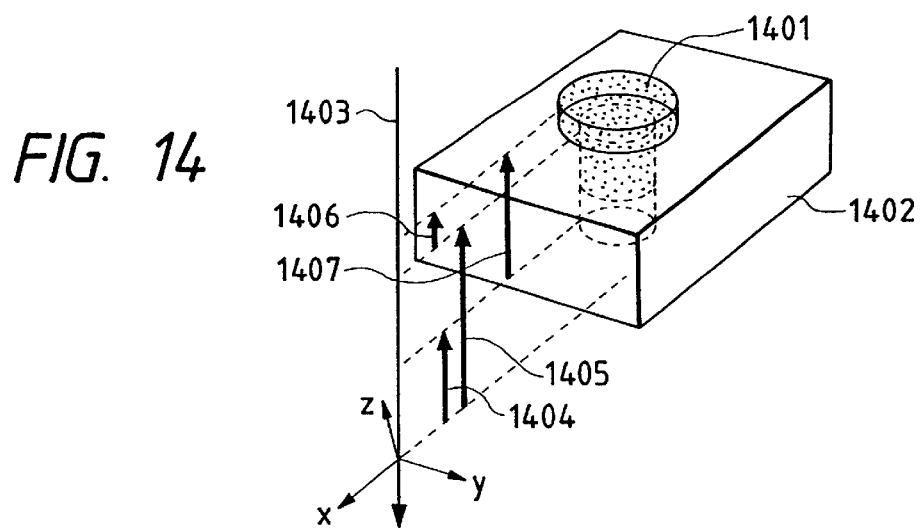
FIG. 14 is a diagram for explaining the operation for moving a part to be attached in the assembly having a three-dimensional geometry.

Although the description in this embodiment has been made in a case of a two-dimensional view, the present invention can be directly realized in the case of a three-dimensional view. In FIG. 14, for example, let the part 1401 be a part to be attached, the part 1402 be a part having been attached, the arrow 1403 directed downwardly be the attaching direction.

The maximum value of the scalar product of the attaching direction 1403 and the vertex coordinate of the part to be attached 1401 is the amount shown by the arrow 1404.

Figure 15:
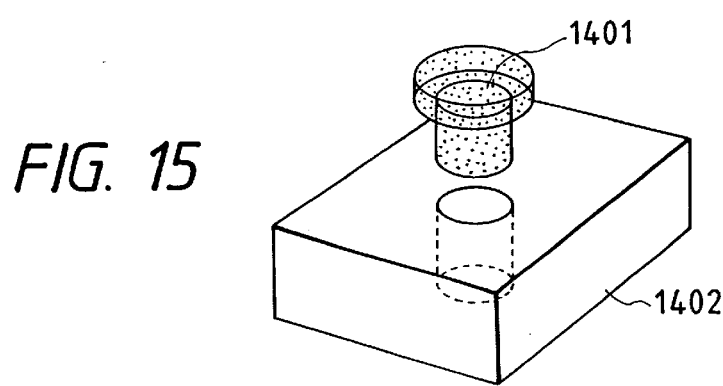
FIG. 15 is a diagram of an exploded view produced by an embodiment according to the present invention based on three-dimensional geometrical data.

The minimum value of the scalar product of the attaching direction 1403 and the vertex coordinate of the part having been attached 1402 is the amount shown by the arrow 1405. The amount obtained by subtracting the maximum value 1405 and the distance 1406 for the shift from the minimum value 1404 is represented by the moving vector 1407 of the part to be attached. FIG. 15 shows a geometrical representation of the part to be attached 1402 after being moved by the moving vector.

In the above embodiment, the scalar product of a part to be attached or a part having been attached and an attaching direction are calculated. In a case where a curved surface is included in a part, an easily understandable exploded view can be produced by incorporating the control points of curved lines and curved surfaces into points for calculating the scalar products.

Figure 16:
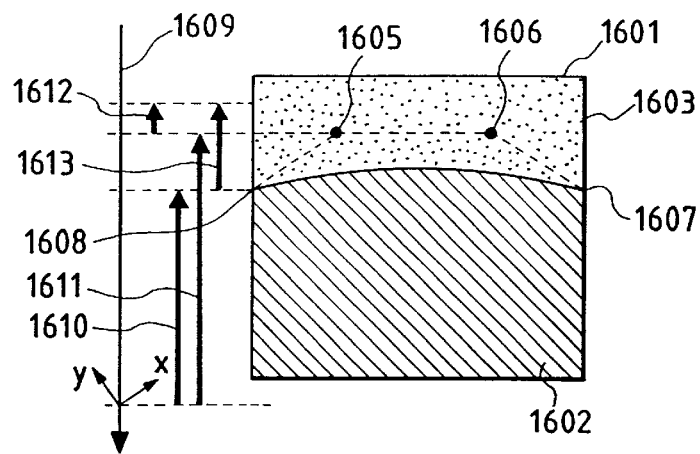
FIG. 16 is a diagram for explaining the operation of an embodiment for moving a part to be attached.

In FIG. 16, let the part 1601 be a part to be attached, and the part 1602 be a part having been attached. In a case where a curved surface 1603 is included in both the part to be attached and the part having been attached, the control points 1605 and 1606 of the curved surface 1603 are incorporated into points for calculating scalar products, as well as the coordinates of vertexes 1607, 1608 when the scalar products with the attaching direction 1609 are calculated.

As a result, the maximum value among the scalar products of the coordinates of the vertexes and the control points of the part to be attached 1601 and the attaching direction vector 1609 is the value 1610 of the scalar product of the coordinate of the vertex 1608 and the directional vector 1609.

The minimum value among the scalar products of the coordinates of the vertexes and the control points of the part having been attached 1602 and the attaching direction vector 1609 is the value 1611 of the scalar product of the coordinate of the control point 1605 and the directional vector 1609.

The value 1613, which is obtained by subtracting the gap amount 1612 from the difference of the minimum value 1611 and the maximum value 1610, becomes the moving amount of the part to be attached 1601.

Figure 17:
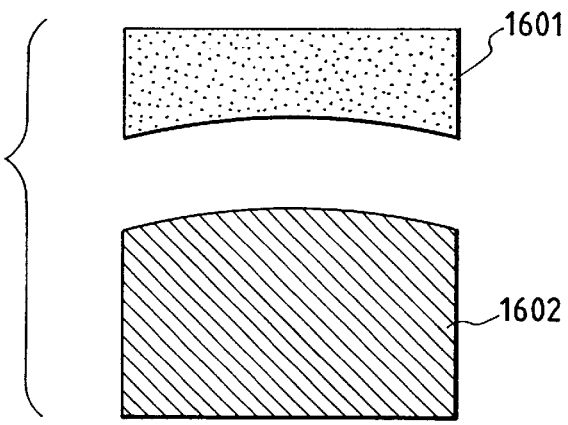
FIG. 17 is a diagram of an exploded view produced by an embodiment according to the present invention for the assembly shown in FIG. 16.

FIG. 17 shows the geometrical arrangement after the part is moved. Although not all parts including a curved line or curved surface can be detached by using only coordinates of vertexes, by using control points of a curved line and curved surface it is possible to produce an exploded view where all parts are detached.

In another embodiment of the present invention, vertexes of a bounding box, which is a polyhedron containing a geometry of a part, are used instead of using the vertexes and control points of the geometry of the part itself.

Figure 18:
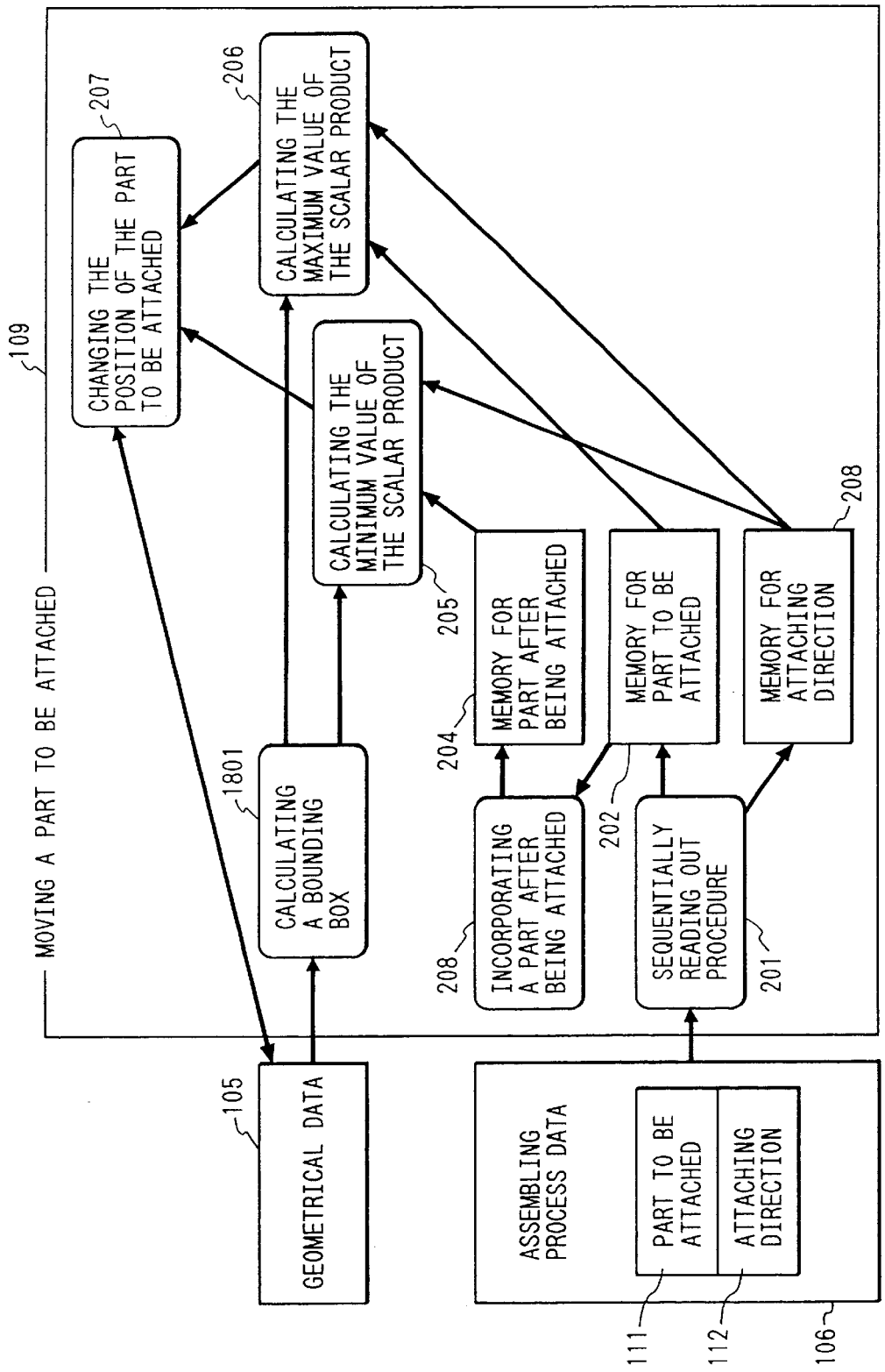
FIG. 18 is a functional block diagram showing the detailed procedure for moving a part to be attached in another embodiment of an apparatus for producing an exploded view according to the present invention.

FIG. 18 shows the construction of a program 109 for calculating a moving amount of a part to be attached to realize the present invention. The program is formed by adding a program 1801 for calculating a bounding box to the program 109 in FIG. 2 for calculating a moving amount of a part to be attached. The program 1801 for calculating a bounding box obtains a polyhedron containing the geometry of a part with reference to the geometrical data 105.

The program 205 for calculating the minimum value of a scalar product reads out a bounding box, corresponding to the part stored in the memory 204 for a part having been attached, from the program 1801 for calculating a bounding box, calculates the scalar product of the coordinate of each vertex and the attaching direction vector stored in the memory area 208 for storing the attaching direction, and obtains the minimum value among these values.

The program 206 for calculating the maximum value of the scalar product reads out a bounding box corresponding to the part stored in the memory 204 for a part having been attached from the program 1801 for calculating a bounding box, calculates the scalar product of the coordinate of each vertex and the attaching direction vector stored in the memory area 208 for storing the attaching direction, and obtains the maximum value among these values. The other parts in FIG. 18 are the same as in FIG. 2.

Figure 19:
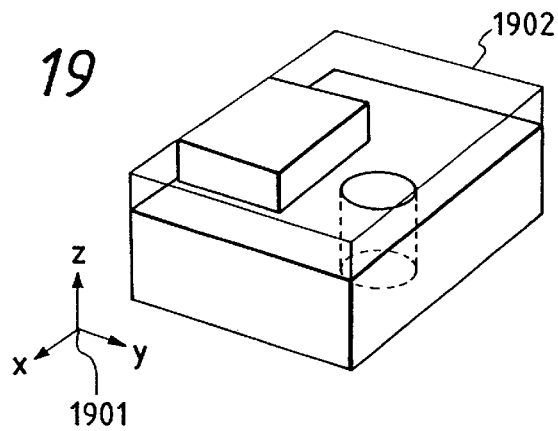
FIG. 19 is a diagram for showing an example of a bounding box containing the geometry of a part.

The bounding box in the form of a polyhedron containing the geometry of a part is, for example, a rectangular block 1902 parallel to the coordinate axes of a coordinate system for a part or assembly as shown in FIG. 19.

In such a bounding box, it is possible to calculate the maximum value and the minimum value in the x-direction of the coordinates of the vertexes and the control points constructing the geometry of a part, the maximum value and the minimum value in the y-direction, and the maximum value and the minimum value in the z-direction, respectively.

The calculation of bounding boxes for all parts may be performed before calculating the moving amounts in advance, or may be performed during calculating moving amounts. And, the bounding boxes may be included in the geometrical data 105.

In this case, the program 1801 for calculating a bounding box is not necessary. Since the bounding box contains the geometry of a part completely, it is possible to obtain an exploded view where all of the parts are separated since the moving amounts of parts to be attached certainly become larger than the moving amounts calculated using the coordinates of vertexes and control points.

Figure 44:
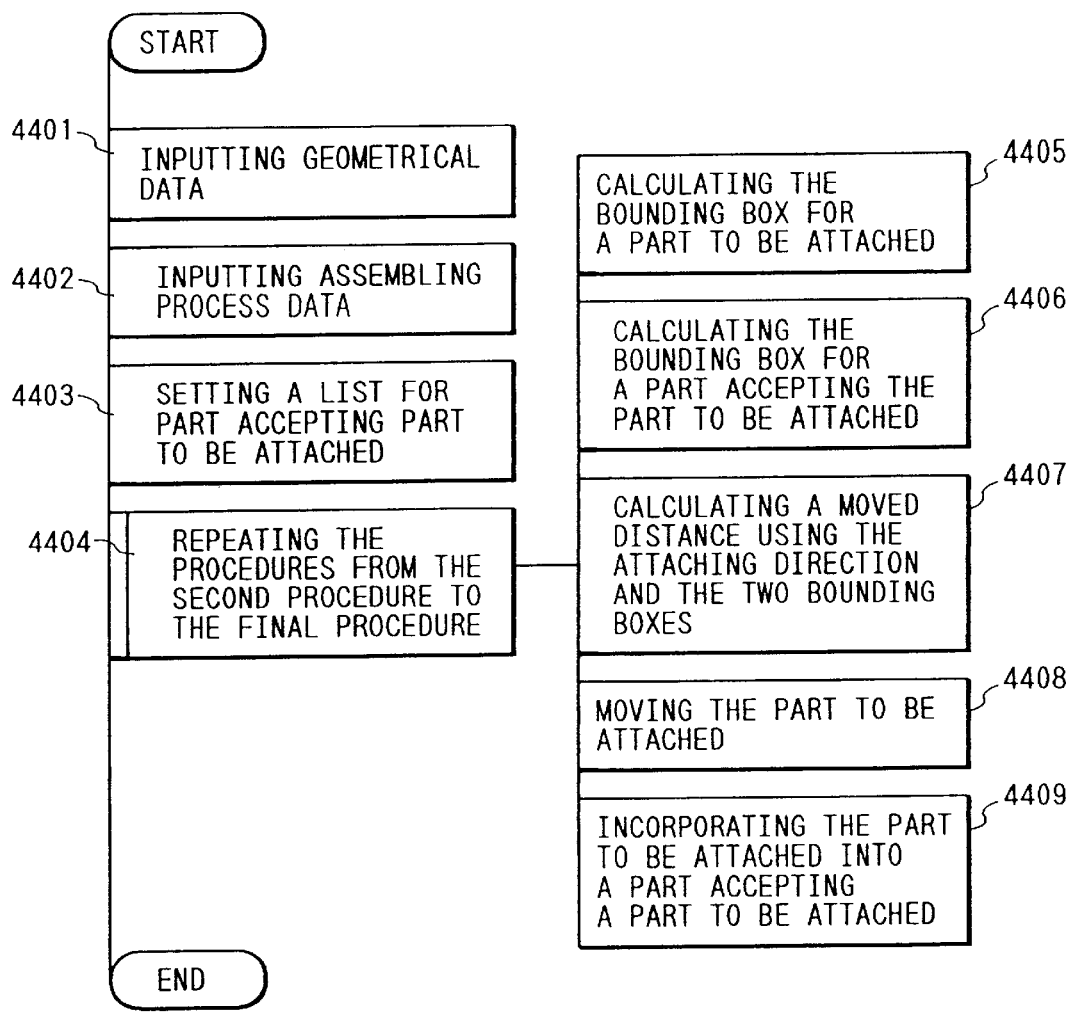
FIG. 44 is a process flow chart of a method of producing an exploded view as shown in FIG. 18.

An embodiment using bounding boxes will be described in detail below. FIG. 44 is a flow-chart showing a procedure for determining an arrangement of parts on an exploded view. In process 4401, geometrical data of parts relating to an object to be assembled and arrangement positions of parts in the state of completion of assembling are fetched.

In process 4402, the assembling process data composed of data indicating the assembling orders of parts and assembling directions is fetched. In process 4403, a list of parts accepting a part to be attached as a list of parts having been attached is emptied once and the part to be attached in the first data of the assembling process data is set in the list of parts accepting part to be attached.

In process 4404, the process 4405 to process 4409 are sequentially repeated for each of the part to be attached in the second data of the assembling process data to the part to be attached in the final data in the assembling order. In process 4405, a bounding box of a part to be attached is calculated. Next, in process 4406, a bounding box containing all the parts in the list of parts accepting a part to be attached is calculated.

In process 4407, using the attaching direction, the bounding box of a part to be attached, the bounding box of a part accepting a part to be attached, and a moving amount of the part to be attached are calculated so that both bounding boxes are adjacent to each other.

In process 4408, the part to be attached is moved in the opposite direction to the attaching direction by the moving amount obtained in process 4407. In process 4409, the name of the part to be attached after completion of moving is added to the list of parts accepting a part to be attached.

Figure 45:
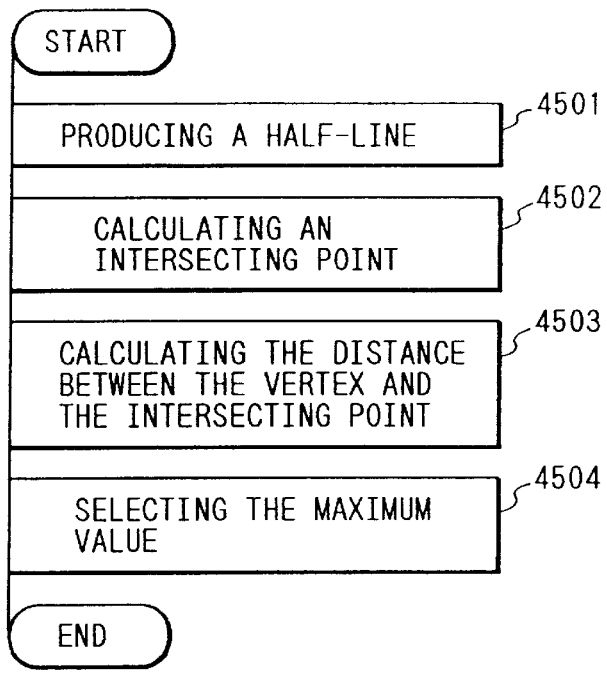
FIG. 45 is a detailed flow chart of the step 4407 in FIG. 44.

FIG. 45 is a detailed flow-chart showing the process 4407. In process 4501, half-lines are drawn, each half-line having a starting point of each vertex of a bounding box of a part to be attached and extending in the opposite direction to the attaching direction. In the case of a two-dimensional view, four half-lines are drawn. In the case of a three-dimensional view, eight half-lines are drawn.

In process 4502, the intersecting points of the half-lines produced in process 4501 with the bounding box of the part accepting a part to be attached are obtained. When a half-line has two intersecting points with the bounding box, the point existing at a farther place from the starting point is employed as the intersecting point.

In process 4503, the distance between the starting point and the intersecting point for each of the half-lines is calculated. When there is no intersecting point, the distance is put to zero. In process 4504, the maximum value among the distances obtained in process 4503 is selected and the maximum value is set as the moving amount.

Figure 46:
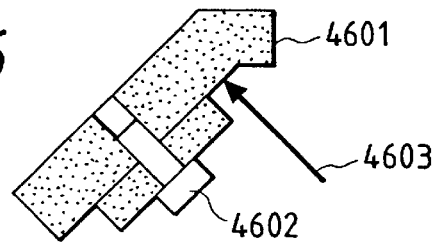
FIG. 46 is a diagram showing an assembled state of an assembly.
Figure 47:
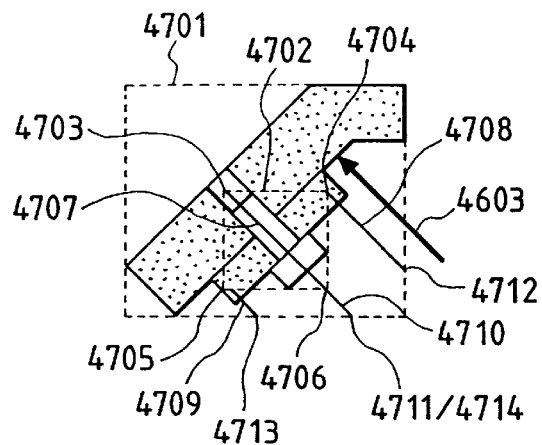
FIG. 47 is a diagram showing an assembled state of an assembly with the addition of bounding boxes and a half-line to the parts to be attached.

FIG. 46 to FIG. 48 show an example of producing an exploded view. FIG. 46 is a view showing an assembly, for explanation, in a completed state. The assembly has such a structure that a bolt 462 is fixed to a plate 4601. Let the bolt 4602 be a part to be attached, the plate 4601 be a part accepting a part to be attached, and the attaching direction of the bolt 4602 be the direction 4603.

The process will be described, referring to FIG. 47 showing information on the bounding box and the half-lines used in calculation. Firstly, in process 4405 and process 4406, a bounding box 4701 of the part accepting a part to be attached and a bounding box 4702 of the part to be attached is calculated.

Next, in process 4501, half-lines 4707, 4708, 4709, 4710 are drawn from the vertexes 4703, 4704, 4705, 4706 of the bounding box 4702 of the part to be attached in the opposite direction to the attaching direction 4603. Next, in process 4502, intersecting points 4711, 4712, 4713, 4714 of the half-lines 4707, 4708, 4709, 4710 and the bounding box 4701 of the part accepting a part to be attached are calculated.

Then, in process 4503, the distances between the starting point and the intersecting point, that is, the vertex 4703 to the intersecting point 4711, the vertex 4704 to the intersecting point 4712, the vertex 4705 to the intersecting point 4713, the vertex 4706 to the intersecting point 4714, are calculated.

Further, in process 4504, the maximum value among the distances between the starting point and the intersecting point, that is, the distance between the vertex 4703 and the intersecting point 4711 in the case of FIG. 47, is determined as a moving amount.

FIG. 48 shows a state where the part to be attached 4602 has been moved in the direction opposite to the attaching direction 4603 by the moving amount 4801 calculated in the process 4408.

As described above, the part to be attached can be placed in such a position that the bounding boxes of the part to be attached and the part accepting a part to be attached do not overlap with each other by using the moving amount calculated through the process flow shown in FIG. 45.

Therefore, the part to be attached and the part accepting a part to be attached can be arranged separately from each other. By applying this process in the order of assembling procedure, an exploded view of a whole assembly can be automatically produced.

Figure 20:
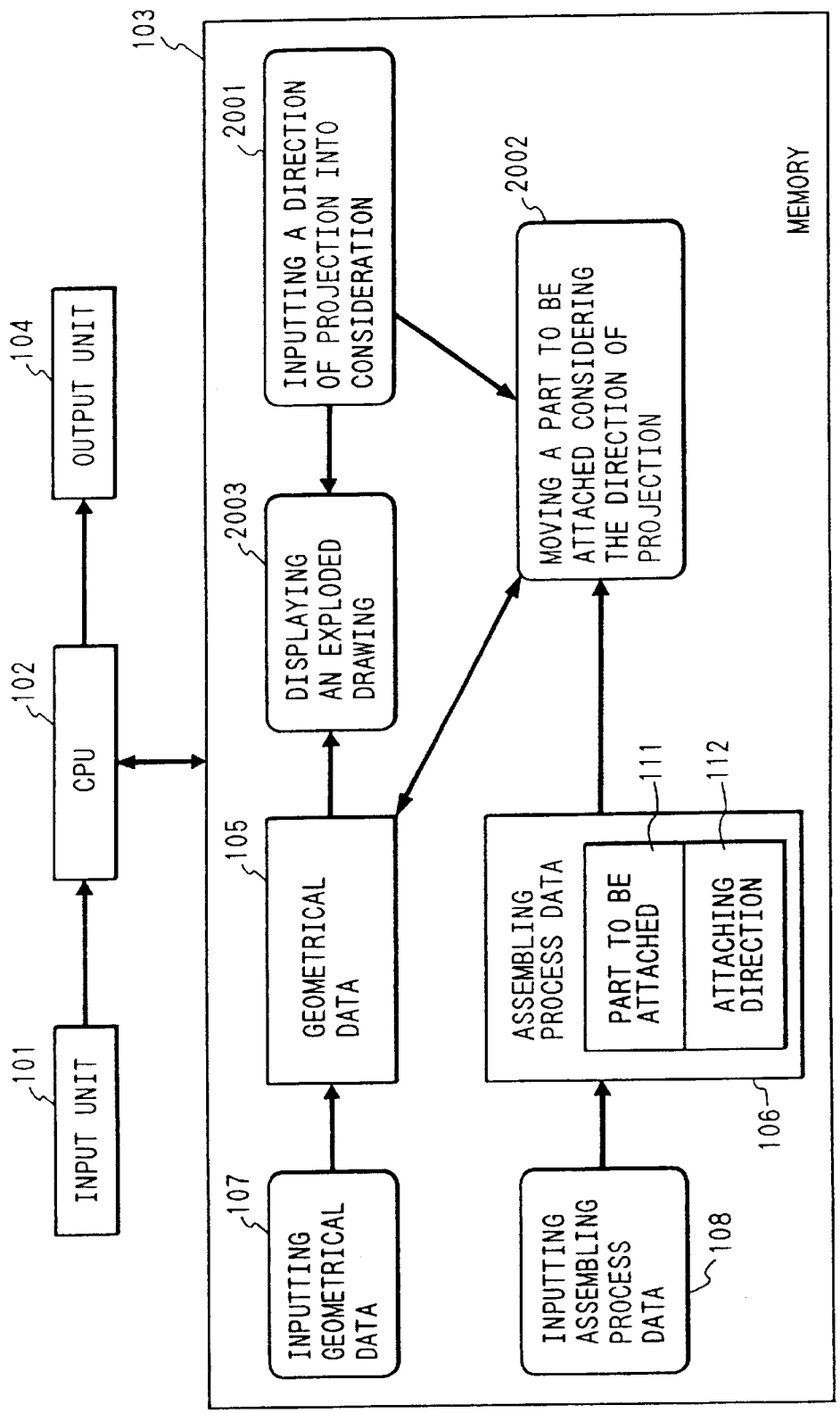
FIG. 20 is a block diagram showing the structure of an apparatus for producing an exploded view according to the present invention.

A further embodiment of the present invention will be described below. FIG. 20 is a diagram showing the structure of an apparatus for producing an exploded view, which is modified from that in FIG. 1, where a program 2001 for inputting a direction of projection is added, the program 109 for moving a part to be attached is changed to a program 2002 for moving a part to be attached, considering the direction of projection, and the program 110 for displaying an exploded view is changed to a program 2003 for displaying an exploded view which displays the view in the direction of projection input from the program 2001 for inputting the direction of projection.

The program 2001 for inputting direction of direction of projection receives a vector of direction of projection from an operator's instruction through the input unit 101 or from another program or central processing unit.

The program 2002 for moving a part to be attached considering the direction of projection receives the vector of the direction of projection from the program 2001 for inputting the direction of projection, determines a moving amount of a part using the geometrical data 105 of the part to be attached, the assembling process data 106 and the vector of the direction of projection, changes the position of the part read out from the geometrical data 105 and then writes it in the geometrical data.

Figure 21:
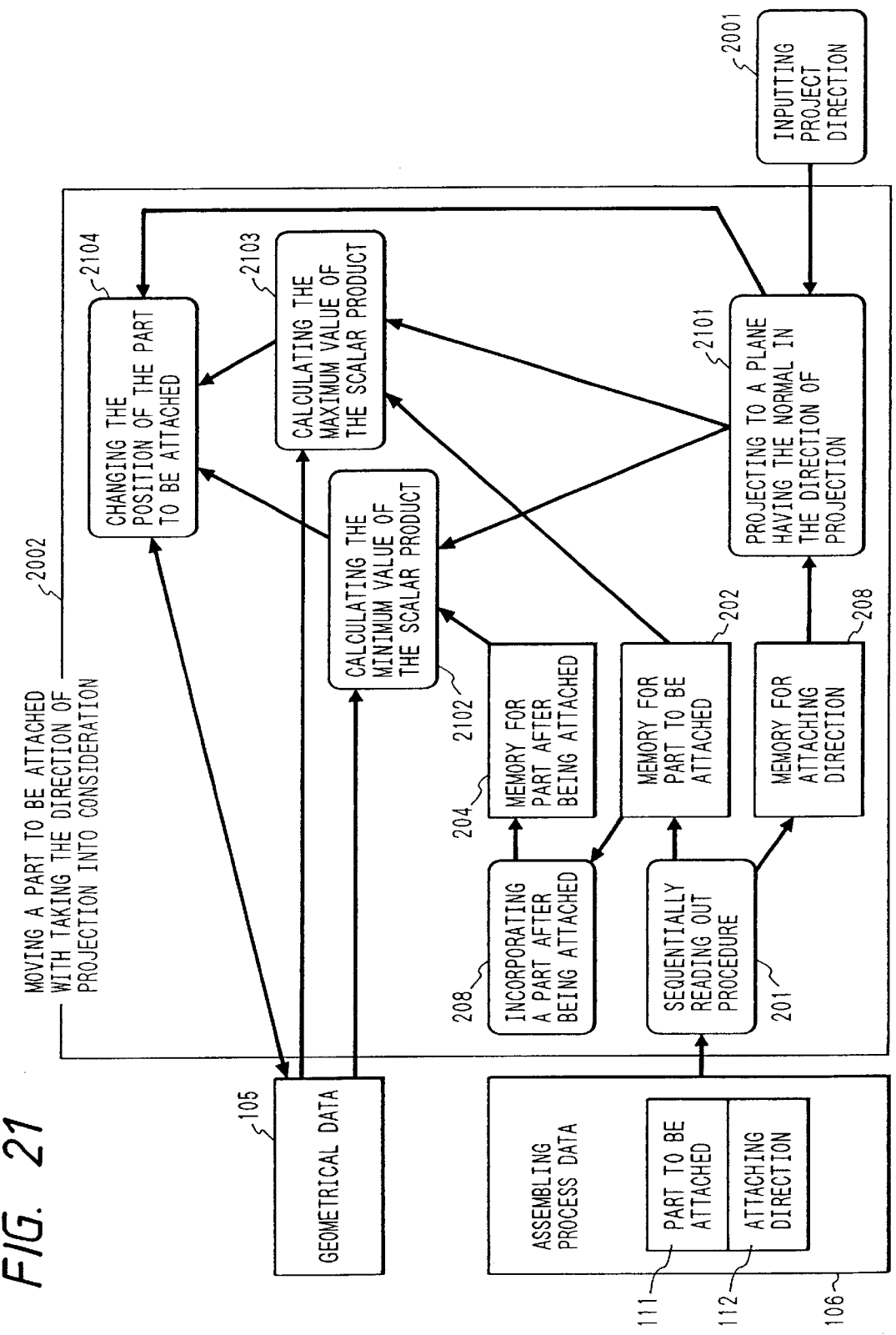
FIG. 21 is a functional block diagram showing the detailed procedure for moving a part to be attached using the apparatus of FIG. 20.

FIG. 21 is a diagram showing an embodiment of a program 2002 for moving a part to be attached considering a direction of projection. A program 201 for sequentially reading-out a procedure reads out assembling procedures in the assembling process data area 106 one by one, and stores it into a memory area 202 for a part to be attached and a memory area 208 for storing an attaching direction.

The attaching direction 112 indicates the direction when a part having been attached, and is a unit vector. Let the vector be $V_a$. The memory 204 for a part having been attached stores a list of parts having been attached in the steps of the procedure prior to a certain step of the assembling procedure.

A program 2101 for projecting to a plane having a normal in the direction of projection receives a direction of projection vector $V_e$ from the program 2001 for inputting the direction of projection, reads out an attaching direction vector $V_a$ from the memory 208, and calculates a projected vector $V_p$ of the attaching direction vector $V_a$ with respect to the plane having the direction of projection vector $V_e$ as a normal using the following equation (3).

$$V_p=(V_e\times V_a)/|V_e\times V_a|\times V_e \qquad (3)$$

The program 2102 for calculating the minimum value of a scalar product reads out the list of parts having been attached from the memory 204 for a part having been attached, calculates the scalar products of the vertex coordinates of the parts and the projected vector $V_p$, and calculates the minimum value among them. Let the minimum value be $D_{min}$.

The program 2103 for calculating the maximum value of a scalar product reads out a part to be attached from the memory area 202 for a part to be attached, extracts the vertex coordinates of the part from the geometrical data 105, and calculates the scalar product of the coordinates and the projected vector $V_p$ to obtain the maximum value among them. Let the maximum value be $D_{max}$.

The program 2104 for changing the position of a part to be attached obtains a vector V for moving the part to be attached using the following equation (4). Therein, the value $D_{const}$ is a gap of certain value determined in advance.

$$V=(D_{min}-D_{max}-D_{const})\times V_a/(V_p-V_a) \qquad (4)$$

Then, the position $M_o$ of the part to be attached is fetched from the geometrical data 105, and multiplied by the moving matrix $M_v$ obtained from the moving vector V to obtain the value M which is written in the geometrical data 105 as a new position of the part. This calculation is performed with the following equation (2).

$$M=M_v\times M_o \qquad (2)$$

The program 208 for adding a part having been attached adds the part to be attached which has changed its position into the memory area 204 for a part having been attached.

Figure 22:
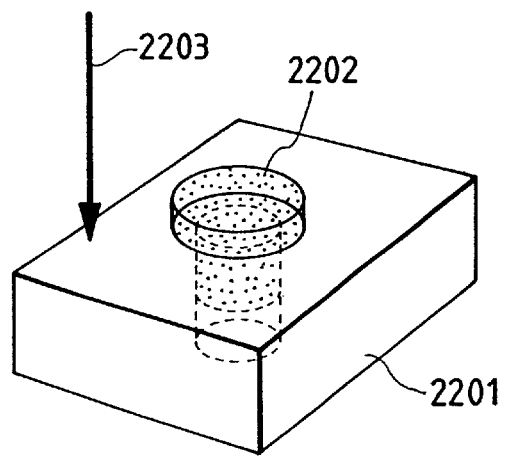
FIG. 22 is a diagram showing an assembled state of an assembly.

Description will be made below on the principle of production of the exploded view with the program 2002 for moving a part to be attached, referring to a detailed example. FIG. 22 shows an assembled state of two parts 2201 and 2202. Let the part 2201 be a part having been attached and the part 2202 be a part to be attached.

A vector 2203 indicates the attaching direction $V_a$ of the part 2202. It is assumed that the direction of projection vector $V_e$ extends perpendicularly to the plane of FIG. 22 from this side to the other side.

Figure 23:
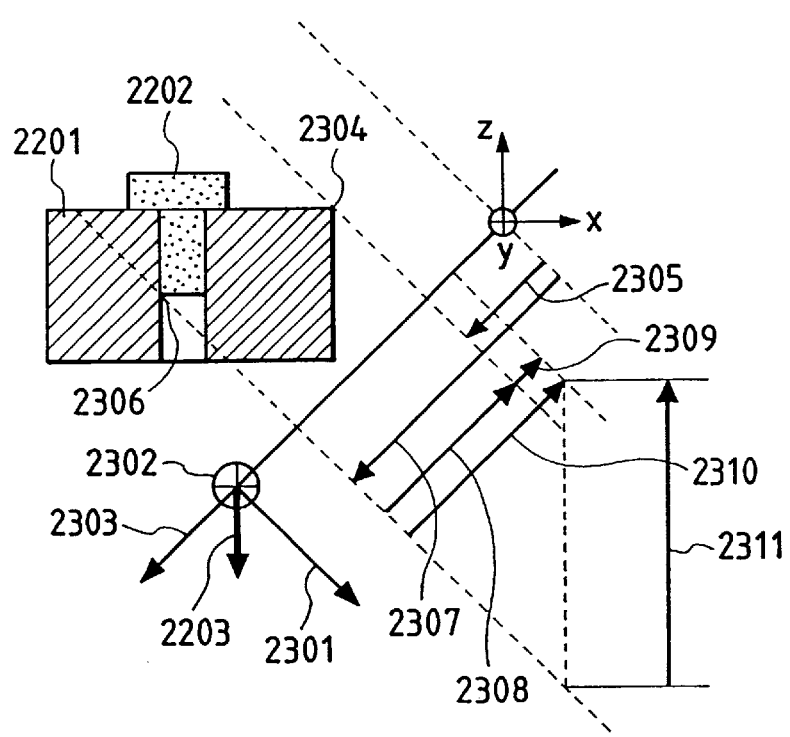
FIG. 23 is a diagram for explaining the operation for moving a part to be attached for the assembly shown in FIG. 22.

FIG. 23 shows the assembly in FIG. 22 as seen from the direction perpendicular to both the direction of projection vector $V_e$ and the attaching direction vector $V_a$. The vector 2301 is the direction of projection vector $V_e$.

Since the direction vector $V_t$ perpendicular to the plane of FIG. 23 is perpendicular to the direction of projection vector $V_e$ and also perpendicular to the attaching direction vector $V_a$, the direction vector $V_t$ is a normalized vector of the vector product of the direction of projection vector $V_e$ and the attaching direction vector $V_a$.

Therefore, the vector $V_t$ can be obtained from the following equation (5).

$$V_t=(V_e\times V_a)/|V_e\times V_a| \qquad (5)$$

Therein, it is assumed that the vector $V_t$ is a vector 2302 directed from this side to the other side of the plane of FIG. 23.

The projected vector $V_p$ of the attaching direction vector $V_a$ to the plane having the direction of projection vector $V_e$ as the normal becomes the direction vector 2303 in FIG. 23.

Since the projected vector $V_p$ 2303 is perpendicular to the vector $V_t$ and also perpendicular to the direction of projection vector $V_e$, the projected vector is calculated as the vector product of the vectors $V_t$ and $V_e$.

However, since the vectors $V_t$ and $V_e$ cross with each other at right angle, there is no need to normalize the vector product. Summarizing the above, the projected vector $V_p$ can be obtained by the following equation (6).

$$V_p=V_t\times V_e=(V_e\times V_a)/|V_e\times V_a|\times V_e \qquad (6)$$

By the program 2102 for calculating the minimum value of a scalar product, the minimum value of the scalar product of the vertex coordinates of the part having been attached 2201 and the projected vector 2303 is obtained.

In the case of FIG. 22, the scalar product of the vertex coordinate 2304 and the projected vector becomes a minimum as shown in FIG. 23, and the value is a magnitude as indicated by the arrow 2305.

On the other hand, by the program 2103 for calculating the maximum value of a scalar product, the maximum value of the scalar product of the vertex coordinates of the part to be attached 2202 and the projected vector 2303 is obtained.

In the case of FIG. 22, the scalar product of the vertex coordinate 2306 and the projected vector 2303 becomes the maximum as shown in FIG. 23, and the value is a magnitude indicated by the arrow 2307. By subtracting the maximum value 2307 from the minimum value 2305 results in a value indicated by the arrow 2308. By subtracting a pre-set constant value 2309 from the value 2308, a vector 2310 is obtained.

Since the vector 2310 is a moving amount of the projected vector, it is necessary to obtain a moving amount which is in the attaching direction and of which the result projected on the projected vector 2303 becomes the vector 2310.

Such a moving amount can be obtained by dividing the moving amount 2310 in the projected direction by the scalar product of the projected vector 2303 and the attaching direction vector 2203. By doing so, the moving amount 2311 can be calculated.

Figure 24:
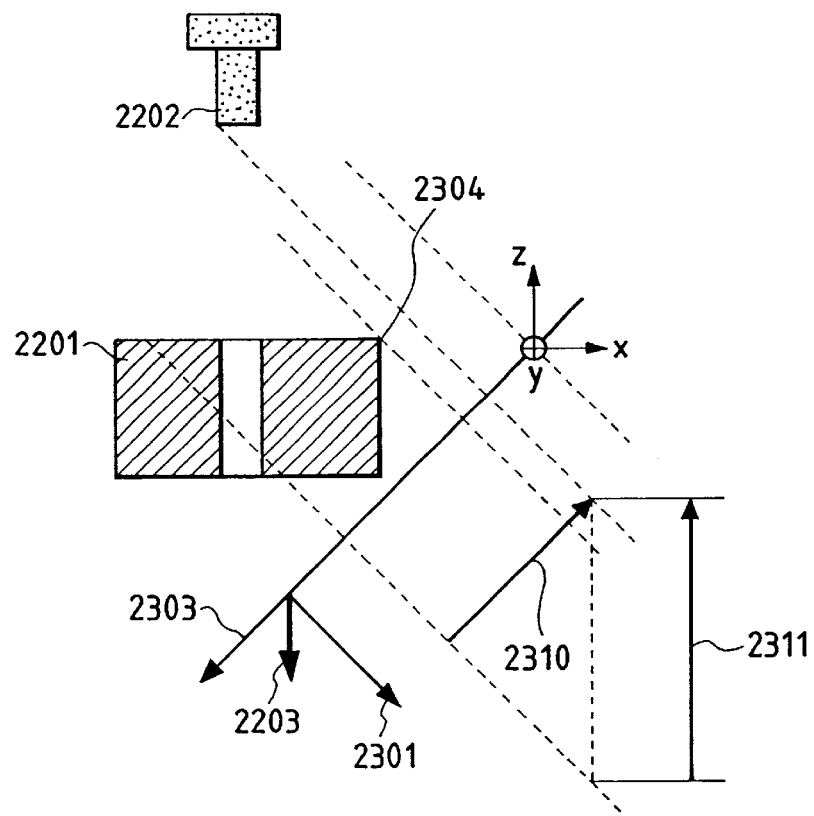
FIG. 24 is a diagram for explaining the operation for moving a part to be attached for the assembly shown in FIG. 22.
Figure 25:
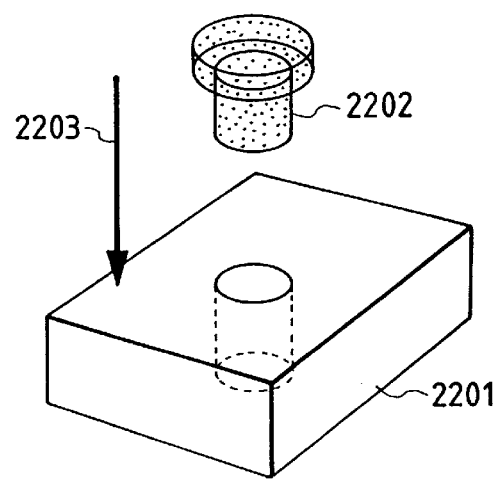
FIG. 25 is a diagram of an exploded view produced by an embodiment according to the present invention.

As the part to be attached 2202 is moved in parallel to the attaching direction 2203 by the moving amount 2311, the feature becomes as shown in FIG. 24, and it is possible to obtain an exploded view in which the part having been attached 2201 and the part to be attached 2202 are separated from each other, as shown in FIG. 25.

Figure 26:
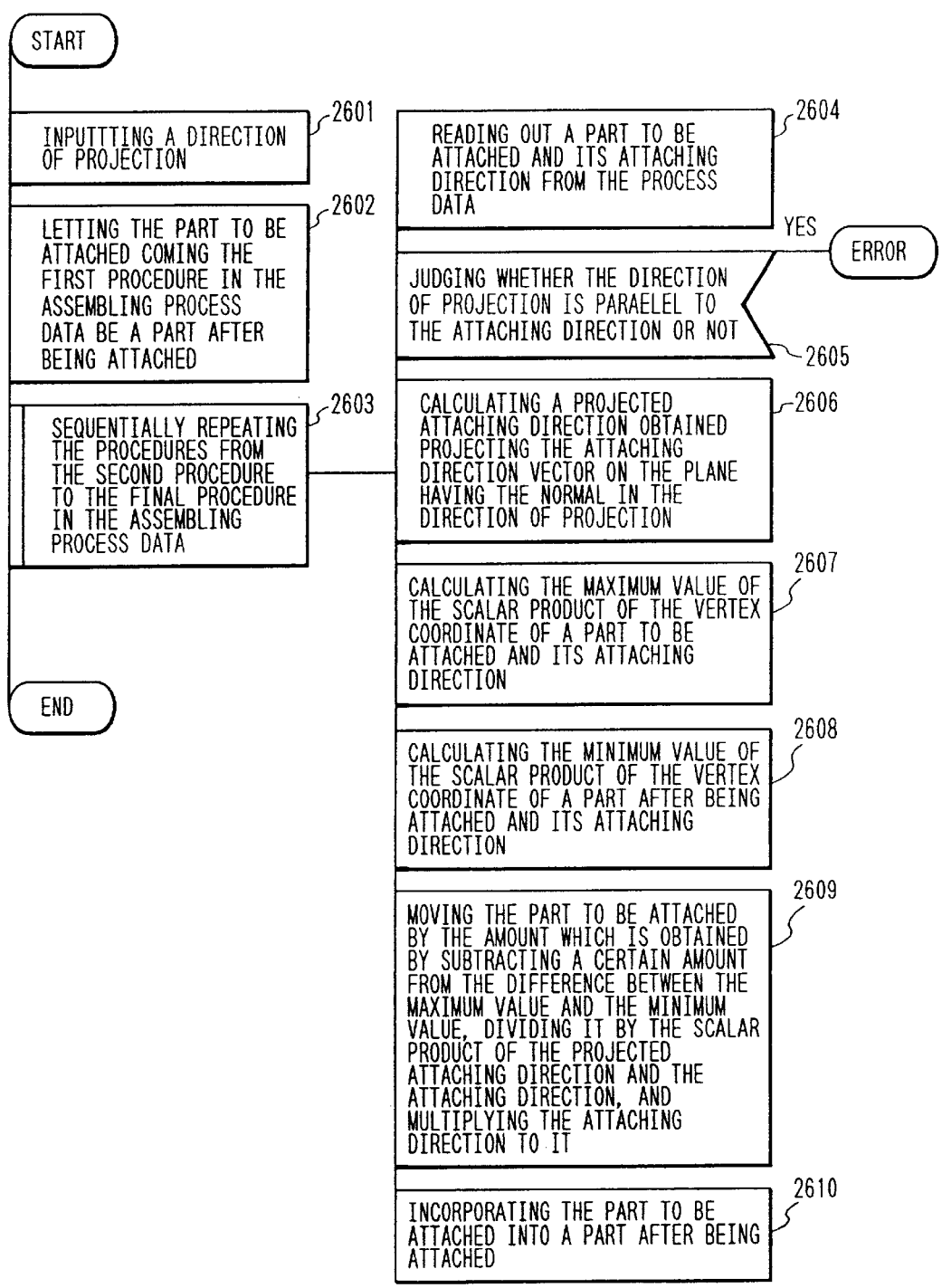
FIG. 26 is a flow chart of the processing procedure for moving a part to be attached as shown in FIG. 22.

FIG. 26 is a flow diagram showing the process of the program for moving a part to be attached while considering the direction of projection.

In process 2601, a direction of projection vector is read out from the program for inputting the direction of projection. In process 2602, a part to be attached in the step of the first procedure in the assembling process data is set as a part having been attached.

In process 2603, the process 2604 to process 2610 are sequentially repeated for each of the second procedure step to the final procedure step. In process 2604, a part to be attached and an attaching direction in the procedure step now are read out from the attaching procedure data.

In process 2605, it is checked whether the direction of projection and the attaching direction are parallel to each other or not. If they are parallel, it is considered as an error, since the vector product becomes zero. In process 2606, the projected attaching direction is calculated using the above equation (6).

In process 2607, all vertex coordinates of the part to be attached are read out from the geometrical data, and the scalar product, of each of the vertex coordinates and the projected attaching direction, and the attaching direction are calculated, and the maximum value is obtained among the values.

In process 2608, all vertex coordinates of the part having been attached are read out from the geometrical data, and the scalar product, of each of the vertex coordinates, and the projected attaching direction are calculated, and the minimum value is obtained among the values.

In process 2609, the part to be attached is moved by the vector which is obtained by subtracting the maximum value and a certain value from the minimum value and by multiplying the attaching direction to the result. The moving vector V can be obtained using the following equation (4).

$$V = (D_{min} - D_{max} - D_{const}) \times V_a / (V_p \cdot V_a) \quad (4)$$

where $D_{min}$ is the minimum value obtained in process 2608, $D_{max}$ is the maximum value obtained in process 2607, $D_{const}$ is a constant value for gap, $V_a$ is the attaching direction vector read out in process 2604, $V_p$ is the projected attaching direction vector obtained in process 2606.

In process 2610, the part to be attached, which was brought into the disassembled state by the moving of the part, is added to the part having been attached.

Although in the embodiment the coordinates of vertexes are used in the calculation of the scalar products with the projected vector, in a case of a curved surface, the coordinates of the control points of the curved surface may be used in the calculation together with the coordinates of the vertexes.

Further, the coordinates of the vertexes of a bounding box as a polyhedron containing the geometry of a part may be used instead of using the vertexes or the control points.

Figure 27:
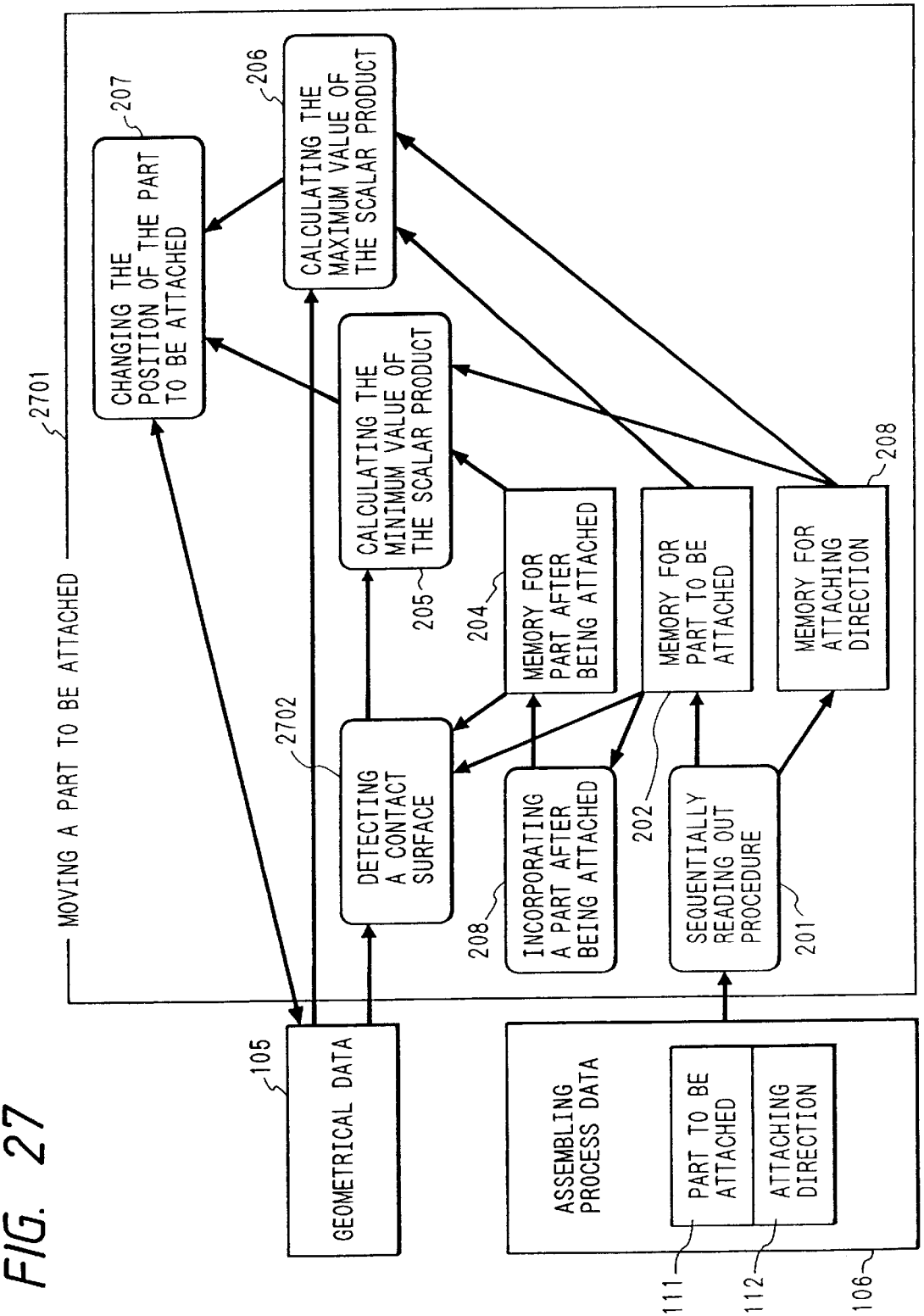
FIG. 27 is a functional block diagram showing the detailed for moving a part to be attached in another embodiment of an apparatus for producing an exploded view according to the present invention.

FIG. 27 shows the detailed construction 2701 of a further embodiment of a program 109 for moving a part to be attached in FIG. 1 and FIG. 2.

A program 201 for sequentially reading-out a procedure reads out assembling procedures in the assembling process data area 106 one by one, and stores them into a memory area 202 for a part to be attached and a memory area 208 for storing the attaching direction.

The attaching direction 112 indicates the direction when a part to be attached is attached to a part having been attached, and is a unit vector. Let the vector be $V_a$. The memory 204 for a part having been attached stores a list of parts having been attached in the steps of a procedure prior to a certain step of the assembling procedure.

A program 2702 for detecting a contact surface reads out a part to be attached from the memory area 202 for a part to be attached, and reads out a part having been attached from the program 204 for a part having been attached, and detects the contact surface between the part to be attached and the part having been attached by referring to the geometrical data 105.

The program 205 for calculating the minimum value of a scalar product reads out the contact surface between the part to be attached and the part having been attached from the program 2702 for detecting a contact surface, calculates the scalar products of the vertex coordinates of the contact surface and the attaching direction, and calculates the minimum value among them.

Let the minimum value be $D_{min}$. The program 206 for calculating the maximum value of a scalar product reads out a part to be attached from the memory area 202 for a part to be attached, and extracts the vertex coordinates of the part from the geometrical data 105, and calculates the scalar product of the coordinates and the attaching direction to obtain the maximum value among them. Let the maximum value be $D_{max}$.

The program 207 for changing the position or a part to be attached obtains a vector V for moving the part to be attached using the above equation (1).

Then, the position $M_o$ of the part to be attached is fetched from the geometrical data and multiplied by the moving matrix $M_v$ obtained from the moving vector V to obtain the value M, which is written in the geometrical data as a new position of the part. This calculation is performed with the above equation (2).

The program 208 for adding a part having been attached adds the part to be attached, which has changed its position, into the memory area 204 for a part having been attached.

Description will be made below of the principle of production of an exploded view with the program 2002 for moving a part to be attached, referring to a detailed example.

Figure 28:
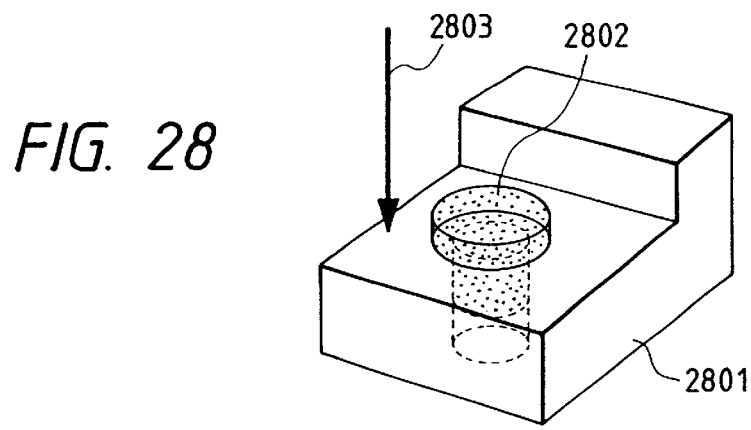
FIG. 28 is a diagram showing an assembled state of an assembly.

FIG. 28 shows an assembled state of two parts 2801 and 2802. Let the part 2801 be a part having been attached, and the part 2802 be a part to be attached. A vector 2803 indicates the attaching direction of the part 2802.

Figure 29:
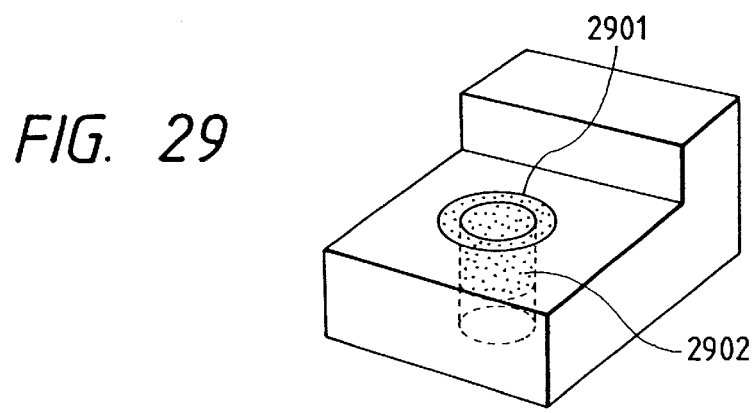
FIG. 29 is a diagram showing an example of a contact surface of an assembly.

Firstly, the program 2702 for detecting a contact surface detects the contact surface between the part 2801 of a part having been attached and the part 2802 of a part to be attached, and obtains a planar contact surface 2901 and a contact surface 2902 of the part 2802, as shown in FIG. 29.

By the program 205 for calculating the minimum value of a scalar product, the minimum value of the scalar product of the vertex coordinates of the surface 2901 and the surface 2902 and the attaching direction 2803 are obtained.

Figure 30:
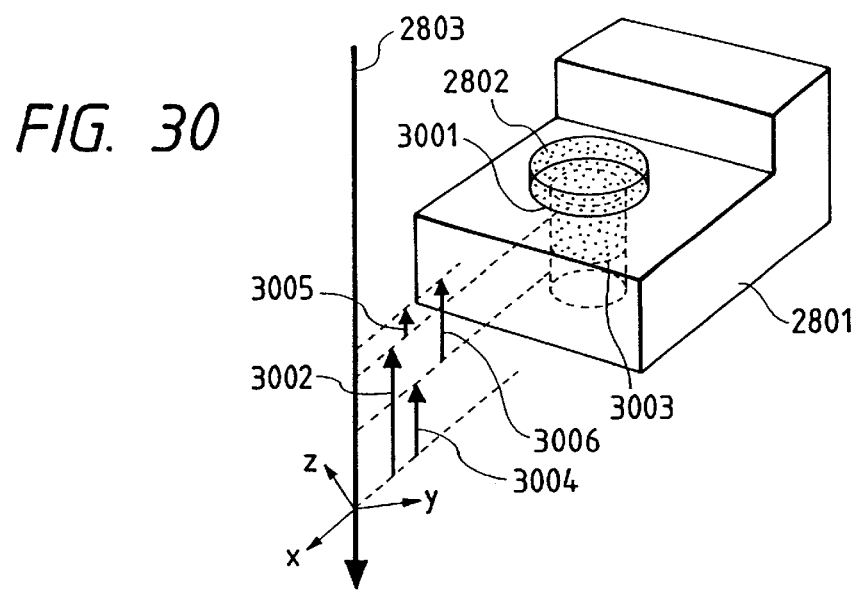
FIG. 30 is a diagram for explaining the operation for moving a part to be attached for the assembly shown in FIG. 27.

In the case of FIG. 29, the scalar product of the vertex coordinate 3001 of the surface 2901 and the direction vector 2803 becomes a minimum, as shown in FIG. 30, and the value has a magnitude indicated by the arrow 3002.

On the other hand, by the program 206 for calculating the maximum value of a scalar product, the maximum value of the scalar product of the vertex coordinates of the part to be attached 2802 and the attaching direction 2803 are obtained.

In the case of FIG. 29, the scalar product of the vertex coordinate 3003 and the attaching direction 2803 become a maximum, as shown in FIG. 30, and the value has a magnitude indicated by the arrow 3004. Then, a moving amount 3006 is obtained by subtracting the maximum value 3004 and a per-set constant value 3005 from the minimum value 3002.

Figure 31:
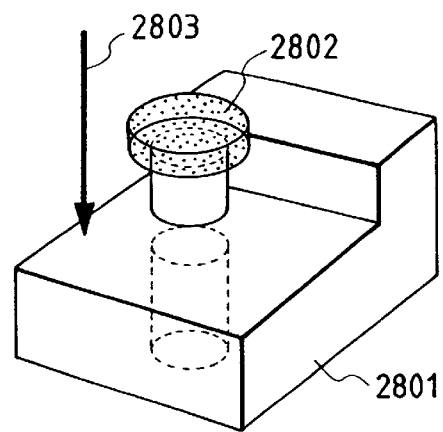
FIG. 31 is a diagram of an exploded view produced by an embodiment according to the present invention.

As the part to be attached 2802 is moved in parallel to the attaching direction 2803 by the moving amount 3006, it is possible to obtain an exploded view in which the part having been attached 2801 and the part to be attached 2802 are separated from each other, as shown in FIG. 31.

Although in the embodiment the coordinates of vertexes of the contact surface are used in the calculation of the scalar products with the projected vector, the coordinates of the control points of the curved surface may be used in the calculation together with the coordinates of the vertexes.

Further, by obtaining a bounding box containing the contact surface in advance, the coordinates of the vertexes of the bounding box may be used instead of using the vertexes or the control points.

Furthermore, by integrating the program for detecting a contact surface in the program 2002 for moving a part to be attached while considering a direction of projection, as shown in FIG. 21, the vertexes of a contact surface may be used in the calculation of the minimum value of the scalar product instead of using the vertexes of parts.

Figure 32:
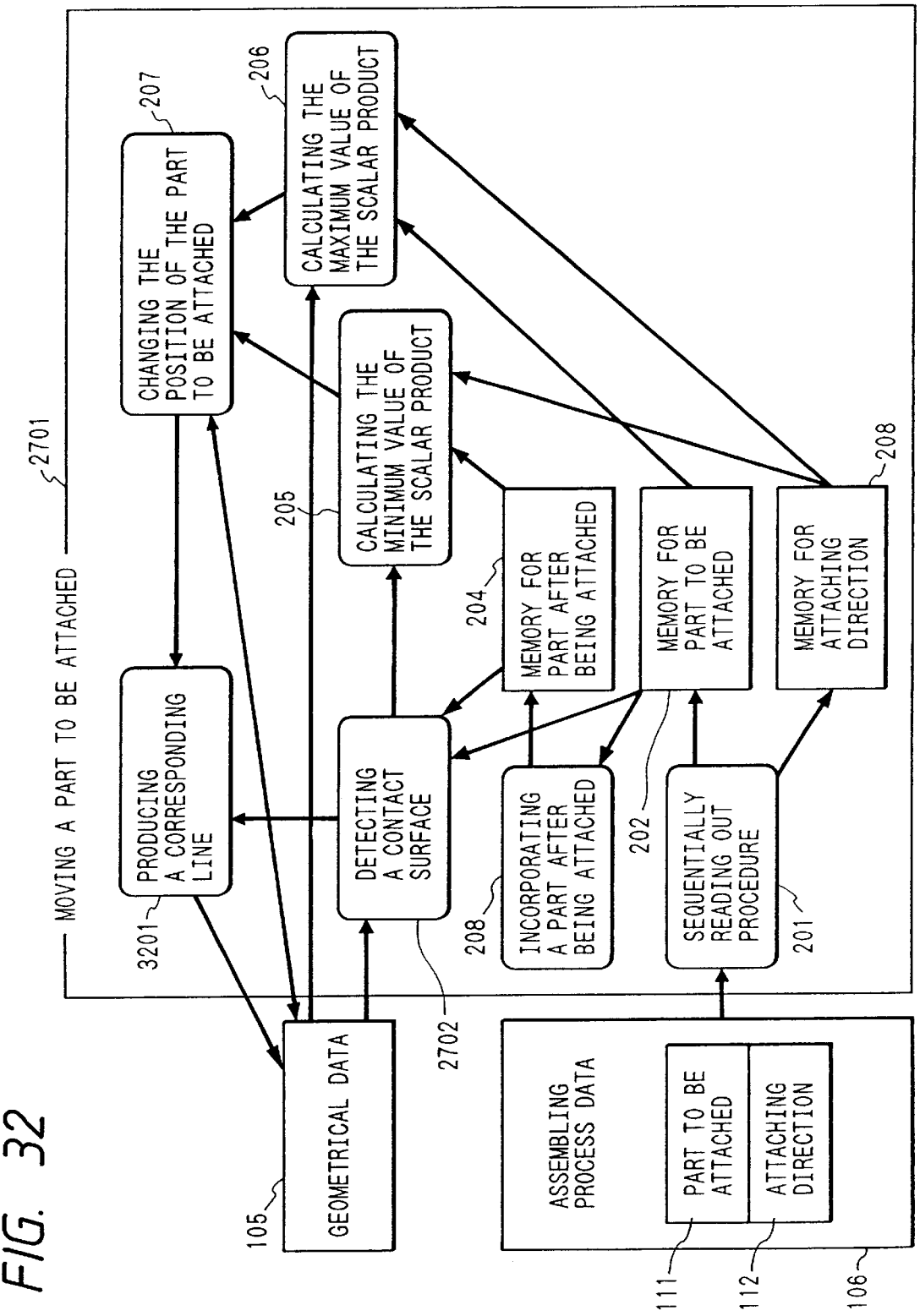
FIG. 32 is a functional block diagram showing the detailed procedure for moving a part to be attached in another embodiment of an apparatus for producing an exploded view according to the present invention.

FIG. 32 shows the structure of a further embodiment according to the present invention. The program in FIG. 32 is supplemental by adding a program 3201 for producing a corresponding line to the program 2701 for moving a part to be attached having the program for detecting a contact surface, as shown in FIG. 27.

The program 3201 for producing a corresponding line produces a corresponding line indicating the correspondence between the contact surface of a part to be attached and the contact surface of a part having been attached. The operation of the program 3201 for producing a corresponding line will be described, referring to FIG. 33 and FIG. 34.

The program 3201 for producing a corresponding line receives data of a contact surface from the program 2702 for detecting a contact surface, and calculates, for example, its center of gravity.

Figure 33:
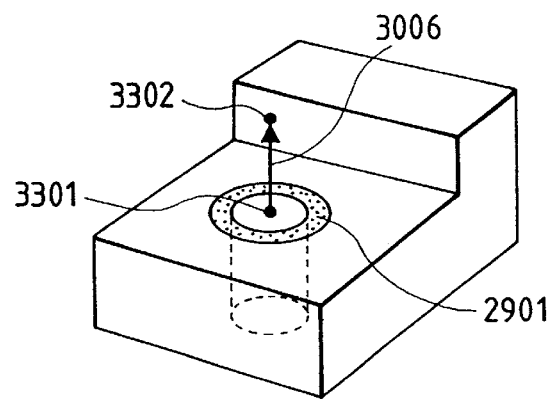
FIG. 33 is a diagram for explaining the principle of producing a corresponding line of contact surfaces.

In the example of FIG. 33, data of a contact surface 2901 is transmitted from the program 2702 for detecting a contact surface to obtain a center of gravity 3301. A moving vector 3006 of a part to be attached is received from the program 207 for changing the position of a part to be attached to obtain a point 3302, where the center of gravity 3301 of the contact surface is moved by the moving vector 3006. And, a line segment connecting between the point 3301 and the point 3302 is added to the geometrical data 105.

Figure 34:
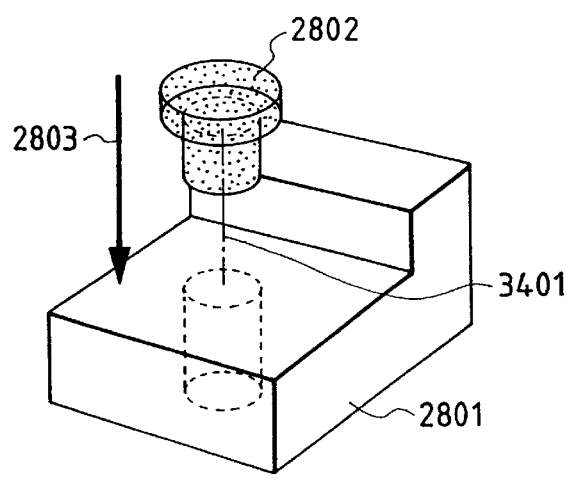
FIG. 34 is a diagram of an exploded view containing a corresponding line produced by an embodiment according to the present invention.

When the line segment is displayed, a corresponding line 3401 indicating the correspondence between the contact surface of a part to be attached and the contact surface of a part having been attached is displayed in an exploded view as shown in FIG. 34.

Although the corresponding line 4301 in FIG. 34 is expressed by a chain line, it may be expressed by a line having a different color or a different width from the line for showing the geometry of the part.

Although, in the aforementioned embodiments, a constant value for gap $D_{const}$ is used in calculating the moving vector of a part to be attached, the gap may be calculated from a direction of projection vector and an attaching direction vector.

Figure 35:
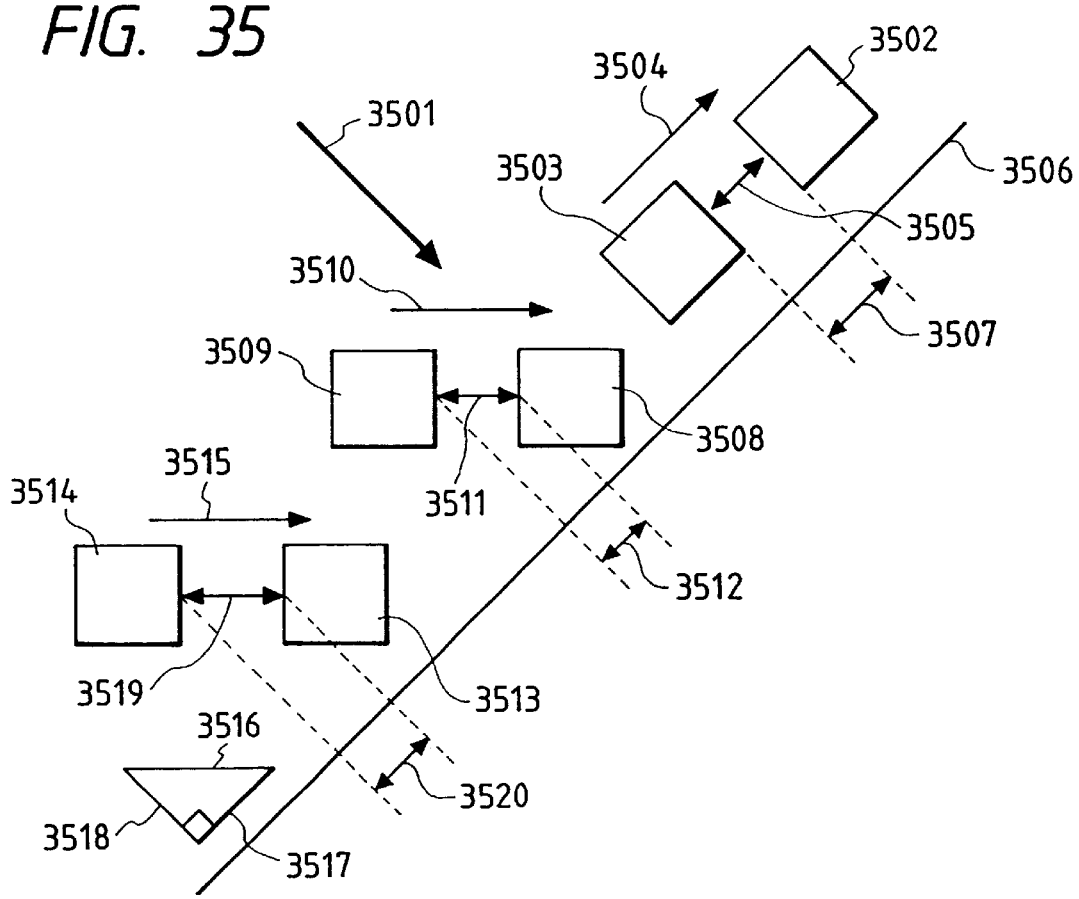
FIG. 35 is a diagram for explaining the principle for the method of determining a gap between parts based on a direction of projection.

FIG. 35 shows examples of a case where the gap between a part to be attached and a part having been attached is a constant and a case where the gap is calculated from a direction of projection vector and an attaching direction vector.

Let the direction of projection be a vector 3501. When a part 3502 and a part 3503 are joined in an attaching direction 3504 to each other, the gap becomes the distance indicated by arrow 3505.

In this case, since the attaching direction 3504 is perpendicular to the direction of projection 3501, the apparent gap 3507 seen from the direction of projection 3501 is equal to the actual gap 3505. However, when a part 3508 and a part 3509 are joined in an attaching direction 3510 to each other, the gap becomes the distance indicated by arrow 3511.

Although the gap 3511 is equal to the gap 3505, the apparent gap 3512 seen from the direction of projection 3501 is smaller than the gap 3507.

When the apparent gap becomes small, it looks as if the parts approach too close to observe an exploded view with ease. The apparent gap becomes small as the attaching direction approaches the parallel to the direction of projection. Therefore, the gap $D_{const}$ is calculated by using, for example, the following equation (7).

$$D_{const} = \frac{C}{1 - (V_a \cdot V_e)^2} \tag{7}$$

Therein, $V_a$ is the attaching direction vector, $V_e$ is the direction of projection vector, C is a positive constant. For example, in FIG. 35, when a part 3513 and a part 3514 are attached to each other in an attaching direction 3515, the apparent length 3517 of a vector 3516 having a unit length parallel to the attaching direction becomes the value of the denominator in the above equation (7) since the length 3518 is the absolute value of the scalar product of $V_a$ and $V_e$.

By calculating the gap 3519 using the above equation (7), the apparent gap 3520, therefore, can be kept constant independently of the relationship between the attaching direction and the direction of projection.

There are some cases where an assembly cannot be assembled by attaching parts one by one due to the structure of the assembly, but the assembly can be assembled by first assembling a sub-assembly composed of plural parts and then attaching it to a part. An embodiment in a case of a sub-assembly will be described below.

FIG. 49 shows such an example of assembly. The assembly in FIG. 49 is composed of three parts 4901, 4902, 4903. Such an assembly cannot be assembled in the order of the parts 4901, 4902, 4903. Firstly, the part 4901 is placed, and the part 4902 and the part 4903 are assembled and then the assembled parts are attached to the part 4901.

The assembling process data for such an assembly can be expressed by, for example, FIG. 50. The level of a part indicates the depth from a root 5101 when the assembling relationship of the assembly is expressed by a tree structure, as shown in FIG. 51.

Therefore, the level for the part 4901 is 1, and the level for the parts 4902 and 4903 is 2, and the level of the sub-assembly assembled with the parts 4902 and 4903 is 1.

FIG. 52 is a flow chart showing an embodiment of the method of producing an exploded view from assembling process data having a sub-assembly in the middle of the assembling procedure according to the present invention. In process 5201, geometrical data is input, the geometrical data being composed of geometries of parts forming an assembly and part positions in the state of completion of assembling.

In process 5202, assembling process data is input, the assembling process data being composed of assembling procedures, parts to be attached, attaching directions and levels of a part, as shown in FIG. 50. In process 5203, a part to be attached in the step of the first procedure in the assembling process data is set to a list for a part accepting a part to be attached.

In process 5204, the process 5205 to the following are sequentially repeated for each of the second part to be attached to the final part to be attached. In process 5205, it is judged whether the part to be assembled is the first part for the sub-assembly or not.

For example, in a case where sub-assembly is expressed by the level of a part, as shown in FIG. 50, if the level of a part to be attached is larger than the level of the immediately preceding part to be attached, the part to be attached is the first part for the sub-assembly.

Therefore, in process 5205, the processing is branched to the direction of YES to perform processes 5206, 5207. If the level of a part to be attached is smaller than the level of the preceding part to be attached, the processing is branched to the direction of NO to perform processes 5208 to 5211.

In process 5207, the contents of a list of parts accepting a part to be attached now is pushed to the stack for storing parts accepting a part to be attached. In process 5207, a list of parts accepting a part to be attached is emptied once and the part to be attached now is set in the list of parts accepting a part to be attached.

In process 5206 and process 5207, the information on the parts having been attached is temporary stored, and thereby the preparation to produce an exploded view for assembling the sub-assembly is completed.

In process 5208, the arrangement positions of the parts to be attached in a disassembled state are calculated using the geometrical data of the part to be attached and the parts accepting a part to be attached, and the attaching directions of the part to be attached. The method of calculation is the same as that described above.

In process 5209, the parts to be attached are arranged in the arrangement positions calculated in the process 5208. In process 5210, it is judged whether the part to be attached now is the final part for assembling the sub-assembly or not. If it is the final part, the processing is branched to process 5211. If the part to be attached now is not the final part for assembling the sub-assembly, the processing is branched to the direction of NO and goes to process 5212.

For example, in a case where the sub-assembly is expressed by the level of a part, as shown in FIG. 50, when the level of the part to be attached now is larger than the level of the previous part to be attached, the part to be attached now is the final part for assembling the sub-assembly.

In process 5211, the parts accepting a part to be attached pushed in the stack for storing part-accepting-part to be attached at the last are popped, and the group of the popped parts are set in the list for part-accepting-part to be attached now.

In process 5212, the part to be attached is added to the list for part-accepting-part to be attached. After completion of applying the process 5205 to all the parts to be attached in the assembling process data by process 5204, the geometrical data after the move is displayed in process 5213. Thereby, an exploded view is displayed.

The stack for storing part-accepting-part to be attached is realized by, for example, a table composed of columns of a stack pointer 5301, a name of part 5303 and a number of parts 5302, as shown in FIG. 53. The stack pointer 5301 stores the number of lists for part-accepting-part to be attached stored now in the stack.

When a list for part-accepting-part to be attached is newly pushed, the value of the stack pointer is incremented by one and a list for the number of parts and the name of a part is stored in a row having the value of the stack pointer after addition as the index, in this case, in the third row 5304.

On the contrary, when a list for part-accepting-part to be attached is popped, a list for the part in a row having the value of the stack pointer 5301 is popped and the row is deleted from the table, and the value in the stack pointer is decremented by one.

In the case of FIG. 53, since the value in the stack pointer is 2, the name of part C is popped from the second row 5305 and the row 5305 is deleted, and the value in the stack pointer 5301 is decremented by 1 and becomes 1. Thereby, a list for a name of part stored in the last place can be obtained in the first place.

The feature of producing an exploded view, in a case where the process in FIG. 52 is applied to the data in FIG. 49 and the assembling process data in FIG. 50, will be described, referring to the figures. In processes 5201, 5202, geometrical data of FIG. 49 and assembling process data of FIG. 50 are input.

By executing process 5203, a part to be attached 4901 in the step of the first procedure in the assembling process data in FIG. 50 is set to a list for part-accepting-part to be attached.

In process 5205, it is judged whether the next part-to-be-assembled 4903 is the first part for the subassembly or not. The level for the preceding part to be assembled 4901 is 1 and the level for the part to be assembled now 4903 is 2.

Since the level for the part to be assembled now is lager than the level for the preceding part to be assembled, it is understood that the part to be assembled now is the first part for assembling a sub-assembly.

And, in process 5206, the contents of the list for part-accepting-part to be attached, in this case, the part 4901, are stored in the stack for part-accepting-part to be attached. And, in process 5204, the part to be attached now 4903 is set as a part accepting a part to be attached.

Then, the processes following the process 5205 are executed for the part to be attached 4902 with the loop in process 5204. Firstly, in process 5205, it is checked whether it is the beginning of assembling a sub-assembly or not. The level for the preceding part to be assembled 4903 and the level for the part to be assembled now 4902 are 2 and therefore the same.

Therefore, since the part to be assembled now is not the first part for assembling the sub-assembly, the processing is branched to the direction of NO and proceeds to process 5208. Therein, an arrangement position in a disassembled state is calculated using the geometrical data of the part to be attached 4902 and the part-accepting-part to be attached 4903 and the attaching direction data for the part to be attached 4902.

FIG. 54 shows the state where the part 4902 is moved in process 5209 based on the calculated result. Next, in process

5210, it is judged whether it is the end of assembling the sub-assembly or not. Since the level of the part 4902 is 2 and the level of the next part to be attached 4902+4903 is 1, the part 4902 is the final part for the sub-assembly.

Therefore, the processing is branched to the direction of YES, and the part 4901 is popped from the stack for part-accepting-part to be attached and set in the list for part-accepting-part to be attached. Then, the processes following the process 5205 are executed for the part to be attached 4902+4903 with the loop in process 5204.

The part to be attached 4902+4903 indicates assembling through attaching the two parts 4902 and 4903 together. In process 5205, the level of the part 4902+4903 is 1 and the level of the preceding part to be attached 4902 is 2.

Therefore, the part 4902+4903 is not the first part for assembling the sub-assembly. Therefore, the processing is branched to the direction of NO and proceeds to process 5208. An arrangement position in a disassembled state is calculated.

Therein, the parts 4902 and 4903 having the positions and geometrical data in the disassembled state calculated in the preceding loop as parts to be attached and the part 4901 as a part-accepting-part to be attached.

Figures 55, 56, 57:
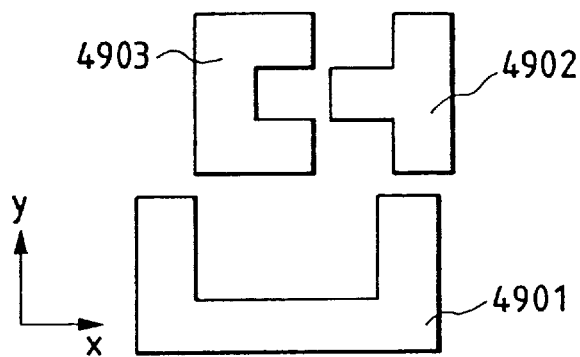
FIG. 55 is a diagram showing the final state of producing an exploded view.
FIG. 56 is a diagram showing the data structure of the assembling procedure for assembling of a sub-assembly.
FIG. 57 is a diagram showing the data structure of the assembling procedure for assembling of a sub-assembly.

In process 5209, the parts 4902 and 4903 are moved. FIG. 55 shows this state. By doing the above, an exploded view having assembling process data for assembling of a sub-assembly can be produced.

As for assembling process data for assembling a sub-assembly, although description has been made of an embodiment where the sub-assembly is expressed by the level of a part, as shown in FIG. 50, it may be possible that a flag indicating the presence and absence of the assembling of a sub-assembly is provided in assembling process data, as shown in FIG. 56, and the flag is set to 0 when there is no assembling of a sub-assembly, while the flag is set to 1 when there is assembling of a sub-assembly.

The assembling procedure for assembling a subassembly is expressed by preparing other assembling process data, as shown in FIG. 56. The correspondence between the part to be attached 4904 with assembling of a sub-assembly in FIG. 56 and the assembling process data for assembling a sub-assembly can be performed by storing the name of a sub-assembly in the assembling process data and by checking the agreement of the part to be attached with the name of the sub-assembly.

In a case of such expression of the assembling process data, the judgement of the beginning of assembling a sub-assembly is performed by determining whether the flag is 1 or not. And, assembling process data having the same name as the name of a part to be attached is retrieved, and the part to be attached retrieved is set as a new part-accepting-part to be attached.

The judgement of the end of the assembling of a subassembly is performed by determining whether the processing reaches the final process of the assembling process data or not.

Figure 36:
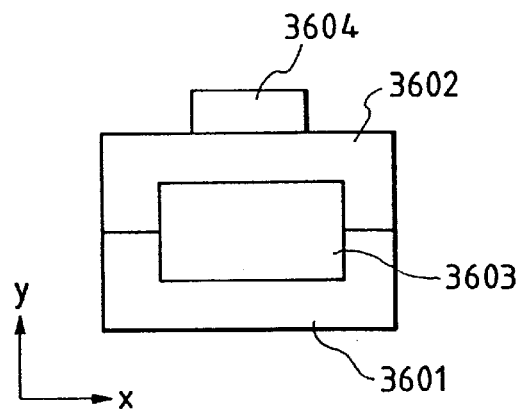
FIG. 36 is a diagram for showing an assembled state of an assembly.

The feature of producing an assembling procedure for an assembly in the apparatus for producing an exploded view shown in FIG. 1 will be described below, using an example. FIG. 36 shows the structure of the assembly to be used in this explanation. The assembly is composed of a part 3601, a part 3602, a part 3603 and a part 3604.

Figures 37, 38, 39:
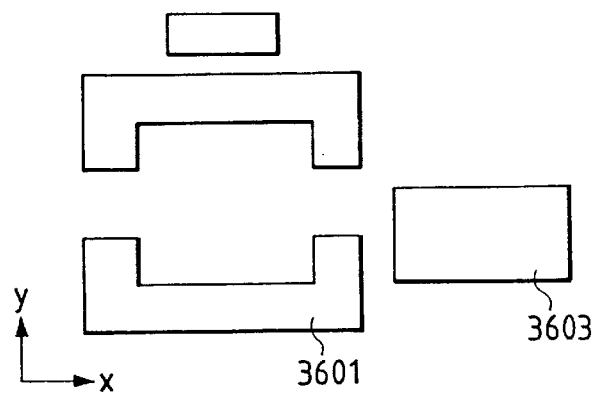
FIG. 37 is a diagram showing the data structure of the assembling process data.
FIG. 38 is a diagram of an exploded view produced by an apparatus according to the present invention.
FIG. 39 is a diagram showing the data structure of the assembling process data.

FIG. 37 shows an example of an assembling procedure input by an operator. In this assembling procedure, the part 3601 is firstly placed, next the part 3602 is attached from an upper side, the part 3603 is attached from the side, and finally the part 3604 is attached from an upper side. An exploded view for the above case is produced by using the apparatus for producing an exploded view according to the present invention, and FIG. 38 is obtained.

The operator looks at FIG. 38 and understands that, when the part 3603 is attached from the side, the part 3601 prevents the part 3603 from being attached. Since the part 3603 is attached to the part 3601 only from the upper side, the operator gives an instruction to the program 109 for inputting an assembling procedure to change the attaching direction 3901 of the part 3603 to provide for attaching from the upper side, as shown in FIG. 39.

Figures 40, 41:
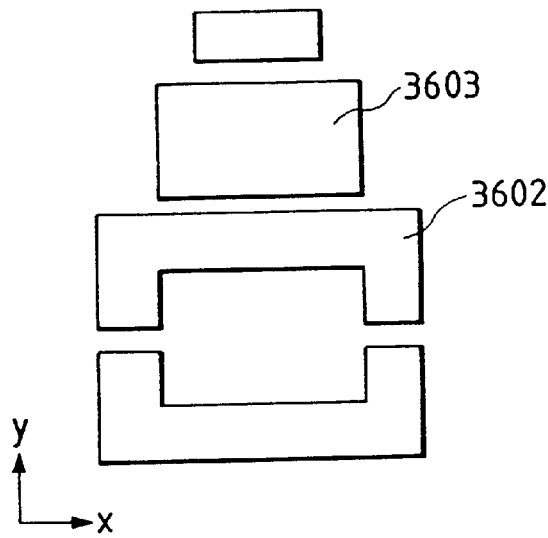
FIG. 40 is a diagram of an exploded view produced by an apparatus according to the present invention.
FIG. 41 is a diagram showing the data structure of the assembling process data.

Based on the assembling procedure of FIG. 39, an exploded view is produced by operating the program 109 for moving a part to be attached, and displayed by the program 110 for displaying an exploded view to get FIG. 40. Looking at FIG. 40, the operator understands that since the part 3603 is attached after attaching the part 3602, the part 3602 prevents the part 3603 from being attached.

Therefore, the operator gives an instruction to the program 108 for inputting an assembling procedure to place the step of attaching procedure 4101 of the part 3603 before the step of attaching procedure 4102 of the part 3602 as seen in FIG. 41.

Figure 42:
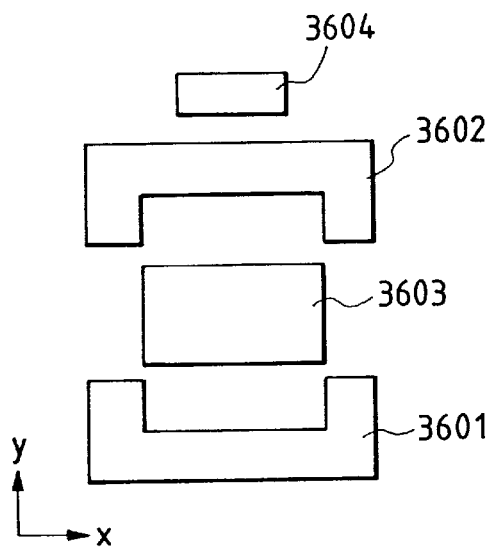
FIG. 42 is a diagram of an exploded view produced by an apparatus according to the present invention.

Based on the assembling procedure of FIG. 41, an exploded view is produced by operating the program 109 for moving the part to be attached, and he exploded view is displayed by the program 110 to get FIG. 42. Looking at FIG. 42, the operator understands that there is no trouble such interference between parts during assembling.

Therewith, a correct assembling procedure can be obtained by repeatedly inputting assembling procedures and forming exploded views.

Figure 58:
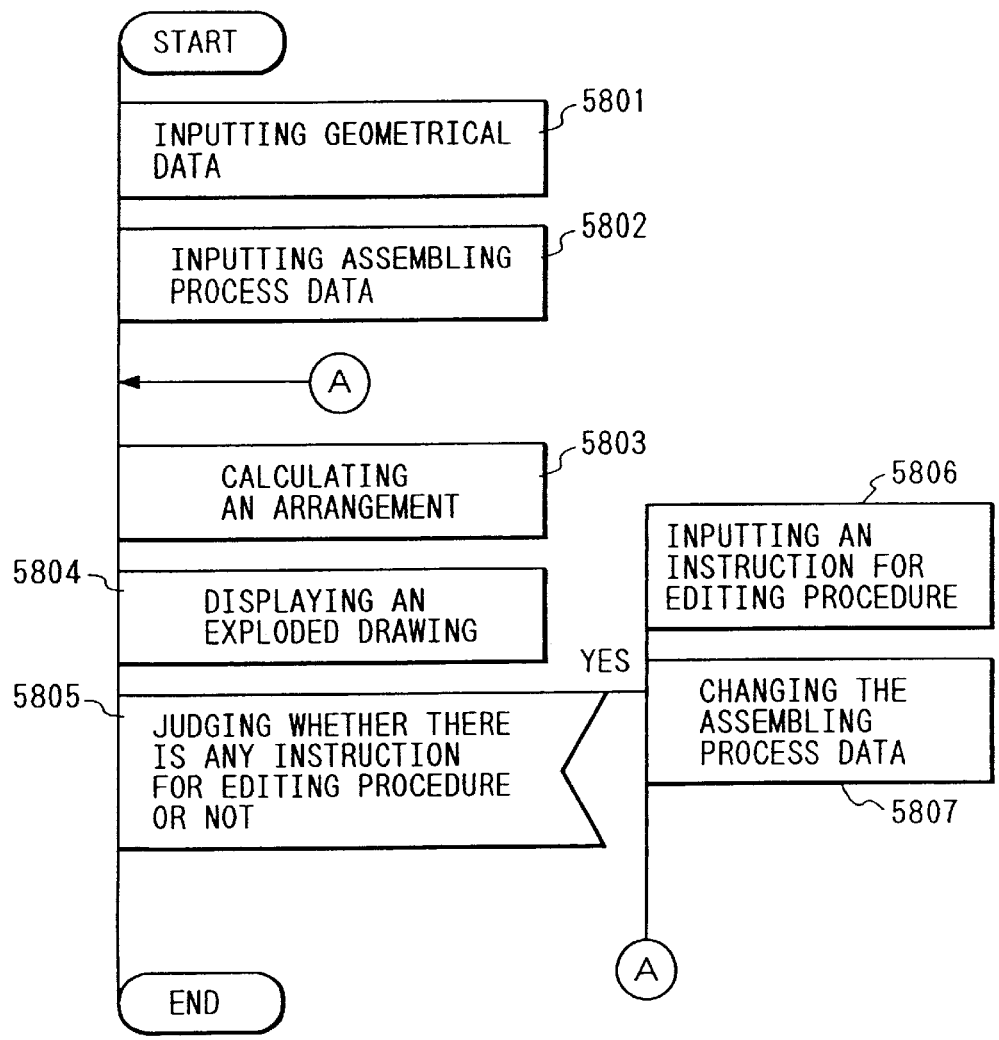
FIG. 58 is a flow chart showing the processing procedure in a case of editing an assembling procedure for producing of an exploded view according to the present invention.

FIG. 58 shows a further embodiment of a method of changing an assembling procedure using an exploded view according to the present invention. In process 5801, geometrical data is input, the geometrical data being composed of geometries of parts composing an assembly of which an exploded view is produced and positions of the parts in a state of completion of assembling.

In process 5802, assembling process data composed of assembling procedures, parts to be attached and attaching directions is input. In process 5803, positions of parts in a disassembled state are calculated using the assembling geometrical data and the assembling process data.

In process 5804, the geometries of parts are displayed in the positions of parts in the disassembled state calculated in process 5803 to display an exploded view. In process 5805, the operator is asked whether there is any change in assembling procedure.

The operator inputs presence or absence of the necessity of change using the input unit, such as a keyboard or mouse. If there is no need for a change, the processing to change the procedure is completed. If there is any need to effect a change, process 5806 is executed. In process 5806, the instruction for changing the procedure is requested of the operator.

The operator inputs the parts required change and the contents of the change using the key-board or the mouse. When instructing plural parts to be changed, in process 5807, the assembling procedure is changed based on the changing instruction input by the operator. As for the changing instruction, there is an instruction, for example, to specify two parts and exchange the assembling orders of the parts.

As another example, there is an instruction to sequentially specify plural parts to be changed and then to insert procedures in the specified order before or after parts specified separately.

Figure 59:
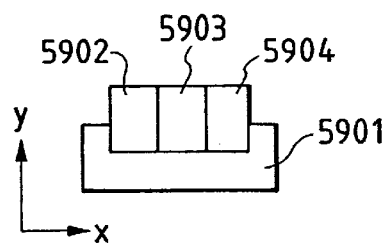
FIG. 59 is a diagram showing an assembled state of an assembly.

FIG. 59 to FIG. 63 show an embodiment of the method of editing the assembling procedure shown in FIG. 58. FIG. 59 shows an example of geometrical data input in process 5801. In this example, the assembly is composed of four parts 5901, 5902, 5903, 5904.

Figures 60, 61:
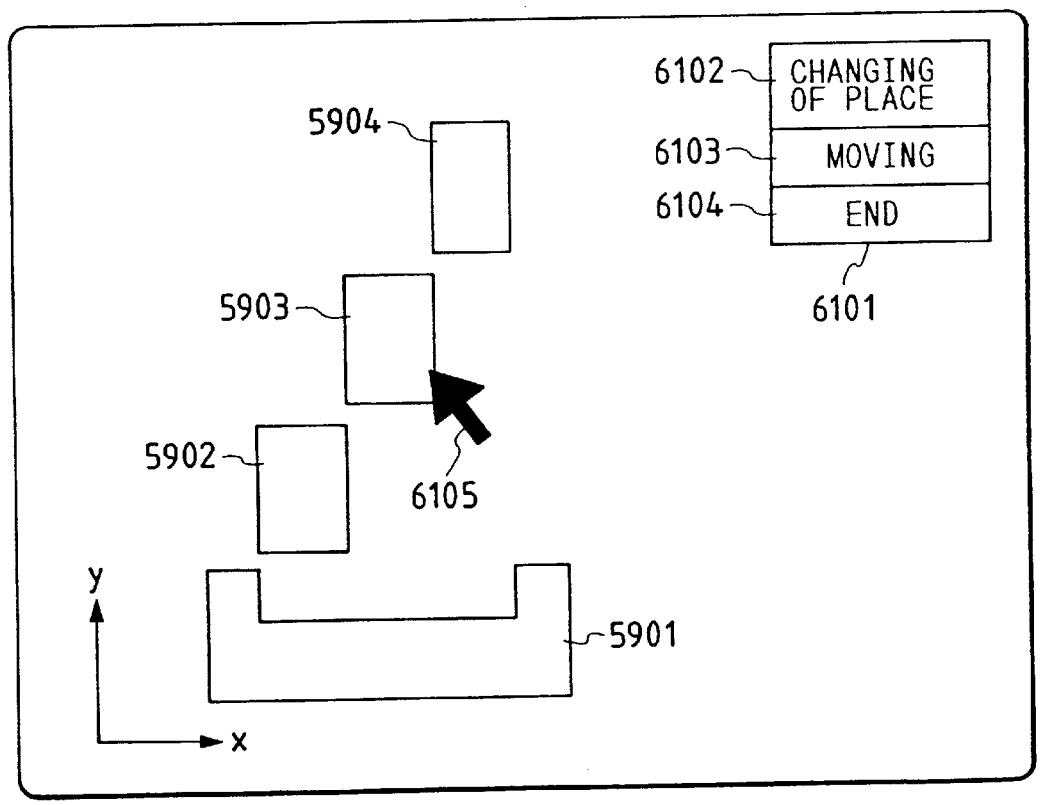
FIG. 60 is a diagram showing the data structure of assembling process data.
FIG. 61 is a diagram for explaining the method of instructing assembling procedure editing on an exploded view.

FIG. 60 shows an example of assembling process data input in process 5802. The assembling process data expresses an assembling procedure in which firstly the part 5901 is placed, next the part 5902 is attached from the direction of the −Y axis, then the part 5903 is attached from the direction of the −Y axis, and finally the part 5904 is attached from the direction of the −Y axis.

FIG. 61 shows an exploded view produced by the process 5801 and the process 5804. A menu 6101 for changing the assembling procedure is displayed by process 5805, and the operator selects a command 6102 for exchanging parts using, for example, a mouse.

By doing so, control shifts to process 5806, an instruction for changing is input. In a case of, for example, exchanging, two parts 5903 and 5904 are specified. Then, the orders of the part 5902 and the part 5903 in the data for the assembling procedure are exchanged by the process 5807.

Figures 62, 63:
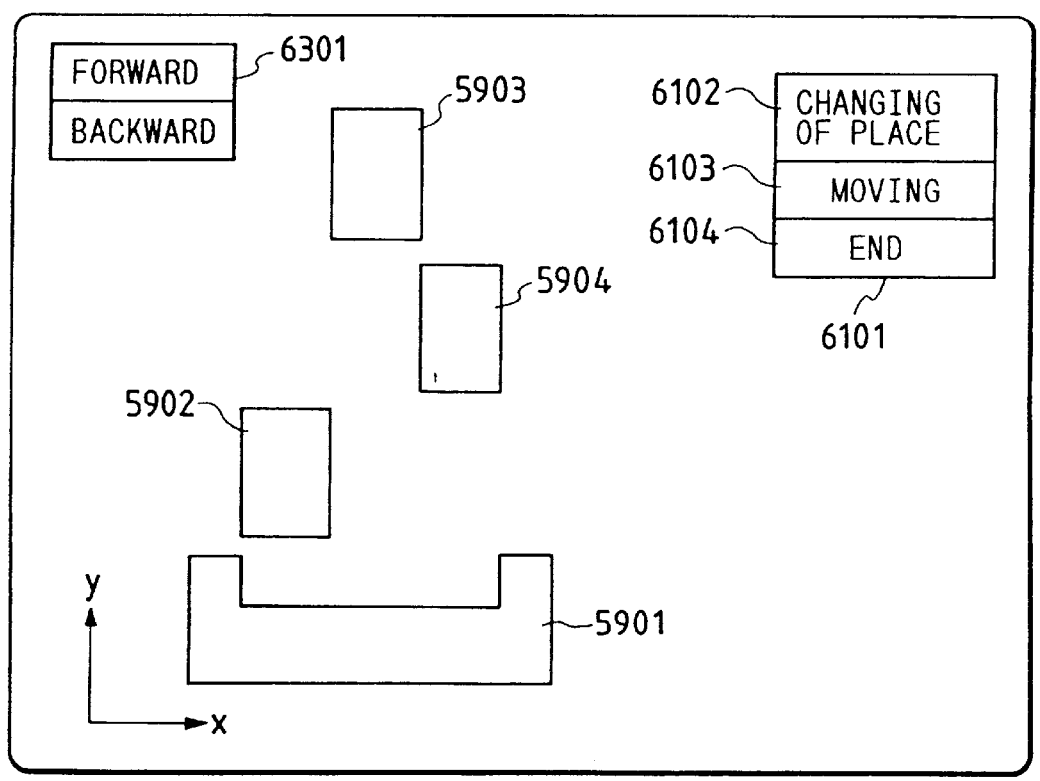
FIG. 62 is a diagram showing the data structure of assembling process data after completion of assembling procedure editing.
FIG. 63 is a diagram showing an exploded view after completion of assembling procedure editing.

FIG. 62 shows the data for the assembling procedure after the change. In process 5803, arrangement positions are calculated using the data for the assembling procedure after the change and the geometrical data input in process 5801. The result is displayed in process 5804, as shown in FIG. 63. After displaying the exploded view after the change, a menu 6101 for changing the assembling procedure is again displayed by process 5805.

Therein, as the operator selects the command 6103 for moving a part, a changing instruction is input from process 5806. In a case of the moving command, a part to be moved in order and a part accepting the moved part are specified on the exploded view, and whether the moved part is inserted before or after the accepting part is instructed through the menu.

For example, in FIG. 63, the part 5903 and the part 5904 are specified in this order as parts to be changed in order, and then the part 5902 is specified as a part accepting the moved part. Then "before" is selected through the menu 6301. In process 5807, the part 5903 and the part 5904 in this order are moved before the part 5902 according to the instruction input in process 5806, and, as a result, the assembling process data shown in FIG. 64 is obtained.

Figures 64, 65:
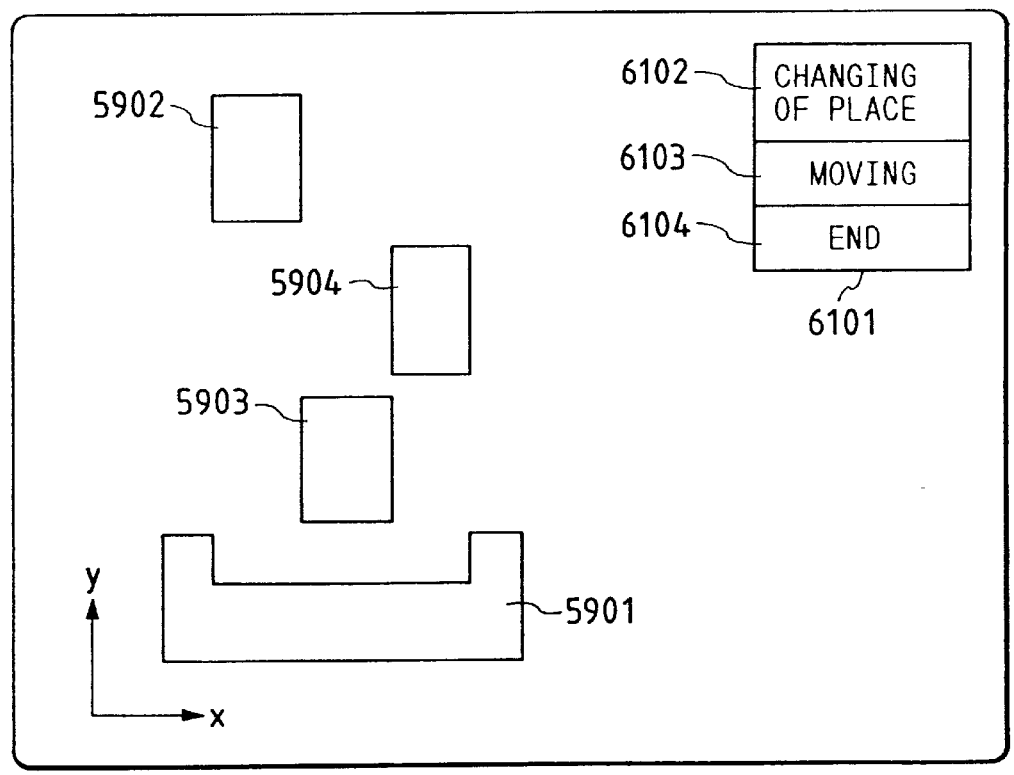
FIG. 64 is a diagram showing the data structure of assembling process data after completion of assembling procedure editing.
FIG. 65 is a diagram showing an exploded view after completion of assembling procedure editing.

Based on the data for the assembling procedure in FIG. 64 and the geometrical data and the arrangement data in FIG. 59, arrangement positions are calculated in process 5803. And, in process 5804, the resultant data is displayed to obtain an exploded view, as shown in FIG. 65.

In process 5805, the menu 6101 is displayed. If the operator determines that there is no need to change the assembling procedure further, the end 6104 is selected to complete the editing processing.

As described above, by editing an assembling procedure using an exploded view, it becomes easy to indicate a part since parts are disassembled and to understand the assembling procedure since parts are arranged in an assembling procedure order. Therefore, it is easier to change the assembling procedure order based on an exploded view than to change the assembling procedure order based on an assembly in a complete assembled state.

According to the aforementioned embodiments of the present invention, there is an effect to decrease man-power to produce an exploded view since the exploded view can be automatically produced so long as geometrical data and assembling process data are available.

By using vertex coordinates of a bounding box containing the geometry of a part instead of using coordinates of vertexes or control points of the geometry of part, it is possible to make an exploded view in a short time since calculations of six scalar products, at the most, of vertex coordinates and attaching direction vectors per part are sufficient.

By using the direction of projection of an exploded view in calculating the required amount of movement of a part to be attached, it is possible to produce an exploded view which is easily understandable, since it is possible to produce the view where the disassembled parts do not apparently overlap with each other in the exploded view.

By using the direction of projection of an exploded view in calculating the amount of movement a part to be attached, it is possible to produce an exploded view which is easily understandable, since it is possible to produce the view where the disassembled parts are apparently spaced by the same distance from one another in the exploded view.

In accordance with this invention, it is possible to produce an exploded view which is easily understandable, since it is possible to connect the surfaces to be in contact with each other in an assembled state with a line-segment in the exploded view.

Thus, it is possible to easily make a plan for an assembling procedure in the manufacturing of products, since less effort is expended in inputting assembling process data for displaying an exploded view, detecting a defective condition by looking at the exploded view and correcting the assembling process data, and consequently the exploded view can be easily produced.

According to the present invention, the man-power for producing an exploded view can be decreased by automatically producing an exploded view and by eliminating the work to move a part by instructing the moving direction and the moving amount, part by part, which has been performed by an operator in the past.

A further embodiment of the present invention will be described below, referring to the accompanying drawings.

Figure 66:
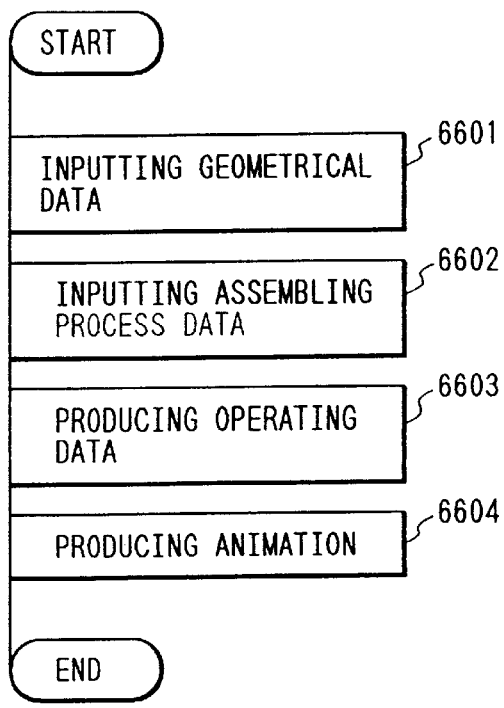
FIG. 66 is a flow-chart showing the basic procedure of a method for producing animation of an assembling procedure according to the present invention.

FIG. 66 is a flow-chart showing the process procedure of a method for producing animation of an assembling procedure according to the present invention. Firstly, in process 6601, geometrical data for each part in an assembled model of a product is input.

Next, in process 6602, assembling procedure data is input. The assembling procedure data consists of data sets each specifying a part to be attached and an attaching direction, and the order of inputting the data sets is the order of attaching.

Then, in process 6603, operating data is produced from the geometrical data input in process 6601 and the assembling procedure data input in process 6601. Finally, in process 6604, an animation is produced using the operating data produced in process 6603 as input parameters and the animation of the assembling procedure is displayed.

Figure 67:
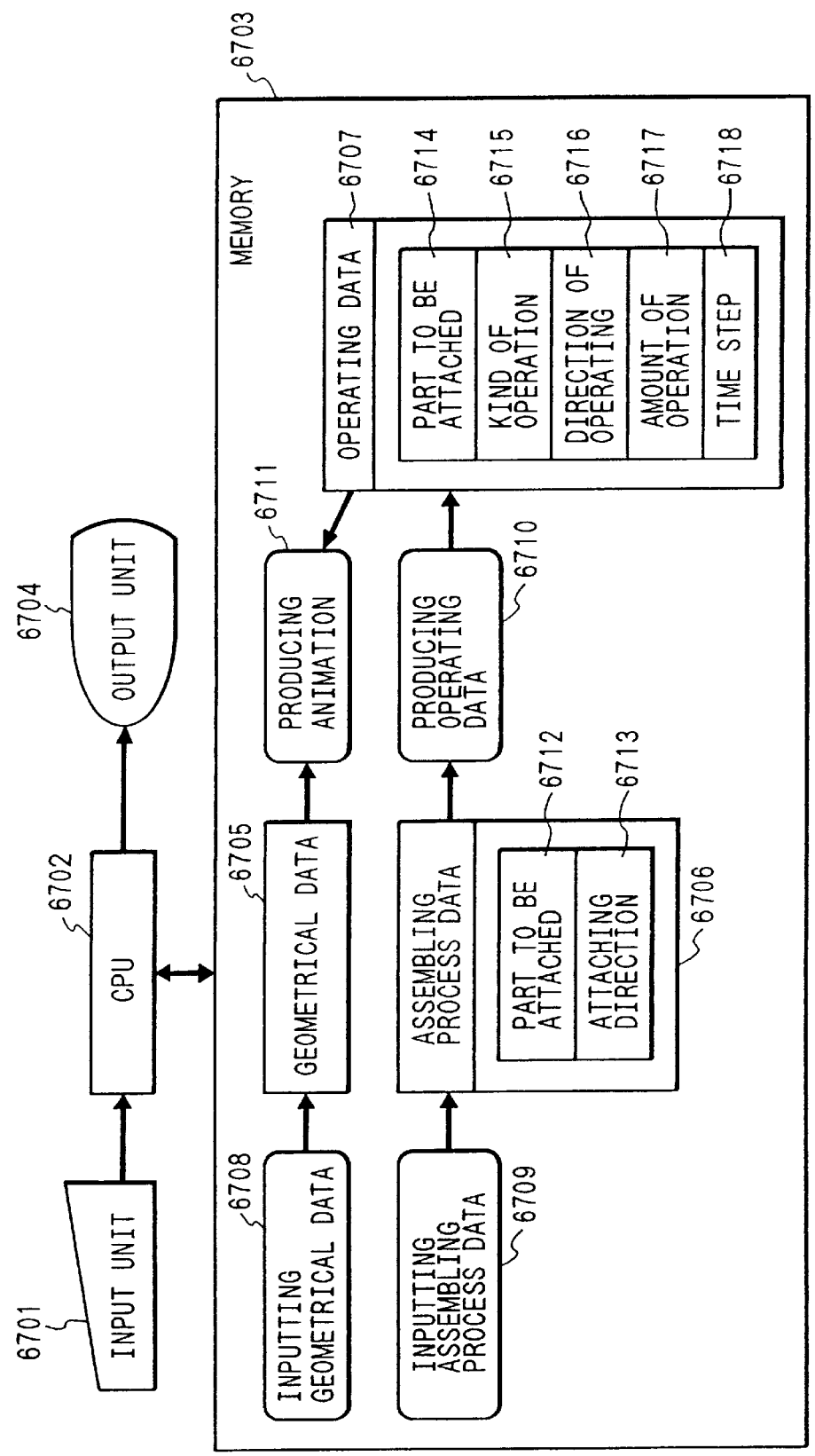
FIG. 67 is a block diagram showing an apparatus for producing animation of an assembling procedure according to the present invention.

FIG. 67 shows the structure of an embodiment of an apparatus for producing an animation of an assembling procedure according to the present invention. An input unit 6701 is composed of a machine taking instructions from an operator, such as through key-boards and a mouse, and a machine receiving data from another computer, such as a communication apparatus and a floppy disk drive.

A central processing unit 6702 is constructed with a CPU which calculates data in a memory 6703 according to a program stored in the memory 6703, and exchanges data between the input unit 6701 and an output unit 6704.

The memory 6703 is constructed with a RAM, a magnetic disk and so on, and stores programs and data. The output unit 6704 is constructed with a display unit, such as a CRT, and machines to transfer data to another computer, such as a communication apparatus and a floppy disk drive.

The memory 6703 stores geometrical data 6705, assembling procedure data 6706, operating data 6707, a program 6708 for inputting geometrical data, a program 6709 for inputting assembling procedure data, a program 6710 for producing operating data, and a program 6711 for producing animation.

The geometrical data 6705 is geometrical information for an assembly. The assembling procedure data 6706 is composed of data sets each consisting of a part to be attached 6712 and an attaching direction 6713 in the assembling order. The operating data 6707 is composed of parts to be attached 6714, data indicating a kind of operation 6715, data indicating an operating direction 6716, data indicating an amount of operation 6717, and data indicating time period 6718.

The program 6708 for inputting geometrical data fetches geometrical information of an assembly from the input unit 6701 and stores it as the geometrical data 6705. The program 6709 for inputting an assembling procedure fetches parts to be attached and attaching directions from the input unit 6701 in the assembling order and stores them as the assembling procedure data 6706.

The program 6710 for producing operating data automatically produces operating data for each part to be attached using the assembling procedure data 6706 and stores it as the operating data 6707.

The program 6711 for producing animation produces animation data using the geometrical data 6705 and the operating data 6707 and outputs the animation data to the output unit 6704. Inputting of the geometrical data 6705 and the assembling procedure data 6706 is performed by an operator with use of a mouse and a key-board, or through a network or a floppy disk in a case of data prepared by another central processing unit.

Figure 68:
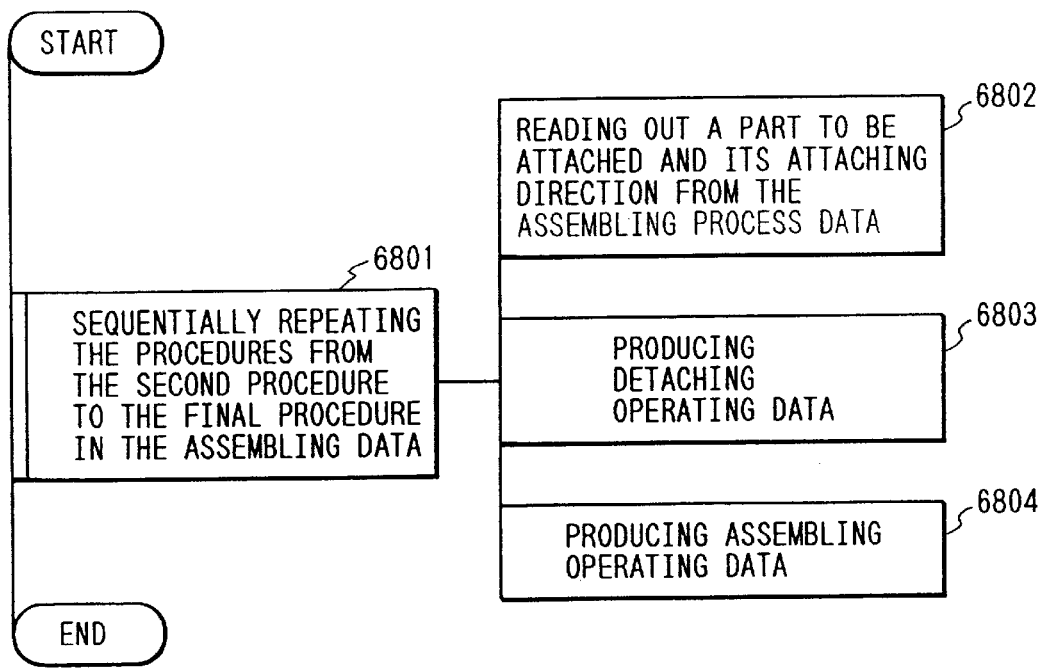
FIG. 68 is a flow-chart showing the detailed procedure of an operation data producing process.

FIG. 68 is a flow-chart showing the detailed process procedure of the process 6603 for producing operating data shown in FIG. 66. In process 6801, the process 6802 to process 6804 are applied for each of the second procedure step of the assembling procedure to the final procedure step.

Therein, the operating data for the first procedure step need not be produced since the first procedure step is to set a part at the beginning and it is out of the scope of the animation. In process 6802, data indicating a part to be attached and data indicating the attaching direction are read out from the procedure data.

Next, in process 6803, detaching operating data is produced from the read-out data indicating the part to be attached and the attaching direction. The detaching operating data is data for preforming an animation in which the part to be attached is moved from a position in an assembled state along a direction opposite to the attaching direction by a certain distance.

Next, in process 6804, assembling operating data is produced using the data indicating the part to be attached and the attaching direction which has been read out. The assembling operating data is data for performing an animation in which the part to be attached is moved from the position in process 6803 to the assembled state along the attaching direction.

As described above, in process 6703 for producing operating data, the data for a detaching operation and the data for an assembling operation for each of the parts to be attached are produced.

Figure 69:
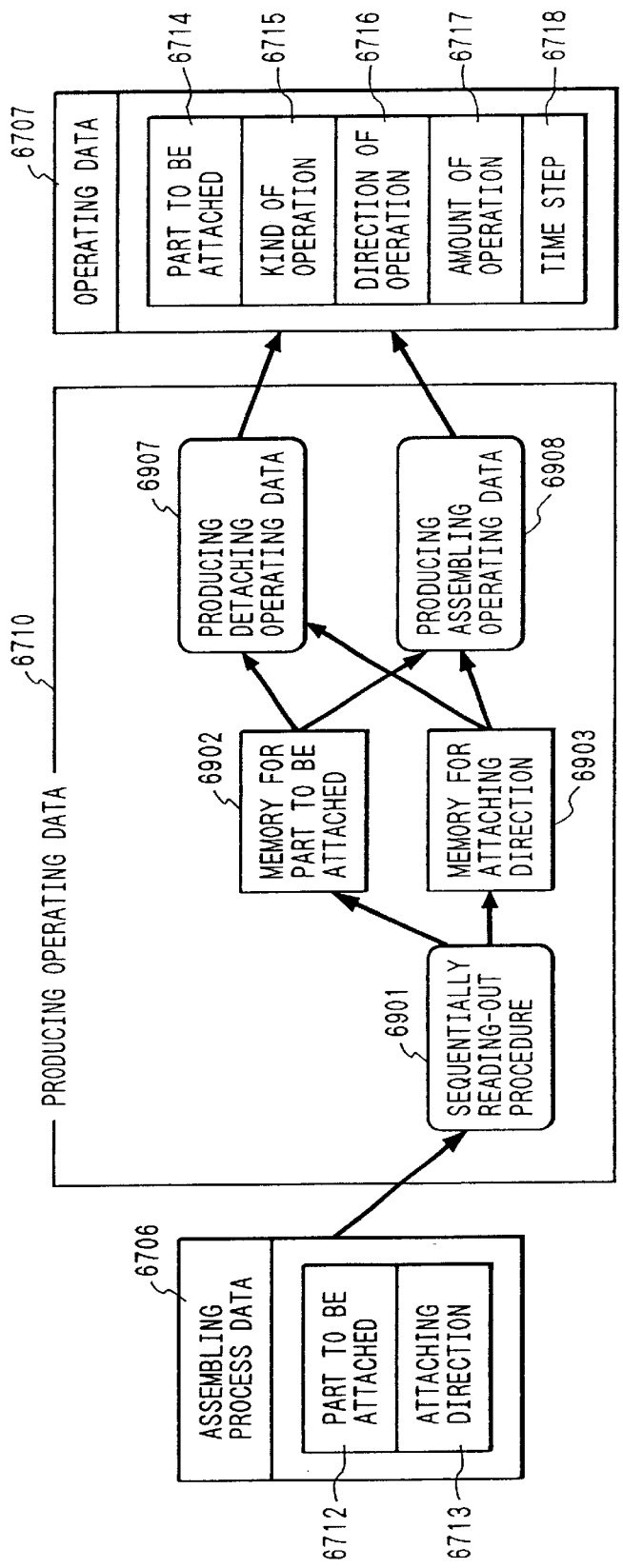
FIG. 69 is a functional diagram showing an apparatus executing operation data producing process.

FIG. 69 shows the construction of an apparatus for executing a process for producing operating data. A program 6901 for sequentially reading-out a procedure reads out assembling procedure steps in the assembling procedure data 6906 one by one, and stores it into a memory area 6902 for a part to be attached and a memory area 6903 for an attaching direction. The attaching direction data 6713 indicates the direction by which a part to be attached is attached to parts having been attached, and is a unit vector.

A program 6907 for producing detaching operating data reads out the data from the memory area 6902 for a part to be attached, and reads out the data indicating the attaching direction from the memory area 6903, and produces detaching operating data consisting of the data indicating the position of the starting point in an assembled state and the position of the ending point which is spaced by predetermined distance in the opposite direction to the attaching direction. The operating data produced is stored as the operating data 6707.

A program 6908 for producing detached operating data reads out the data indicating a part to be attached from the memory area 6902, and reads out the data indicating the attaching direction from the memory area 6903, and produces attaching operating data in which the starting point is the ending point in the program 6907 for producing detaching operating data and the ending point is the position of an assembled state of the part to be attached. The operating data produced is stored as the operating data 6707.

Figure 70:
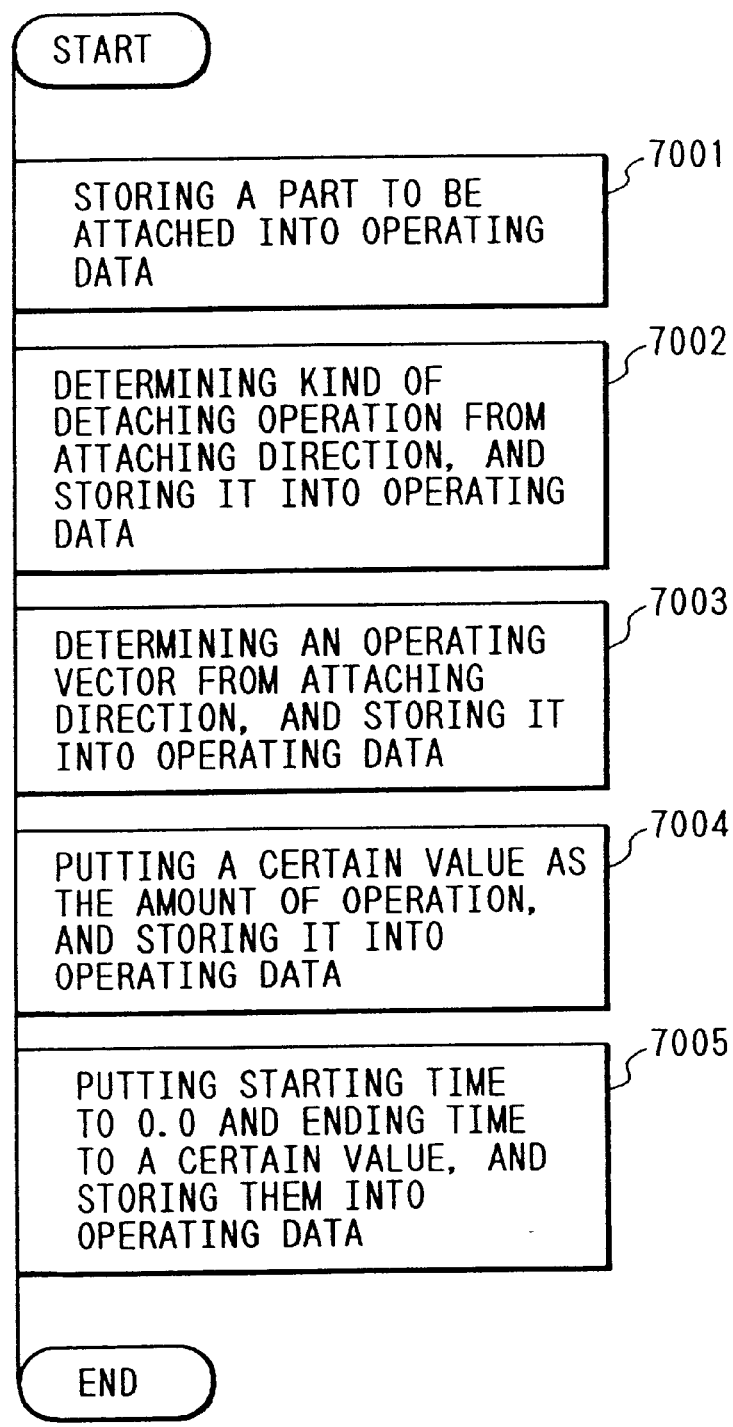
FIG. 70 is a flow-chart showing the detailed procedure of a detaching operation data producing process.

FIG. 70 is a flow chart showing the detailed procedure of the process 6803 for producing detached operating data. In process 7001, the part to be attached data read out from the assembling procedure data is set to the operating data 6707. In process 7002, the kind of operation is determined from the attaching direction data read out from the assembling procedure data, and is set to the operating data 6707.

In process 7003, the direction of operation is determined from the attaching direction, and set to the operating data 6707. In process 7004, data indicating a predetermined distance is set to the operating data 6707. In process 7005, the starting time is set as "0.01" and the ending time is set as a certain time, and they are set in the operating data 6707.

Figure 71:
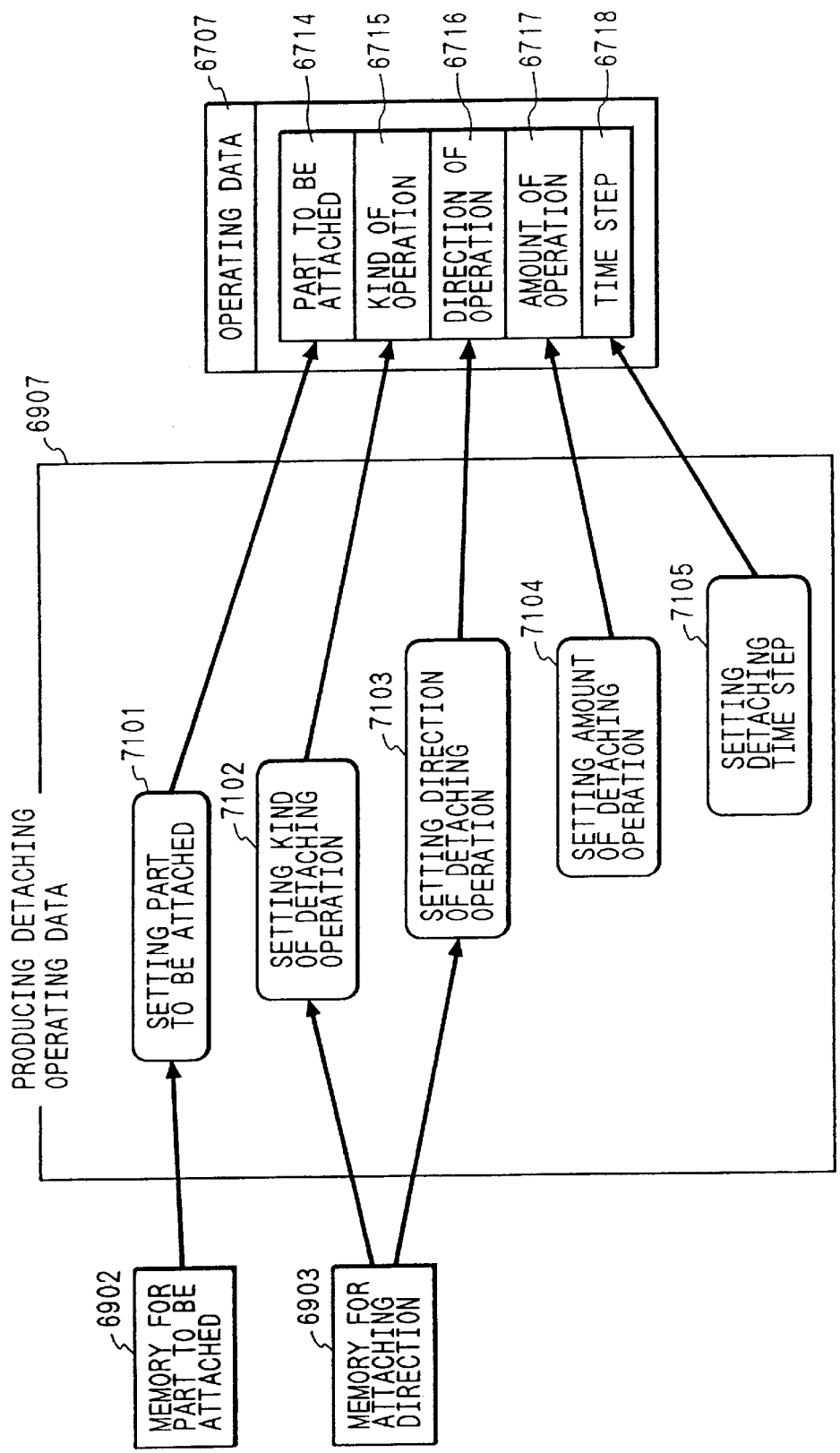
FIG. 71 is a functional diagram showing an apparatus executing detaching operation data producing process.

FIG. 71 is a diagram showing the structure of an apparatus executing the process for producing a detaching operation. A program 7101 for setting a part to be attached reads out the data from the memory area 6902 for the part to be attached, and stores it to the operating data 6707 as the part to be attached 6714.

A program 7102 for setting the kind of detaching operation reads out the data indicating the attaching direction from the memory area 6903, and obtains the kind of operation corresponding to the kind of attaching direction, and stores it in the operating data 6707 as a kind of operation 6715.

A program 7103 for setting the direction of the detaching operation reads out the attaching direction data from the memory 6903, and stores the direction opposite to the attaching direction in the operating data 6707 as the operating direction 6716. A program 7104 for setting the amount of the detaching operation sets the amount of movement the part to be attached from an assembled state to a detached state.

In this embodiment, a constant is stored in the operating data 6707 as the amount of operation 6717 independently of the sizes of the assembly and the part. A program 7105 for setting a detaching time sets the time to detach each part from an assembled state in the direction opposite to the attaching direction. In this embodiment, the starting time is set as "0.0" and the ending time is set as a constant value, and they are stored in the time step 6718 in the operating data 6707.

Description will be made below using an example concerning the feature where the operating data 6707 for detaching the part from an assembled state is produced by the process for producing operating data in FIG. 68 and the process for producing detaching operating data in FIG. 70.

Figures 72, 73, 74:
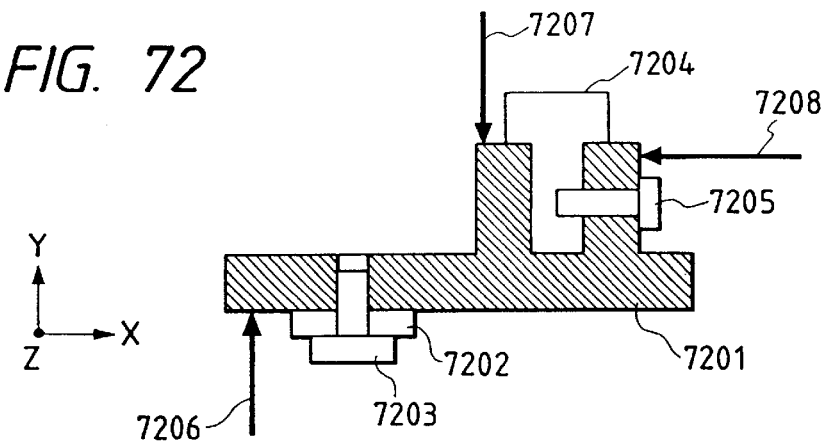
FIG. 72 is a diagram showing an example of assembly.
FIG. 73 is a diagram showing assembling procedure data.
FIG. 74 is a diagram showing operation data for a detaching operation produced by an embodiment according to the present invention.

FIG. 72 shows the geometry of an assembly used in the explanation. The structure of the assembly includes a part 7202 fixed to a plate 7201 with a bolt 7203 and a part 7204 fixed to the plate 7201 with a bolt 7205. The attaching direction of the part 7202 and the bolt 7203 is indicated by the directional vector 7206, and the attaching direction of the part 7204 is indicated by the directional vector 7207, and the bolt 7205 is indicated by the directional vector 7208.

FIG. 73 is a diagram showing an example of the assembling procedure data for the assembly in FIG. 72. The column for a step of the procedure 7301 shows a sequence of numbers corresponding to the assembling procedure, and assembling is performed in the order of these numbers.

The column of a part to be attached 7302 shows a part to be attached in each corresponding step of the procedure. Each number in the column of a part to be attached in FIG. 73 corresponds to the symbol attached to each part in FIG. 72. The column for the attaching direction 7303 shows a kind of attaching 7304 and direction value 7305.

The kind of attaching 7304 indicates a kind of movement of a part to be attached, and the indication "moving" means to move along a straight line. The direction value 7305 indicates a direction value corresponding to the kind of attaching 7304, and is expressed by a directional vector when the kind 7304 is "moving".

Each attaching direction in the column 7303 in FIG. 73 corresponds to the symbol attached to each direction vector in FIG. 72. Since the first procedure step 7306 is a case of setting a part at the beginning, there is no need to specify the attaching direction.

The processes 6802 to 6804 in FIG. 68 are repeated so as to be applied by the process 6801 during each of the steps of the procedure from 2 to 5. The result of the process is shown in FIG. 74. Only the process 6803 for producing detaching operating data will be described here, but the process 6804 for producing assembling operating data will be described later.

The process of the second step 7307 of the procedure will be described. In process 6802, the assembling procedure in step 7307 of the procedure is read out. And, in the process 6083, the data of the detaching operation is produced. In process 7001 in FIG. 70, the identification of the part to be attached 7202 as read out is stored in the operating data.

Next, in process 7002, since the kind of attaching direction read out is "moving", the kind of operation is stored in the operating data as "straight moving". Then, in process 7003, the direction opposite to the directional vector 7206 read out is stored in the operating data.

The opposite direction vector is stored in the operating data because the direction for detaching the part from an assembled state is opposite to the attaching direction.

Next, in process 7004, a constant distance ($D_{const}$) is stored in the operating data as the amount of operation. In the last step, in process 7005, the beginning of the time step is set to "0.0" and the end of the time step is set to a constant value ($T_{const}$) and these values are stored in the operating data.

The operating data shown in FIG. 74 is composed of a part to be attached 7401, a kind of operation 7402, an operating direction 7403, an amount of operation 7404 and a time step 7405. The data identifying the part to be attached in the step of the procedure 7307 is the symbol 7406.

Herein, the operating direction of the symbol 7406 is written as "−7206" since it is opposite to the attaching direction 7206. By executing the steps 7308 to 7310 in the same manner as the step procedure 7307, the operating data for parts 7407, 7408, 7409 shown in FIG. 74 is produced.

Figure 75:
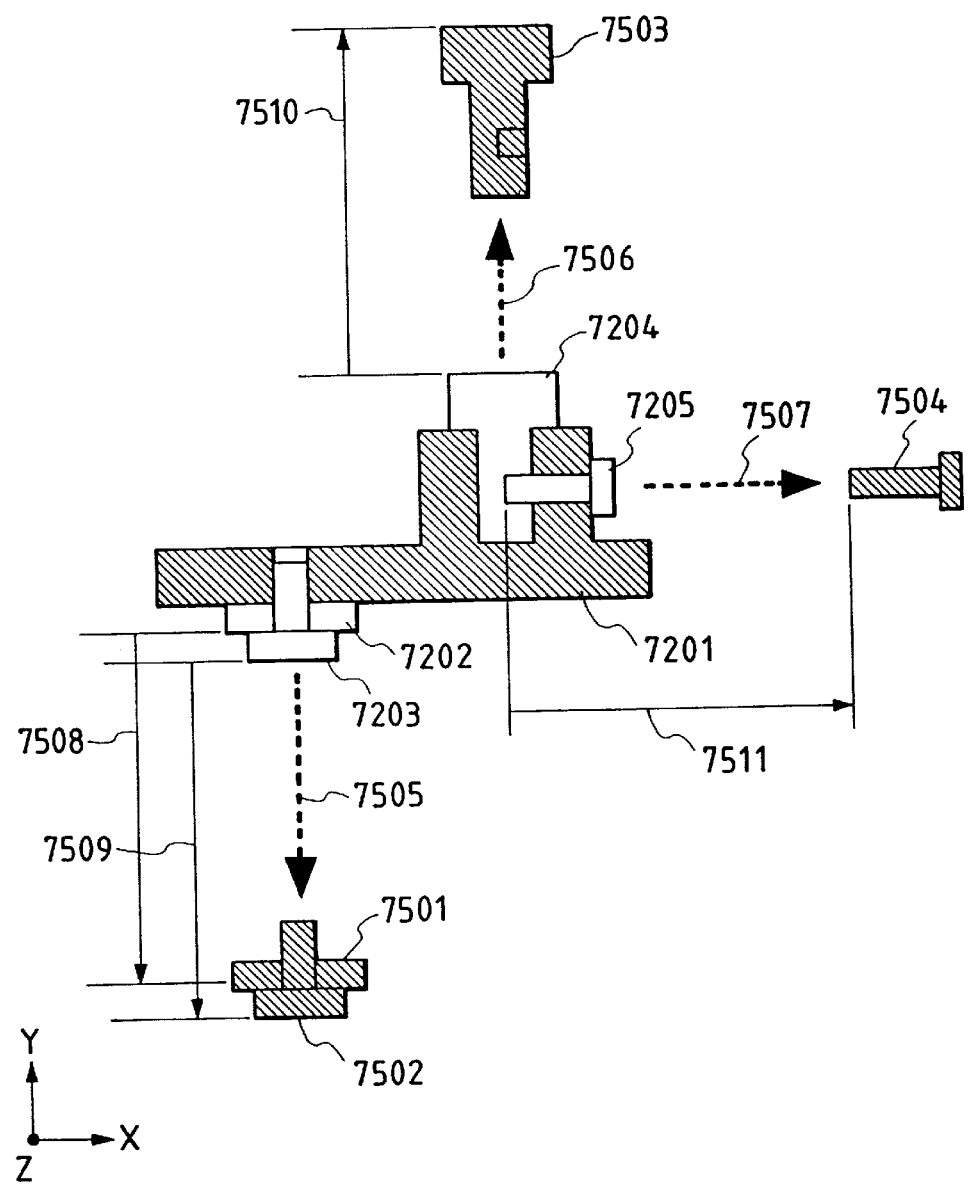
FIG. 75 is a diagram showing an animation display based on the operation data for a detaching operation produced by an embodiment according to the present invention.

FIG. 75 is a view showing the process displayed by an animation which is produced by using the operating data shown in FIG. 74 as input data and producing the animation of the process 6604 shown in FIG. 66. In this figure, the part to be attached in the assembled state is not hatched and the part to be attached after being detached is hatched.

The direction of animation is illustrated by the arrow. The animation by the operating data for 7406 in the step 7307 is the movement from the position of the part to be attached 7202 to the position of the part to be attached 7501 in the animation direction 7505.

The time step is 0 second in the position of the part to be attached 7202 and $T_{const}$ second in the position of the part to be attached 7501. The amount of operation is the distance 7508 from the part to be attached 7202 to the part to be attached 7501, and is $D_{const}$. The animation by the operating data for 7407 in the step of procedure 7308 is the movement from the position of the part to be attached 7203 to the position of the part to be attached 7502 in the animation direction 7505.

The time step is 0 second in the position of the part to be attached 7203 and $T_{const}$ second in the position of the part to be attached 7502. The amount of operation is the distance 7508 from the part to be attached 7203 to the part to be attached 7502, and is $D_{const}$.

The animation by the operating data for 7408 in the step 7309 is the movement from the position of the part to be attached 7204 to the position of the part to be attached 7503 in the animation direction 7506. The time step is 0 second in the position of the part to be attached 7204 and $T_{const}$ second in the position of the part to be attached 7503. The amount of operation is the distance 7510 from the part to be attached 7204 to the part to be attached 7503, and is $D_{const}$.

The animation by the operating data for 7409 in the step 7310 is the movement from the position of the part to be attached 7205 to the position of the part to be attached 7504 in the animation direction 7507. The time step is 0 second in the position of the part to be attached 7205 and $T_{const}$ second in the position of the part to be attached 7504. The amount of operation is the distance 7511 from the part to be attached 7205 to the part to be attached 7504, and is $D_{const}$.

By seeing a change of all the parts to be attached over time, at the time step of 0 second, the parts are in an assembled state, then all the parts each move in the corresponding animation directions at one time, and at time step of $T_{const}$ the animation of the detaching operation is completed.

Figure 76:
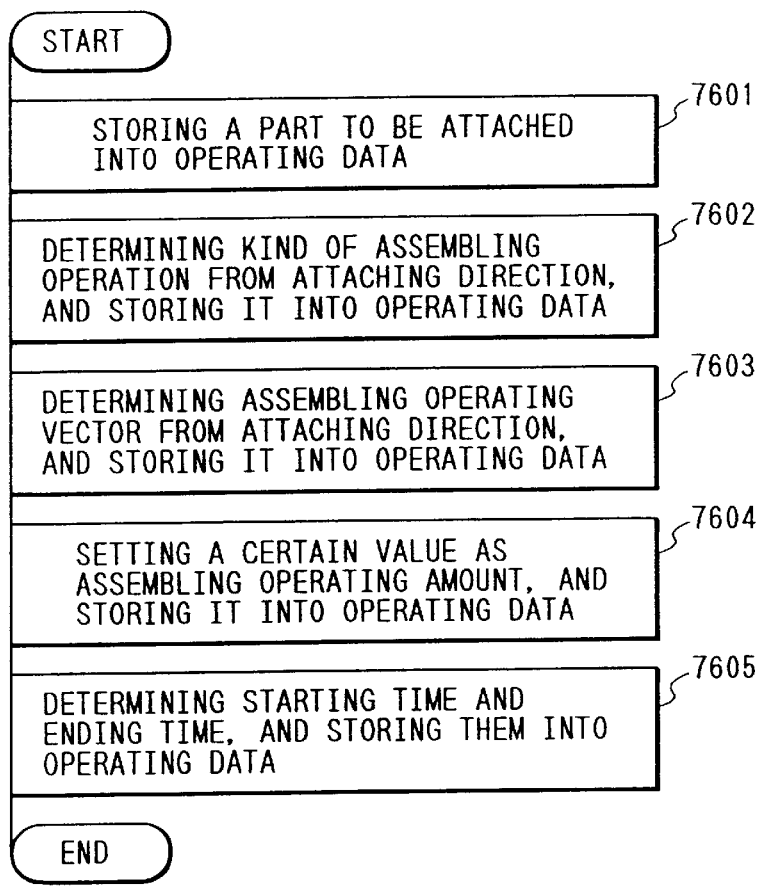
FIG. 76 is a flow-chart showing the detailed procedure of an assembling operation data producing process.

The process for producing assembling operating data will be described below. FIG. 76 is a flow chart showing the detailed procedure of the process 6804 for producing attached operating data. In process 7601, the part to be attached data read out from the assembling procedure data is set to the operating data 6707. In process 7602, the kind of operation is determined from the attaching direction data read out from the assembling procedure data, and is set to the operating data 6707.

In process 7603, the direction of operation is determined from the attaching direction and is set to the operating data 7607. In process 7604, the amount of operation is set as a constant amount and is set to the operating data 6707. In step 7605, the starting time and the ending time are obtained from the step so that the animation time is not overlapped with that of any other part to be attached, and these values are set in the operating data 6707.

Figure 77:
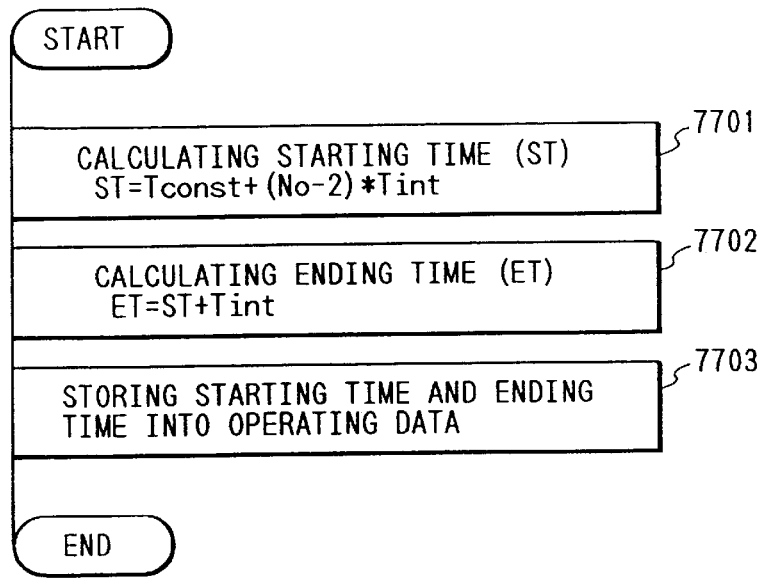
FIG. 77 is a flow-chart showing the detailed procedure of an assembling time step setting process in the assembling operation data producing process.

FIG. 77 is a flow chart showing the detailed procedure of the process 7605 shown in FIG. 76. In process 7701, the starting time (ST) is obtained by the following equation:

$$ST = T_{const} + (N_o - 2) \times T_{int} \quad (8)$$

where $T_{const}$ is a constant value for time step, and is equal to the ending time of parts to be attached in the detaching operating data. $N_o$ is the sequence number of the step of procedure. $T_{int}$ is the animation time during which a part to be attached changes from a detached state to an attached state.

In process 7702, the ending time (ET) is obtained by the following equation:

$$ET = ST + T_{int} \quad (9)$$

In process 7703, the starting time and the ending time obtained in process 7701 and process 7702 are stored in the operating data.

Figure 78:
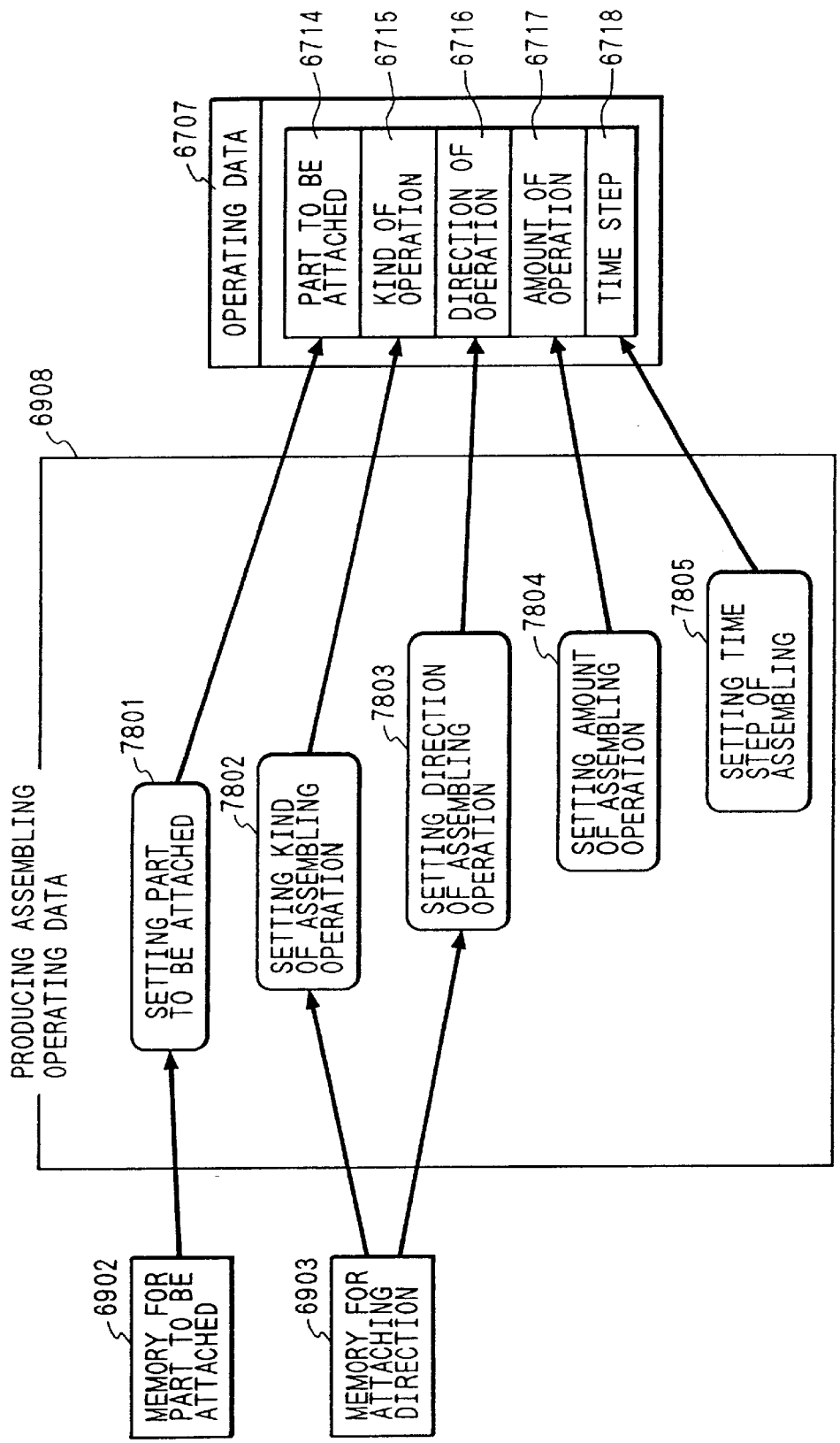
FIG. 78 is a functional diagram showing an apparatus executing assembling operation data producing process.

FIG. 78 is a diagram showing the structure of an apparatus executing the attaching operation. A program 7801 for setting a part to be attached reads out the data of the part to be attached from the memory 6902, and stores it to the operating data 6707 as part to be attached 6714.

A program 7802 for setting the kind of assembling operation reads out the data of the attaching direction from the memory 6903, and obtains the kind of operation corresponding to the kind of attaching direction, and stores it to the operating data 6707 as a kind of operation 6715.

A program 7803 for setting the direction of the assembling operation reads out the attaching direction data from the memory 6903, and stores the direction opposite to the attaching direction in the operating data 6707 as the operating direction 6716.

A program 7804 for setting the amount of the assembling operation sets the amount of movement of the part to be attached from an assembled state to a detached state, and stores it in the operating data 6707 as the amount of operation 6717. A program 7805 for setting the assembling time step determines the time step so that the animation time does not overlap with that of any other part to be attached, and stores it to the time step 6719 in the operating data 6707.

Description will be made below using an example of the feature where the operating data 6707 for assembling the part from a separated state to an assembled state is produced by the process for producing operating data in FIG. 68, the process for producing assembling operation data in FIG. 76 and the process for calculating a time step of the assembling operating data in FIG. 77.

Figures 79, 80:
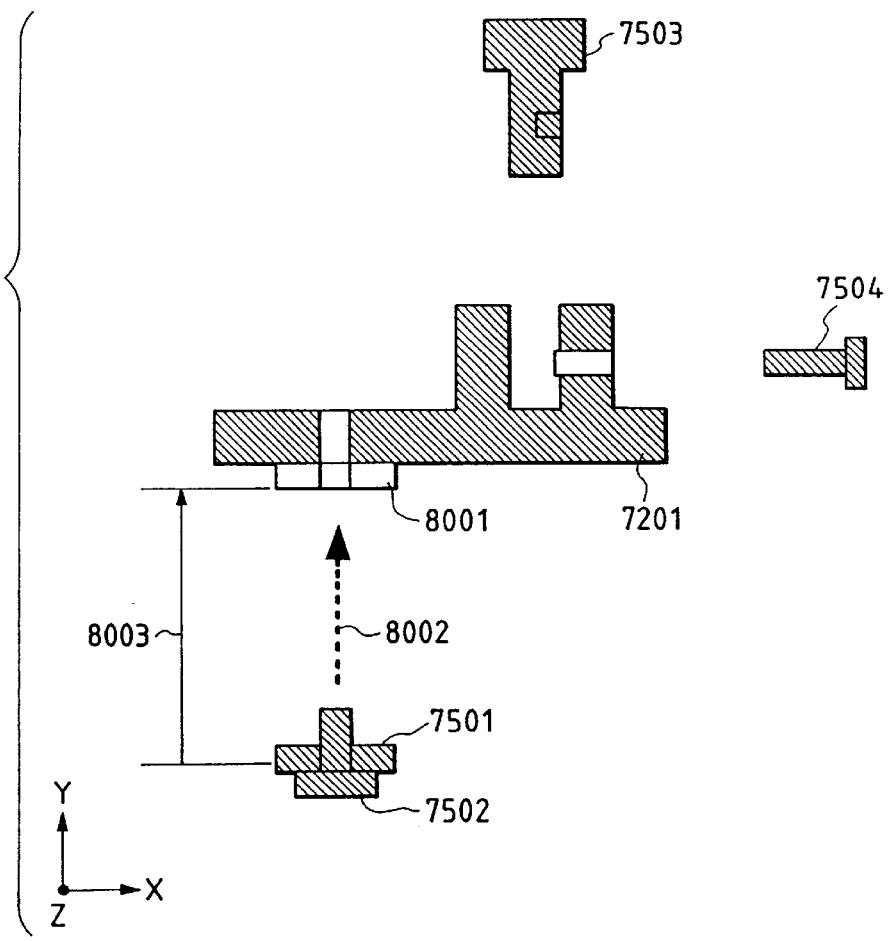
FIG. 79 is a diagram explaining operation data for an assembling operation produced by an embodiment according to the present invention
FIG. 80 is a diagram showing an animation display based on the operation data for an assembling operation produced by an embodiment according to the present invention.

The geometry of the assembly is the same in FIG. 72. A part 6201, a part to be attached 7501, a part to be attached 7502, a part to be attached 7503, and a part to be attached 7504 are in a disassembled state. The processes 6802 to 6804 are repeated and applied by the process 6801 during each of the steps 2 to 5. The result of the process is shown in FIG. 79.

Only the process 6804 for producing assembling operating data will be described here, since the process 6803 for producing detaching operating data has been described above. The process of the second step 7307 will be described.

In process 6802, the assembling procedure in step 7307 is read out. And, in process 6083, the data of the assembling operation is produced. In process 7601 in FIG. 76, the part to be attached 7202 as read out is stored in the operating data.

Next, in process 7602, since the kind of attaching direction read out is "moving", the kind of operation is stored in the operating data as "straight moving". Then, in process 7603, the directional vector 7206 as read out is stored in the operating data. Next, in process 7604, a constant distance ($D_{const}$) is stored in the operating data as the amount of operation. In the last step, in process 7605, a time step is determined and stored in the operating data.

As for determining the time step, the starting time step is determined by calculation, as described in process 7701, so as not to overlap with the time step of the detaching operation and the time step of a part to be attached, the assembling operation of which has been determined.

Since the step 7303 is for the first part of the assembling operation, that is, the sequence number of the step is "2", the starting time becomes $T_{const}$. Next, the ending time is determined. The ending time is the sum of the starting time and the attaching animation time ($T_{int}$). Then, the starting time and the ending time determined in process 7703 are stored in the operating data. The operating data produced in the step 7307 is shown in FIG. 79.

The assembling operating data of the part to be attached 7202 in the step 7307 is indicated by the numeral 7901 in FIG. 79. After completion of production of the assembling operating data in the step 7307, the step 7308 to the step 7310 are sequentially performed.

Here, only the determination of the time step will be described. The starting time of the step 7308 becomes $T_{const} + T_{int}$ since the sequence number of the step of procedure is 3. This time is the same as the ending time of the step 7307, that is, the assembling animation of the part to be attached 7203 starts after completion of the assembling animation of the part to be attached 7202. The ending time is $T_{const} + 2 \times T_{int}$.

Similarly, the starting time of the step 7309 is $T_{const} + 2 \times T_{int}$ and is the same as the ending time of the step 7308. The ending time is $T_{const} + 3 \times T_{int}$. The starting time of the step 7310 is $T_{const} + 3 \times T_{int}$ and is the same as the ending time of the step 7309. The ending time is $T_{const} + 4 \times T_{int}$. The assembling operating data of the steps 7308 to 7310 are indicated by the numerals 7902, 7803, 7904 in FIG. 79.

FIG. 80 to FIG. 83 are views showing the process displayed by an animation which is produced by using the operating data shown in FIG. 79 as input data and producing the animation of the process 6604 shown in FIG. 66.

In these figures, for the purpose of explanation, the part to be attached in the detached state is hatched and the part to be attached in an assembled state is not hatched. The direction of animation is illustrated by the arrow.

FIG. 80 shows the animation process of the operating data 7901. This is an animation in which the part to be attached 7201 is moved in the animation direction 8002 from the position 7501 at the starting time $T_{const}$ to the position 8001 at the ending time $T_{const} + T_{int}$. The amount of operation is the distance 8003 from the position 7501 to the position 8001 is $D_{const}$.

Figure 81:
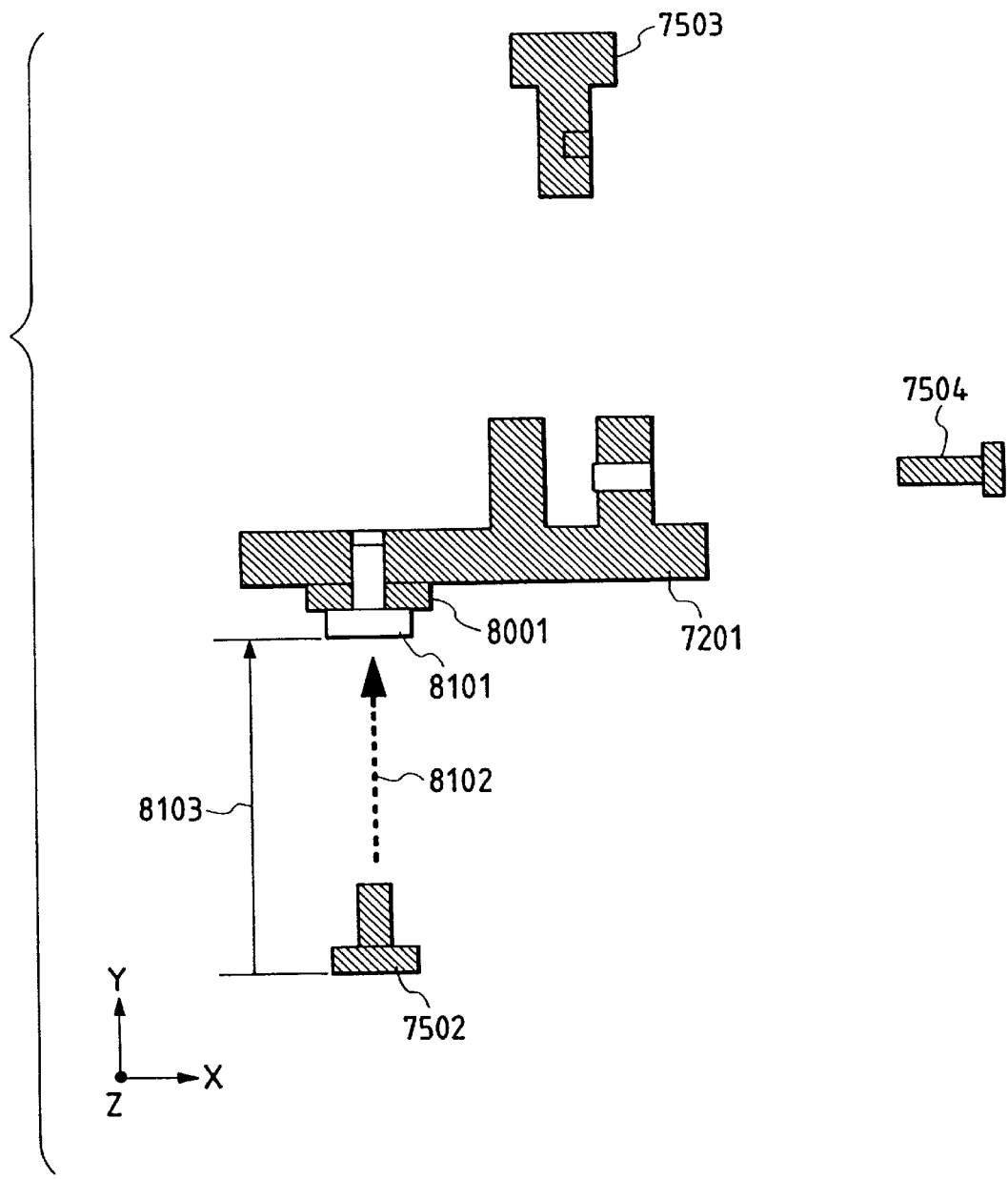
FIG. 81 is a diagram showing an animation display based on the operation data for an assembling operation produced by an embodiment according to the present invention.

FIG. 81 shows the animation process of the operating data 7902. This is an animation in which the part to be attached 7203 is moved in the animation direction 8102 from the position 7502 at the starting time $T_{const} + T_{int}$ to the position 8101 at the ending time $T_{const} + 2 \times T_{int}$. The amount of operation is the distance 8103 from the position 7502 to the position 8101 is $D_{const}$.

Figure 82:
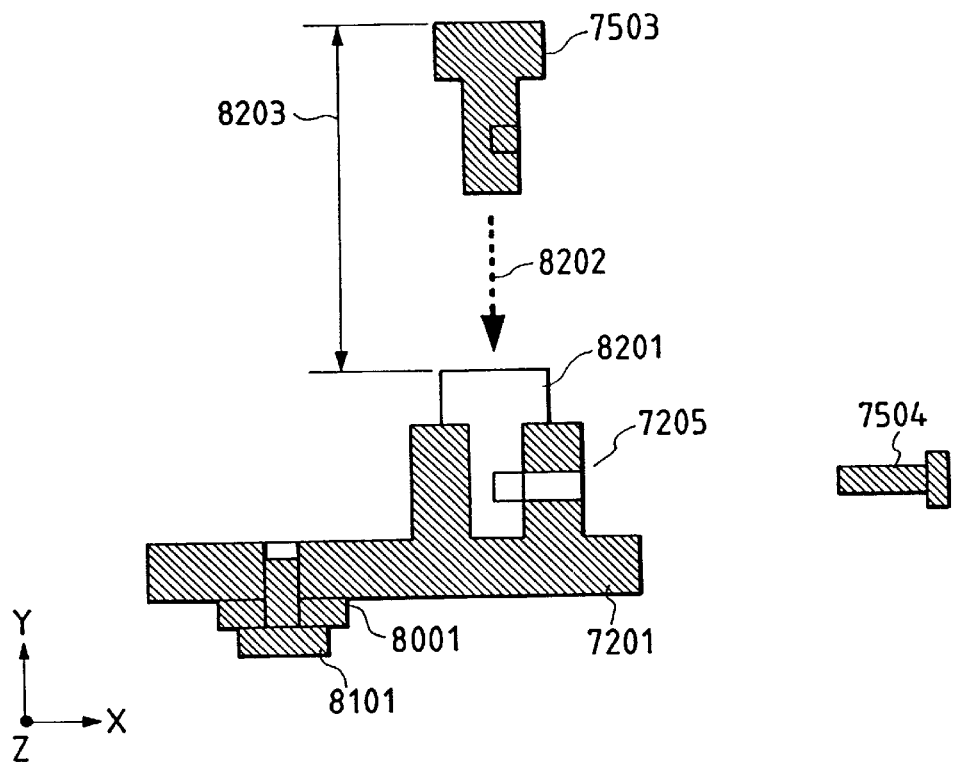
FIG. 82 is a diagram showing an animation display based on the operation data for an assembling operation produced by an embodiment according to the present invention.

FIG. 82 shows the animation process of the operating data 7903. This is an animation in which the part to be attached 7204 is moved in the animation direction 8202 from the position 7503 at the starting time $T_{const} + 2 \times T_{int}$ to the position 8201 at the ending time $T_{const}+3\times T_{int}$. The amount of operation is the distance 8203 from the position 7503 to the position 8201 is $D_{const}$.

Figure 83:
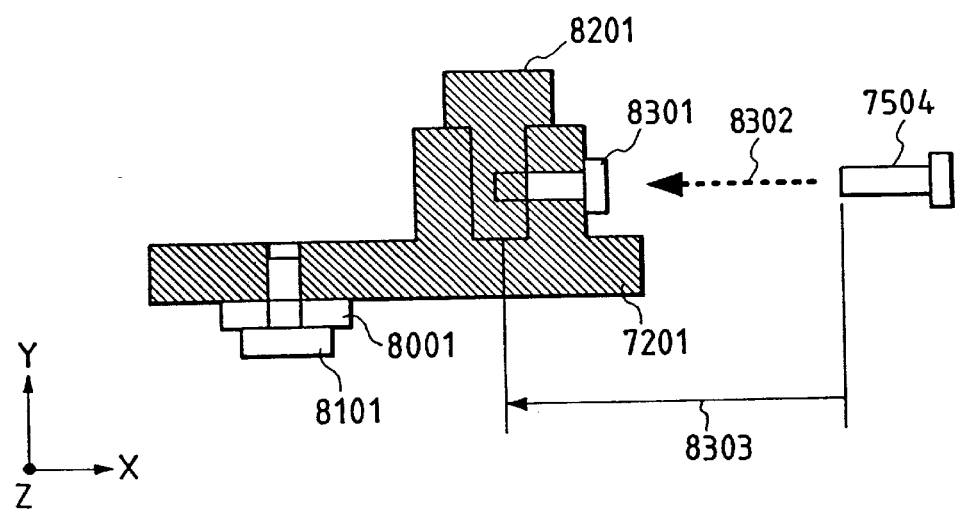
FIG. 83 is a diagram showing an animation display based on the operation data for an assembling operation produced by an embodiment according to the present invention.

FIG. 83 shows the animation process of the operating data 7904. This is an animation in which the part to be attached 7205 is moved in the animation direction 8302 from the position 7504 at the starting time $T_{const}+3\times T_{int}$ to the position 8301 at the ending time $T_{const}+4\times T_{int}$. The amount of operation is the distance 8303 from the position 7504 to the position 8301 is $D_{const}$.

As described above, by producing assembling operating data, as shown in FIG. 79, an animation display can be obtained which shows movement from a detached state to an assembled state for parts to be assembled in the sequence of the assembling procedure. Further, by combining the detaching operating data shown in FIG. 74 and the assembling operating data shown in FIG. 79 to a set of data and performing the process for producing animation of process 6604, an assembling animation starting from an assembled state can be obtained.

Figure 84:
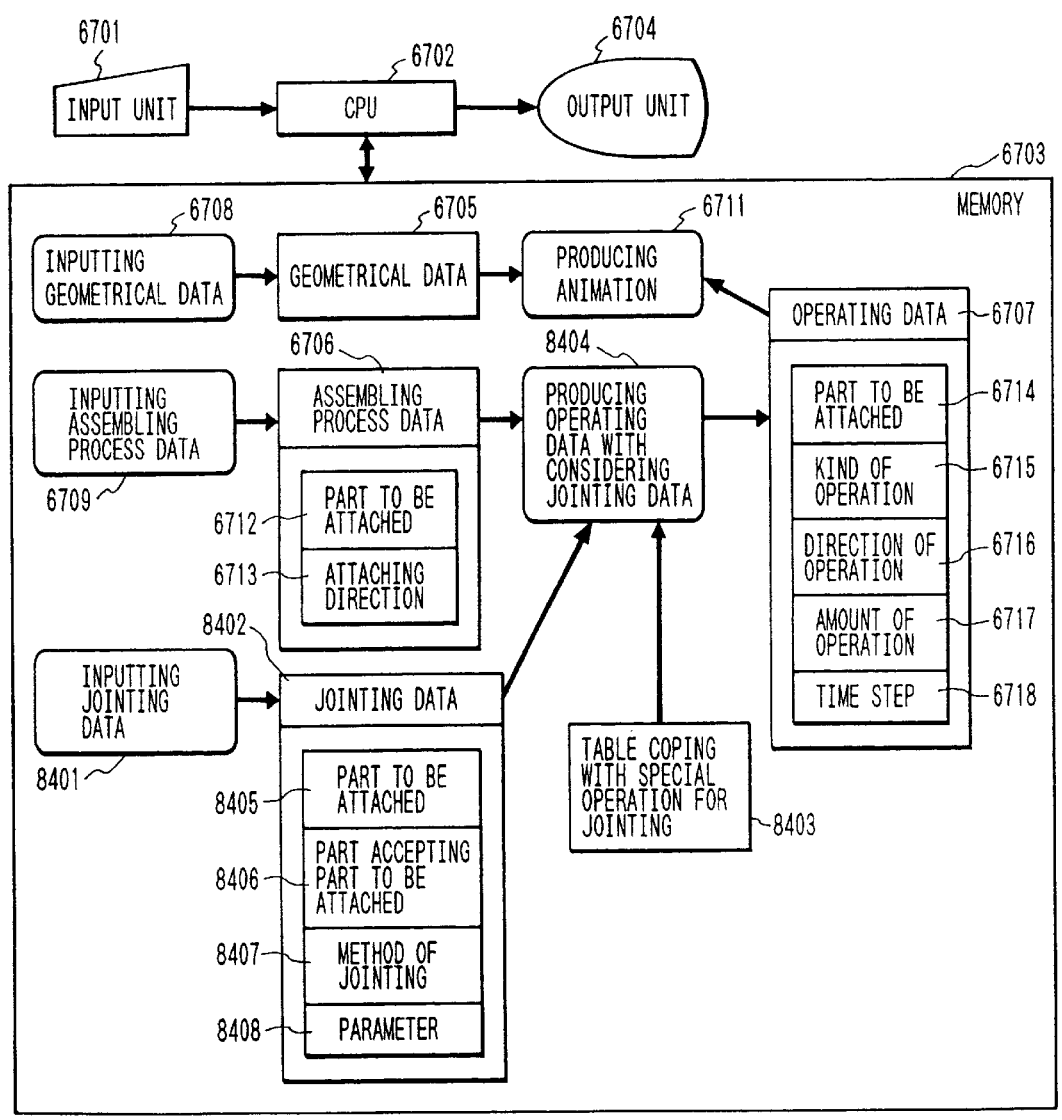
FIG. 84 is a functional diagram showing an apparatus forming an embodiment according to the present invention.

Another embodiment of the present invention will be described below. FIG. 84 is a block diagram showing the construction of an apparatus for producing animation of an assembling operation where in the construction of the apparatus for producing animation of the assembling operation shown in FIG. 67, a program 8401 for inputting jointing data, jointing data 8402, and a table 8403 coping with a special operation for jointing are added, and the program 6710 for producing operating data is changed to a program 8404 for producing operating data with jointing data.

The program 8401 for inputting jointing data is responsive to an instruction from an operator inputted via the input unit 6701 and jointing data from other programs and the computer. The jointing data 8402 stores sets of a part to be attached 8405, a part accepting a part to be attached 8406, a method of jointing 8407 and a parameter 8408 of detailed data of the method 8407 of jointing for each of the parts to be attached.

The program 8404 for producing operating data with jointing data produces operating data for each of the parts to be attached from the assembling procedure data 6706 and reads out data from the jointing data 8402, and produces operating data particularly for jointing by referring to the table 8403 providing for a special operation for jointing, and then stores it as the operating data 6707. The table 8403 is a table for providing correspondence between the method of jointing in the jointing data and the operation of the method of jointing.

Figures 85, 88:
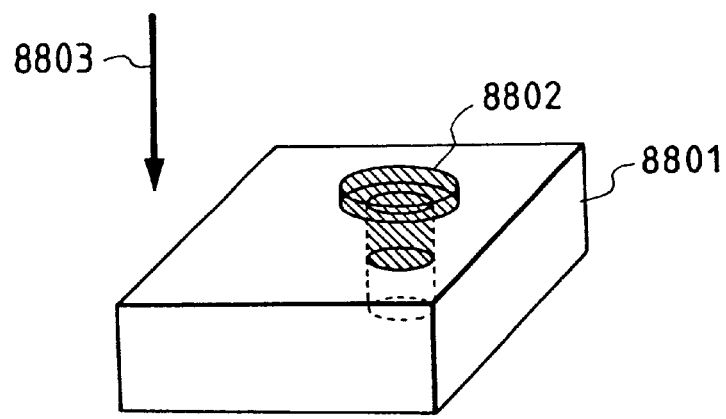
FIG. 85 is a diagram showing a table for a special-jointing-operation.
FIG. 88 is a diagram showing an example of an assembly.

FIG. 85 shows an example of the table 8403. The methods of jointing for assembling work, such as screw, welding, soldering and so on, are set in the column of jointing methods 8501, and the kinds of a movement of part to be attached, such as revolution, locking and so on, are set in the column of special operation 8502.

Figure 86:
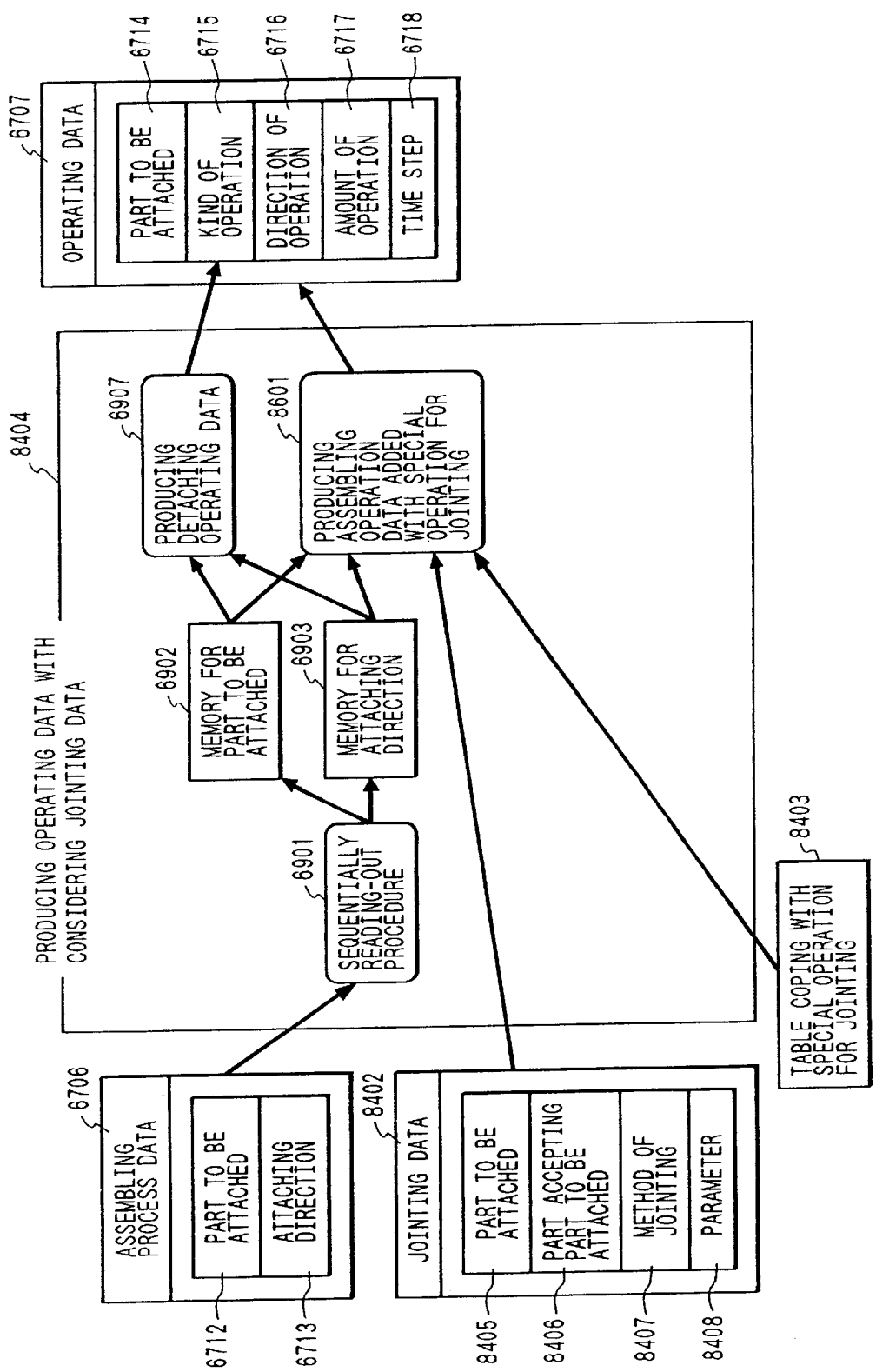
FIG. 86 is a functional diagram showing an apparatus executing operation data producing process.

FIG. 86 is a functional diagram showing the construction of an embodiment of the program 8404 for producing operating data. A program 6901 for sequentially reading-out a procedure reads out assembling procedure steps in the assembling procedure data 6906 one by one, and stores it into a memory area 6902 for a part to be attached and a memory area 6903 for storing an attaching direction.

A program 6907 for producing detaching operating data produces the detaching operating data in which the starting point is the position of an assembled state of the part to be attached and the ending point is the position proceeding in the direction opposite to the attaching direction read out from the memory area 6903. The operating data produced is stored as the operating data 6707.

A program 8601 for producing assembling operating data, to which is added a special operation for jointing, produces the attaching operating data in which the starting point is the ending point in the program 6907 and the ending point is the position of an assembled state of the part to be attached. The operating data produced is stored as the operating data 6707.

In addition to these, the program 8601 reads out the jointing data 8402 and produces assembling operating data to which is added a special operation for jointing by referring to the table 8403, and stores the result to the operating data 6707.

FIG. 87 is a functional diagram showing the construction of an embodiment of the program 8601 for producing assembling operating data including a special operation for jointing. The process from the program 8701 for setting a part to be attached to the program 7805 for setting an assembling time step is the same as described in connection with FIG. 78.

The program 8701 for setting a part to be attached reads out a part to be attached from the memory 6902 and stores it with respect to the part to be attached 6714 in the operating data 6707. A program 8402 for retrieving a jointing method retrieves the part to be attached data read out from the memory 6902 and stores it in the jointing data 8402.

A program 8707 for retrieving a special operation for jointing retrieves the special operation of jointing method retrieved by the program 8706 from the table 8403.

A program 8708 for determining operating data which is special for jointing determines the direction and the amount of operation of the operation special for jointing from the special operation retrieved by the program 8707 for retrieving a special operation from the jointing data 8402 with reference to the parameter of the jointing method.

A program 8702 for setting a kind of assembling operation special for jointing receives a special operation from the program 8707 for retrieving a jointing method and stores it as the kind of operation 6715 in the operating data 6707.

A program 8703 for setting the direction of the assembling operation special for jointing receives a direction of the operation special for jointing from the program 8708, and stores it as the direction of operation 6716 in the operating data 6707.

A program 8704 for setting the amount of the assembling operation special for jointing receives an amount of the operation special for jointing from the program 8708, and stores it as the amount of operation 6717 in the operating data 6707.

A program 8705 for setting an assembling time step special for jointing receives a time step from the program 7805, and stores it as the time step 6718 in the operating data 6707.

Description will be made below using an example of the principle where the program 8601 for producing assembling operating data with a special operation for jointing.

FIG. 88 shows an assembled state of two parts 8801 and 8802. This assembling procedure data is shown in FIG. 89. In FIG. 89, the part 8801 is a part to be set at the beginning, and the part 8802 is a part to be attached in the direction of a vector 8803. FIG. 90 shows the input jointing data. Firstly, operating data is produced by the programs 7801 to 7805 in FIG. 87, and this operating data is stored to the operating data 6707.

This operation is the same as described with reference to the aforementioned embodiment. The resultant operating data is seen in the row 9101 in FIG. 91.

Next, assembling operating data special for jointing is produced and stored to the operating data 6707. Firstly, a part to be attached 8802 is read out from the memory area 6902 and is stored to the operating data 6707.

Next, the part to be attached 8802 is retrieved from the jointing data in FIG. 90, and the method of jointing "screw" is obtained. After that, the indication "screw" is retrieved from the table coping with special operation for jointing in FIG. 85, and the special operation for jointing "revolution" is obtained.

The special operation for jointing "revolution" obtained is stored in the operating data 6707 as the kind of assembling special for jointing. Next, the parameter of the jointing method "screw" is referred to from the jointing data in FIG. 90.

Then, the parameter of a center axis is set as a vector of the center axis around which the part to be attached 8802 is rotated. The angle of rotation by which the part to be attached 8802 is rotated is obtained from the parameter of the screw length. These values will be designated $D_v$, $D_{rot}$, respectively.

The obtained vector $D_v$ of the center axis is stored in the operating data 6707 as the direction of operation, and the obtained angle $D_{rot}$ of rotation is stored in the operating data 6707 as the amount of operation. In the last step, a value equal to the time step of the operating data 9101 of the part to be attached 8802 is stored in the operating data 6707 as the time step for the assembling operation special for jointing. The resultant operation data is shown in the row 9102 in FIG. 91.

Figure 92:
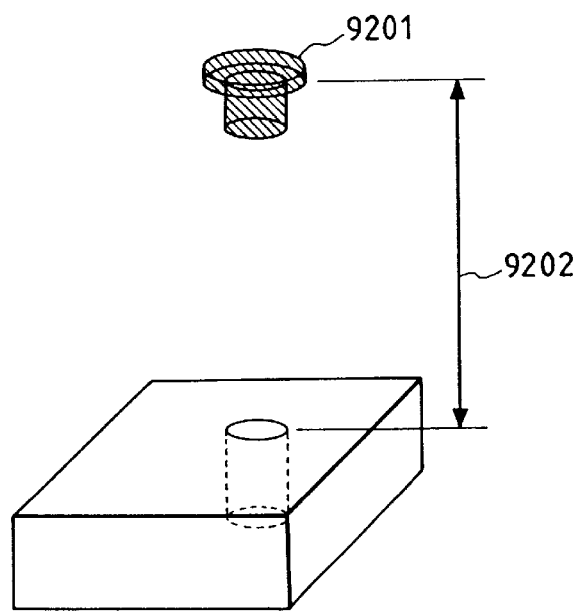
FIG. 92 is diagram view showing an animation display based on the operation data for an assembling operation produced by an embodiment according to the present invention.
Figure 93:
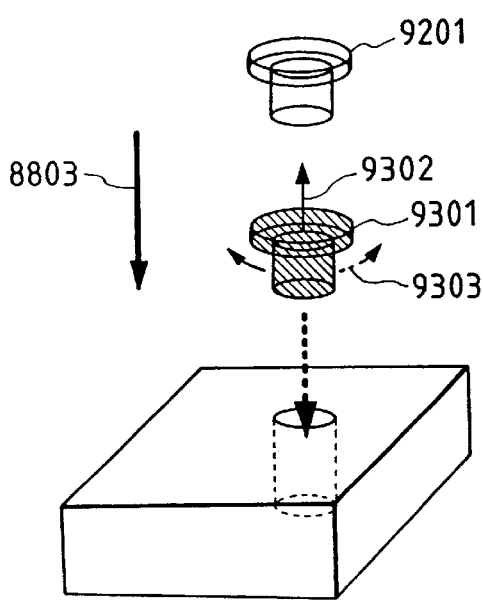
FIG. 93 is a diagram showing an animation display based on the operation data for an assembling operation produced by an embodiment according to the present invention.

FIG. 92 and FIG. 93 are views showing the process displayed by an animation which is produced by using the operating data shown in FIG. 79 as input data and producing the animation of the process 6604 shown in FIG. 66. Herein, the animation process from a detached state will be described, assuming that the animation of the detaching operating data has been completed.

FIG. 92 shows a state where the part 9201 is detached, that is, a state just before starting of the assembling operation. The time step at this time is ST1 ($T_{const}$) and the distance 9202 moved from the assembled state by the animation of the detaching operating data is $D_{const}$.

FIG. 93 shows an intermediate state of the animation of the assembling operation. This is a feature where the part to be attached reaches the position of part 9301 after passage of a certain time from the position of part 9201. The movement of the part to be attached as it is being rotated is indicated with vector 9302 as the vector of the center axis $D_v$ and arrow 9303 as the rotating angle, while the part to be attached is moving straight in accordance with a directional vector 8803.

Finally, the parts reach an assembled state at time step ET1, as shown in FIG. 88. As described above, by adding an operation special for jointing, the details of the assembling work as well as the order of assembling can be easily confirmed.

Figure 94:
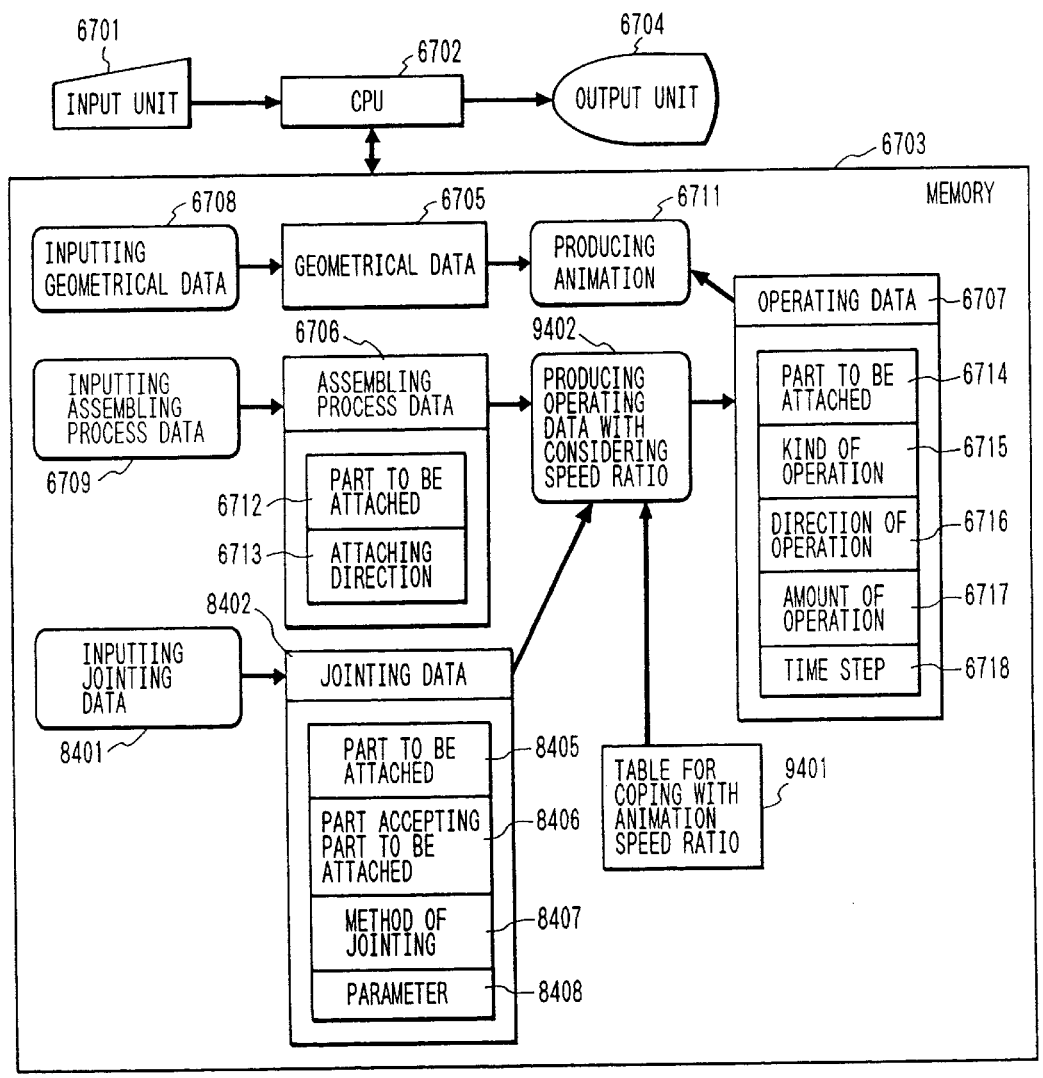
FIG. 94 is a block diagram showing an apparatus forming an embodiment according to the present invention.

A further embodiment of the present invention will be described below. FIG. 94 is a block diagram showing the construction of an apparatus for producing animation of an assembling operation which includes the apparatus for producing animation in FIG. 84, and the table 8403 providing for a special operation for jointing is changed to a table 9401 for providing an animation speed ratio, while the program 8404 for producing operating data is changed to a program 9402 for producing operating data with consideration of a speed ratio.

The program 9402 for producing operating data with consideration of a speed ratio reads out each part to be attached from the assembling procedure data 6706 and jointing data from the jointing data 8402, and produces operation data with reference to the table 9401, and stores it to the operating data 6707. The table 9401 is a table for providing correspondence between the method of jointing in the jointing data and the animation speed ratio of the operation of the method of jointing.

Figures 95, 98:
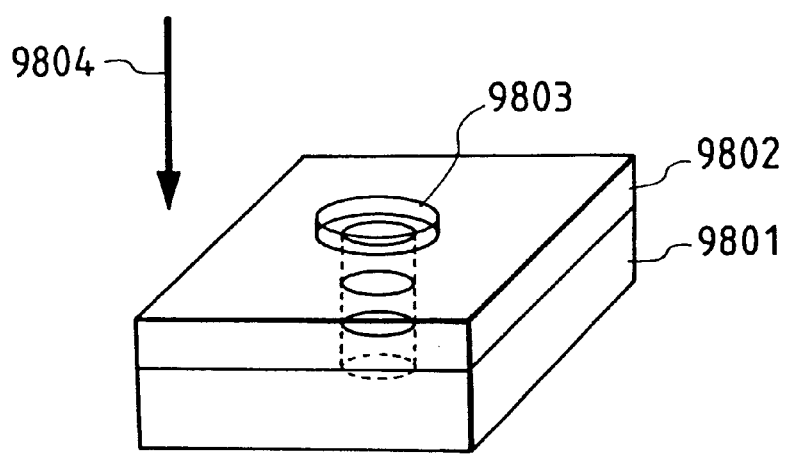
FIG. 95 is a diagram showing a table for animation-speed-ratio.
FIG. 98 is a diagram showing an example of an assembly.

FIG. 95 shows an example of the table 9401. The methods of jointing for assembling, such as snap, screw, welding and so on, are set in the column of the jointing method 9501, and the ratio of the animation time of the jointing method to the animation time ($T_{int}$) for each part to be attached as described in the aforementioned embodiment are set in the column of special operation 9502.

Figure 96:
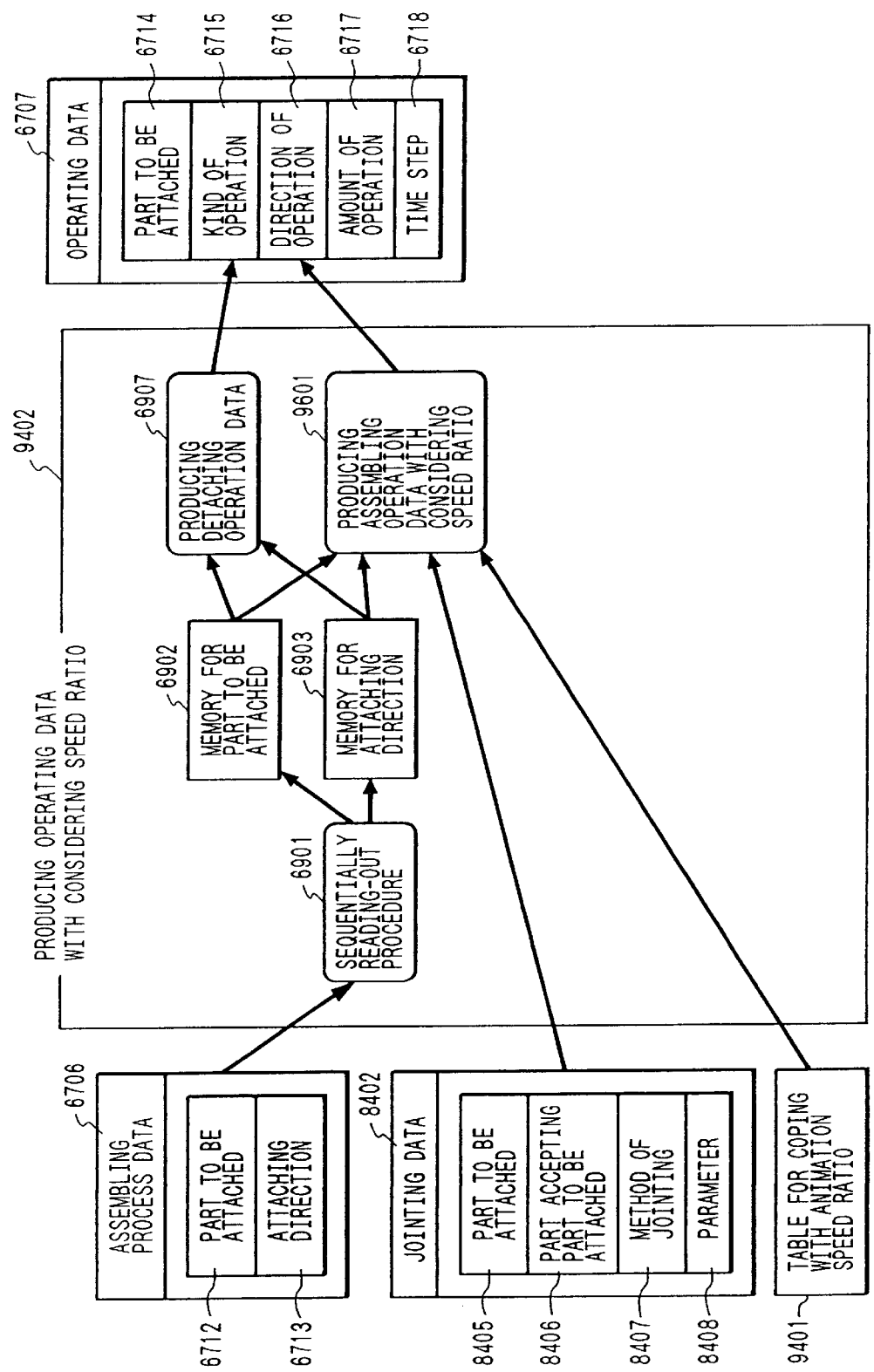
FIG. 96 is a functional diagram showing an apparatus executing operation data producing process.

FIG. 96 is a functional diagram showing the construction of an embodiment of the program 9402 for producing operating data with consideration of the speed ratio. A program 6901 for sequentially reading-out a procedure reads out assembling procedure steps in the assembling procedure data 6906 one by one, and stores them into a memory area 6902 for a part to be attached and a memory area 6903 for indicating the attaching direction.

A program 6907 produces the detaching operating data in which the starting point is the position of an assembled state of the part to be attached and the ending point is the position proceeding in the direction opposite to the attaching direction read out from the memory area 6903. The operating data produced is stored as the operating data 6707.

A program 9601 produces assembling operating data having an animation time with consideration of a speed ratio in which the starting point is the ending point in the program 6907 for producing detaching operating data and the ending point is the position of an assembled state of the part to be attached. The operating data produced is stored as the operating data 6707.

Figure 97:
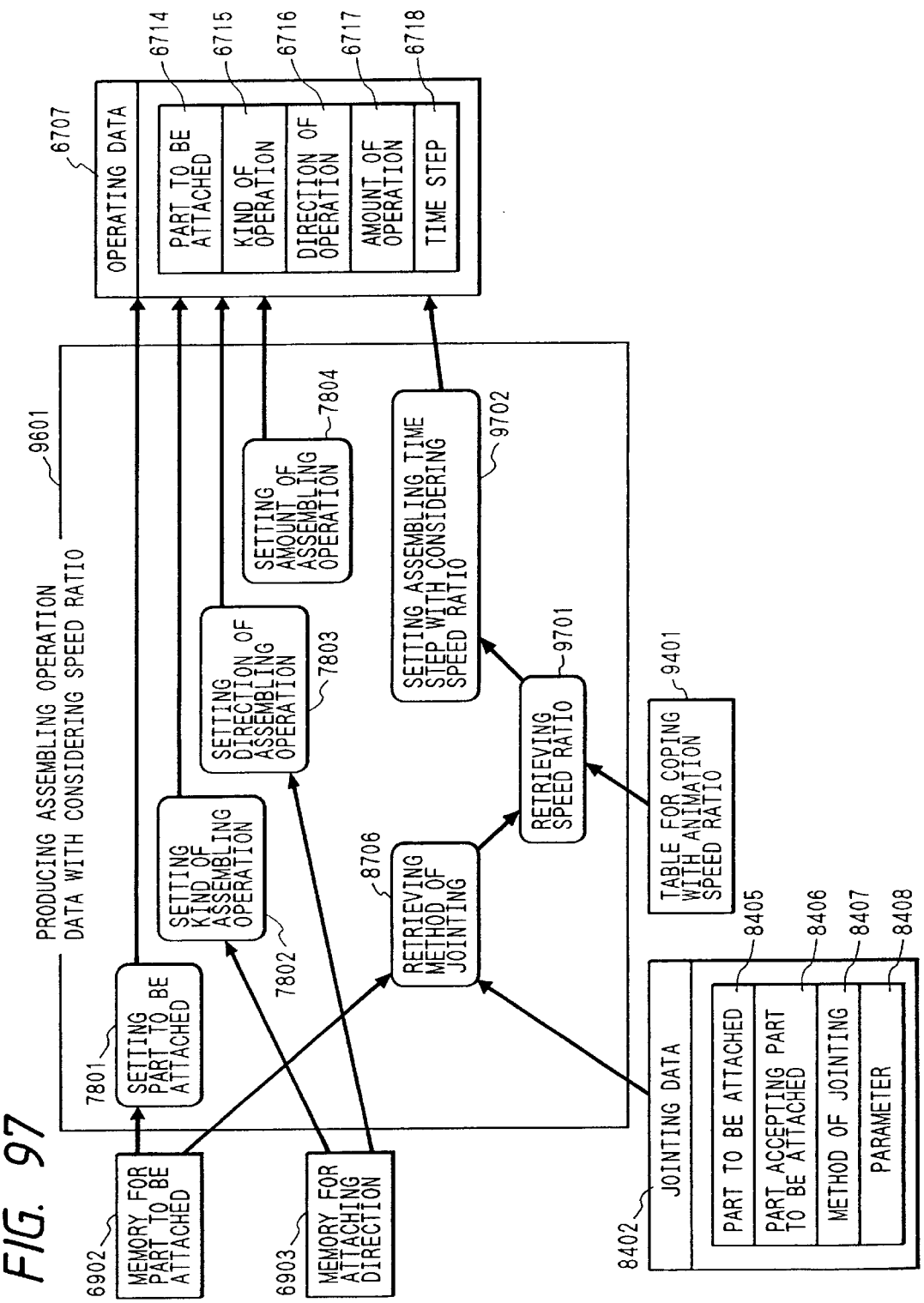
FIG. 97 is a functional diagram showing an apparatus executing assembling operation data producing process.

FIG. 97 is a functional diagram showing the construction of an embodiment of the program 9601 for producing assembling operating data with consideration of a speed ratio. The process from the program 8701 for setting a part to be attached to the program 7804 for setting an amount of the assembling operation is the same as described in connection with FIG. 78.

A program 8706 retrieves the part to be attached data read out from the memory 6902 for a part to be attached in the jointing delta 8402. A program 9701 retrieves the speed ratio of the jointing method retrieved by the program 8706 from the table 9401.

A program 9702 for setting an assembling time step with consideration of speed ratio receives a speed ratio from the program 9701, and calculates a time step, and stores it as the time step 6718 in the operating data 6707.

Description will be made below using an example of the principle where the program 9601 for producing assembling operating data takes into consideration a speed ratio. FIG. 98 shows an assembled state of three parts 9801, 9802 and 9803. The attaching direction of the parts 9802, 9803 is the directional vector 9804.

This assembling procedure data is, for example, is shown in FIG. 99. The step 9901 is to set the part 9801 in the beginning, and the sequence of attaching is first the part 9802 and then the part 9803 according to the steps 9902, 9903.

FIG. 100 shows input jointing data. The description of this example will be made only with respect to setting of the assembling time step of the part 9802, which is as follows.

Firstly, the step 9902 of the part to be attached 9802 is retrieved by the program 8706 for retrieving a jointing method with reference to the jointing data shown in FIG. 100, and the jointing method "snap" is obtained.

Next, the indication "snap" is retrieved by the program 9701 for retrieving a speed ratio with reference to the tables shown in FIG. 95, and the speed ratio "1.0" is obtained. Then, a starting time and an ending time are calculated by the program 9702 for setting the assembling time step, and the result is stored in the operating data 6707.

The starting time (ST1) and the ending time (ET1) are obtained by the following equation.

$$ST1 = T_{const} \tag{10}$$

$$ET1 = T_{const} + RT1 \times T_{int} \tag{11}$$

where $T_{const}$ is a constant value of the time step, and is equal to the ending time of each part to be attached in the detaching operation data. $T_{int}$ is a standard animation time during which a part-to-be-attached is changed from a detached state to an attached state. RT1 is a speed ratio retrieved by the program 9701, and is "1.0" in this case. The resultant operating data is shown in the row 10101 in FIG. 101.

Setting of the assembling time step in the next step 9903 is as follows. Firstly, the part to be attached 9803 in the step 9903 is retrieved with referring to the jointing data shown in FIG. 100, and the jointing method "screw" is obtained.

Next, the indication "screw" is retrieved by the program 9701, and the speed ratio "1.5" is obtained. Then, a starting time and the ending time are calculated by the program 9702 for setting the assembling time step, and the results are stored in the operating data 6707.

The starting time (ST2) and the ending time (ET2) are obtained by the following equation.

$$ST2 = ET1 \tag{12}$$

$$ET2 = ST2 + RT2 \times T_{int} \tag{13}$$

where RT2 is the speed ratio retrieved by the program 9701, and is "1.5" in this case. The starting time (ST2) is the ending time (ET1) of the preceding part to be attached. The ending time (ET2) is calculated by using the product of the standard animation time and the speed ratio as the animation time.

It can be understood from this that the animation time of the part 9803 is larger than that of the part 9802, and therefore the part 9803 moves slower than the part 9802.

Figure 102:
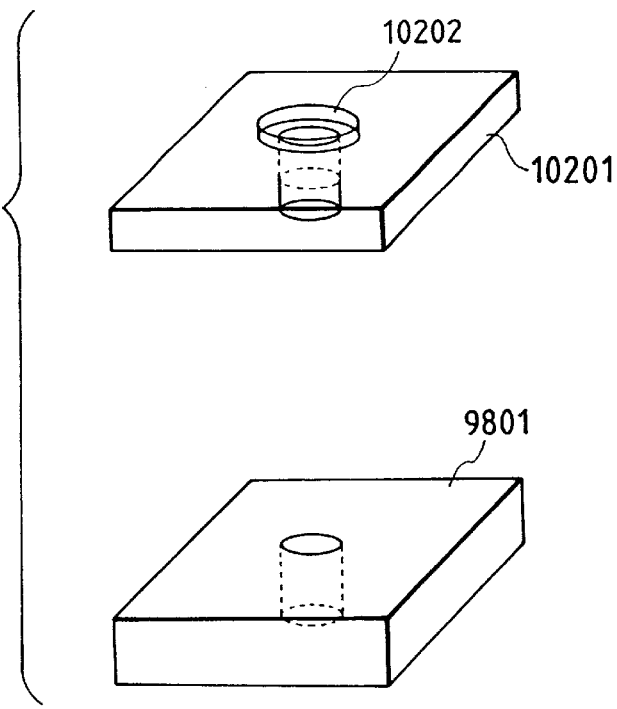
FIG. 102 is a diagram showing an animation display based on the operation data for an assembling operation produced by an embodiment according to the present invention.
Figure 103:
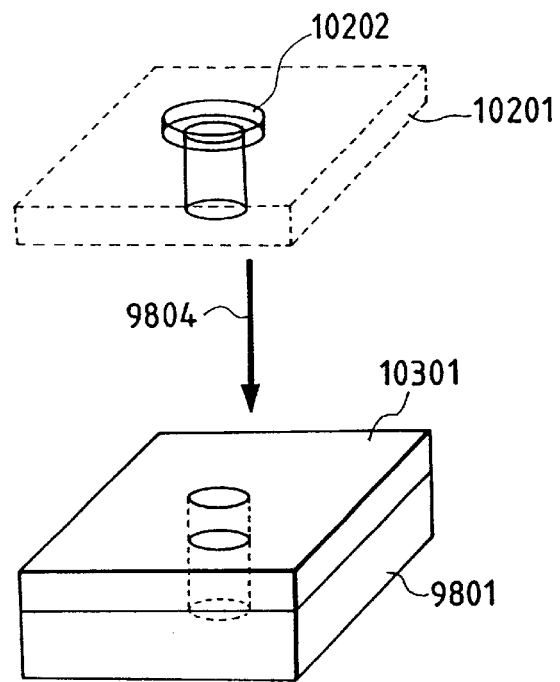
FIG. 103 is a diagram showing an animation display based on the operation data for an assembling operation produced by an embodiment according to the present invention.
Figures 104, 106:
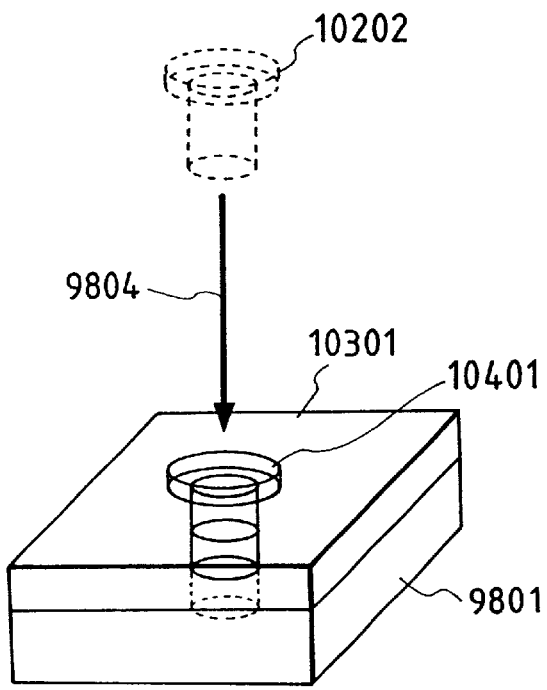
FIG. 104 is a diagram showing an animation display based on the operation data for an assembling operation produced by an embodiment according to the present invention.
FIG. 106 is a diagram showing a table for working sound.

FIG. 102 to FIG. 104 are views showing the process displayed by an animation which is produced by using the operating data shown in FIG. 79 as input data and producing the animation of the process 6604 shown in FIG. 66. Therein, $D_{const}=1.0$, and $T_{int}=5.0$. Herein, the animation process from a detached state will be described, assuming that the animation of the detaching operating data has been completed.

FIG. 102 shows a state where the parts 10202 and 10203 are detached, that is, a state just before starting of the assembling operation. The time step at this time is ST1 (1.0).

Firstly, an animation of the part to be attached 10201 is started at time step "1.0", the part to be attached 10201 moves in the direction of the attaching direction vector 9804 and proceeds to the position of the part 10301 at time step ET1 (6.0), and then the animation ends. This feature is shown in FIG. 103. The animation time of the part to be attached 10201 is 5.0 seconds.

Next, an animation of the part to be attached 10202 is started at time step ST2 (6.0), the part to be attached 10202 moves in the direction of the attaching direction vector 9804 and proceeds to the position of the part 10401 at time step ET2 (13.5), and then the animation ends. This feature is shown in FIG. 104. The animation time of the part 10202 is 7.5 seconds, and is longer than that of the part 10201 by 2.5 seconds.

A larger value is employed as the speed ratio described in the embodiment as the assembling becomes more difficult. Although the animation speed is expressed as a ratio to the time for a standard assembling operation, the actual assembling time may be employed by setting it in a table.

In this case, the starting time STn and the ending time ETn are obtained by the following equation. Therein, Bn expresses the method of jointing, and function RT expresses the assembling time corresponding to the method of jointing Bn.

$$ETn = STn + RT(Bn) \tag{14}$$

As described above, by changing the animation time depending on the degree of difficulty in assembling of a part, the details of assembling as well as the order of assembling can be easily confirmed.

Figure 105:
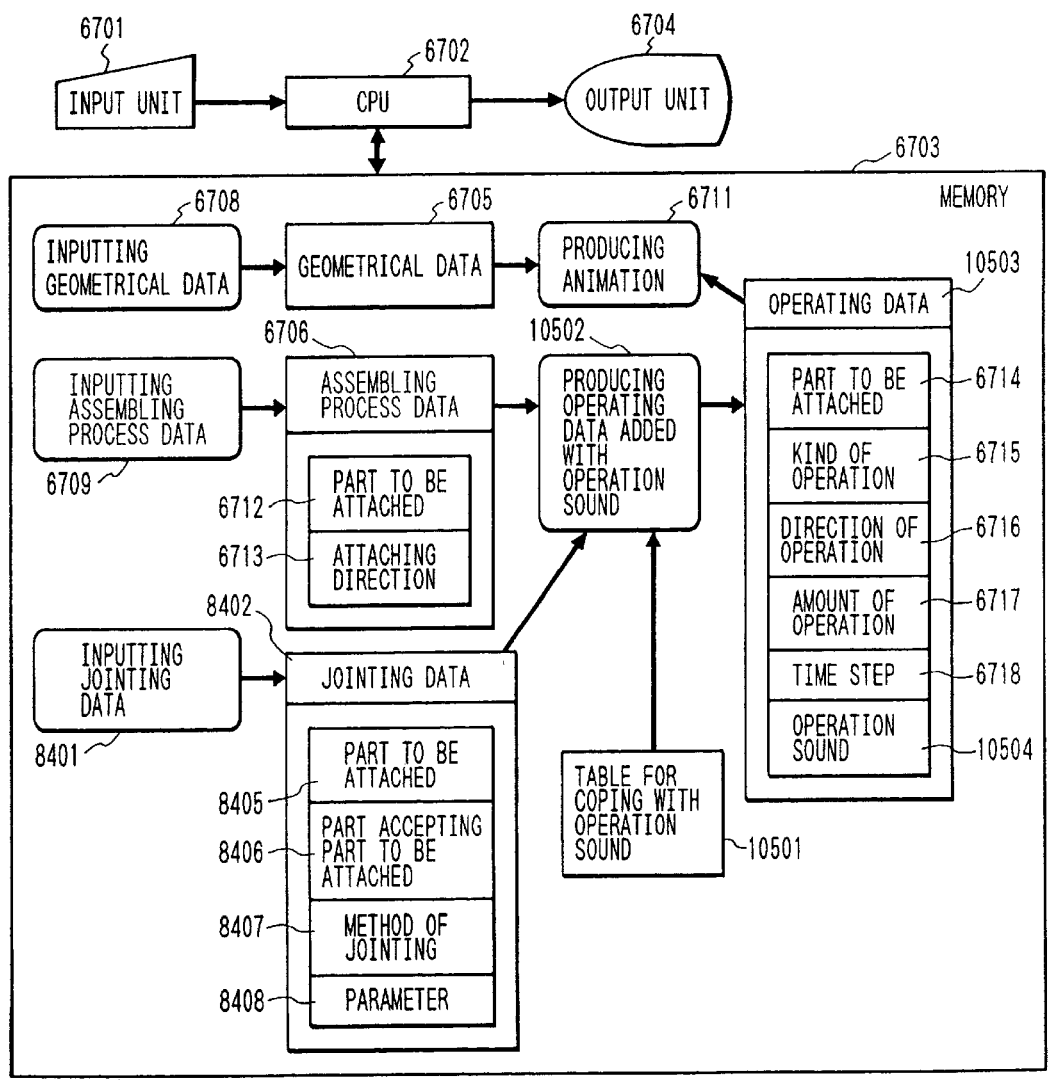
FIG. 105 is a block diagram showing an apparatus forming an embodiment according to the present invention.

A further embodiment of the present invention will be described below. FIG. 105 is a block diagram showing the construction of an apparatus for producing animation of an assembling operation which includes the apparatus for producing animation in FIG. 94, and in which the table 9401 for consideration of animation speed ratio is changed to a table 10501 concerning operation sound, and the program 9402 for producing operating data for consideration of speed ratio is changed to a program 10502 for producing operating data with operation sound data, and the operating data 6707 is changed to operating data 10503 with operation sound data 10504.

The program 10502 reads out each part to be attached from the assembling procedure data 6706 and jointing data from the jointing data 8402, and produces operation data with reference to the table 10501 providing operation sound data, and stores it to the operating data 6707. The table 10501 is a table for providing correspondence between the method of jointing in the jointing data and the sound generated at the time of performing work with the method of jointing.

Figure 107:
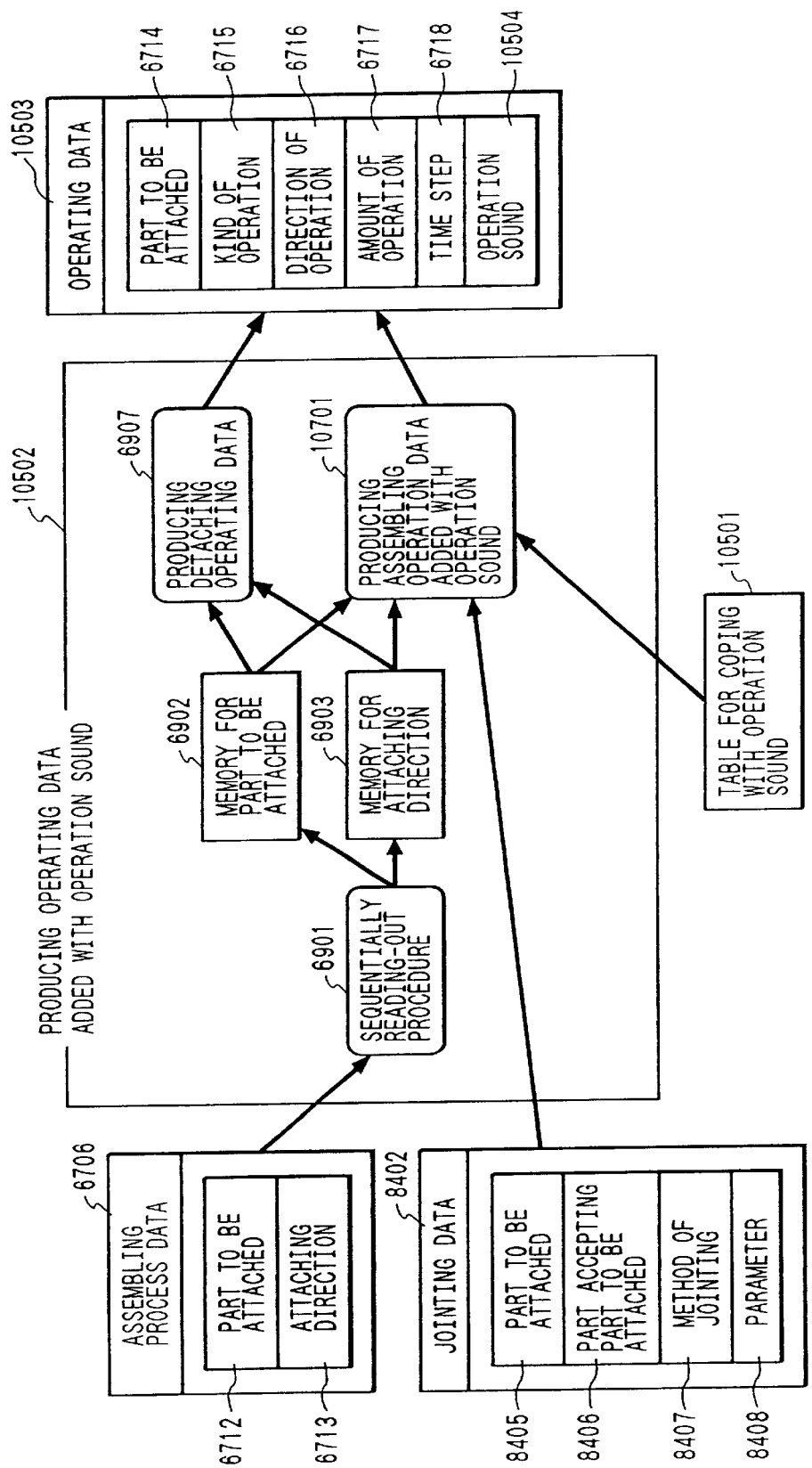
FIG. 107 is a functional diagram showing an apparatus executing operation data producing process.

FIG. 107 shows an example of the table 10501. The methods of jointing for assembling, such as snap, screw, welding, soldering and so on, are set in the column of jointing methods 10601, and the actual work sounds generated at the time of performing assembling work corresponding to the method of jointing are set in the column of operation sounds 10602 as, for example, digitized data.

FIG. 107 is a functional diagram showing the construction of an embodiment of the program 10502 for producing operating data to which is added operation sound data. A program 6901 for sequentially reading-out a procedure reads out assembling procedure step sin the assembling procedure data 6906 one by one, and stores them into a memory area 6902 for a part to be attached and a memory area 6903 for indicating an attaching direction.

A program 6907 for producing detaching operating data produces the detaching operating data in which the starting point is the position of an assembled state of the part to be attached and the ending point is the position proceeding in the direction opposite to the attaching direction read out from the memory area 6903. The operating data produced is stored as the operating data 10503.

A program 10701 produces the assembling operating data to which is added operation sound data in which the starting point is the ending point in the program 6907 and the ending point is the position of an assembled state of the part to be attached. The operating data produced is stored as the operating data 10503.

Figure 108:
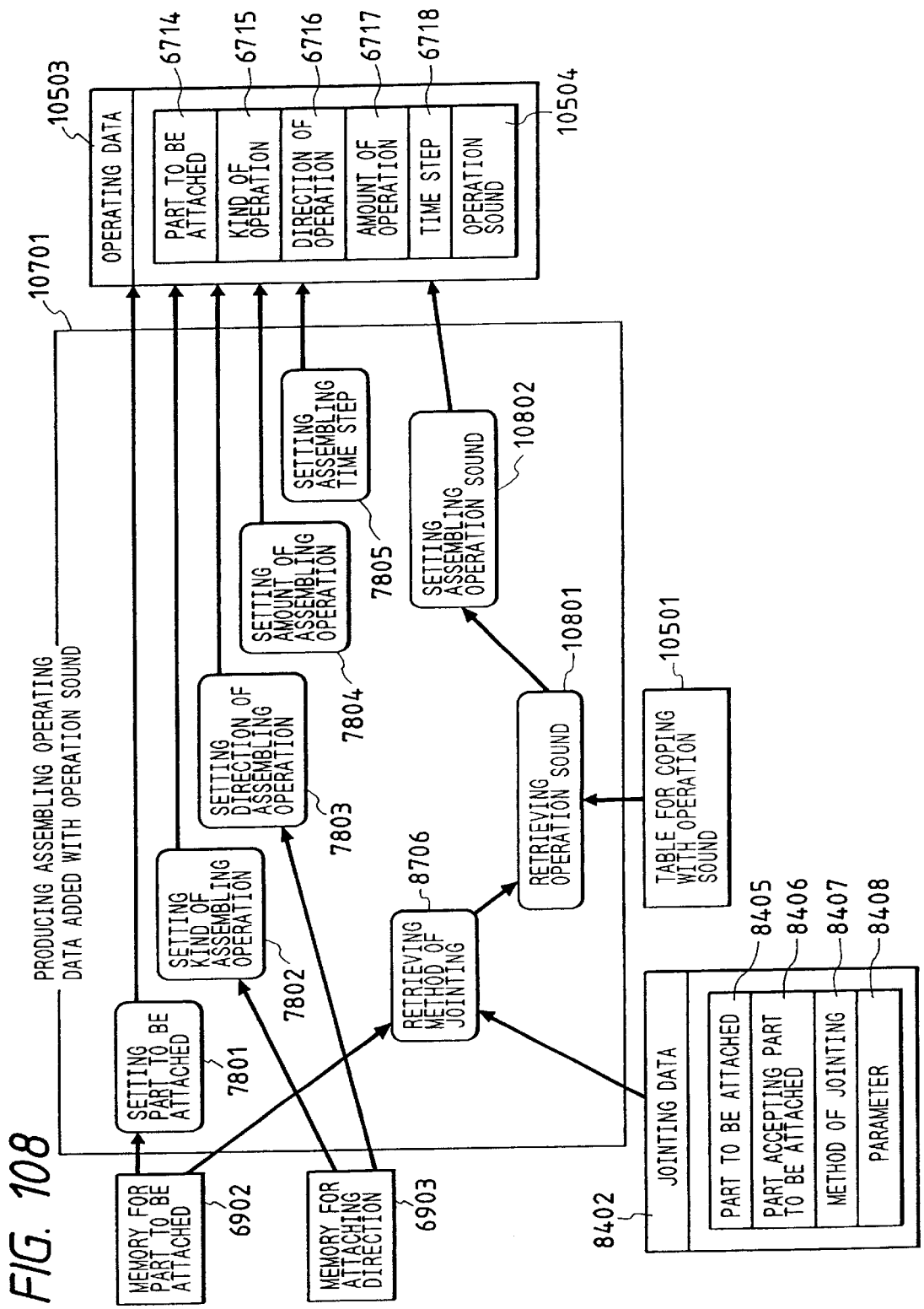
FIG. 108 is a functional diagram showing an apparatus executing assembling operation data producing process.

FIG. 108 is a functional diagram showing the construction of an embodiment of the program 10701. The process from the program 8701 for setting a part to be attached to the program 7805 for setting an assembling time step is the same as described in connection with FIG. 78.

A program 8706 for retrieving a jointing method retrieves the part to be attached data read out from the memory area 6902 for a part to be attached in the jointing data 8402. A program 10801 for retrieving operation sound data retrieves the work sound data of the method of jointing retrieved by the program 8706 from the table 10501.

A program 10802 for setting sound data receives operation sound data from the program 10801, and stores it as the operation sound data 10504 in the operating data 10503.

Description will be made below of the principle of the program 10701, referring to FIG. 68, FIG. 69, FIG. 70. Herein, only the setting of the operation sound data for the parts 9802 and 9803 will be described.

The setting of the operation sound data in the step 9902 is as follows. Firstly, the step 9902 of the part to be attached 9802 is retrieved by the program 8706 with reference to the jointing data shown in FIG. 100, and the jointing method "snap" is obtained.

Next, the operation sound "none" corresponding to "snap" is obtained by the program 10801 with reference to the table shown in FIG. 106. Then, the operation sound data is stored as the operation sound 10504 in the operating data 10503 by the program 10802. The resultant operating data is shown in the row 10901 in FIG. 109.

Setting of operation sound data in next step 9903 is as follows. Firstly, the part to be attached 9803 in the step 9903 is retrieved with reference to the jointing data shown in FIG. 100, and the jointing method "screw" is obtained.

Next, the indication "screw" is retrieved by the program 10801, and the operation sound data is obtained. Then, the operation sound data is stored as the operation sound 10504 in the operating data 10503. The resultant operating data is shown in the row 109C)2 in FIG. 109.

Description will be made below using FIG. 102, FIG. 103 and FIG. 104 on the process of an animation display where the animation of the process 6604 shown in FIG. 66 is produced with the operating data shown in FIG. 109 as input data. Therein, the process of the animation will be described starting from a disassembled state by assuming that the animation of the detaching operating data has been completed.

FIG. 102 shows a state where the parts 10202 and 10203 are detached, that is, a state just before the starting of the assembling operation. Firstly, a part 3901 moves in the direction of the attaching direction vector 3504 as shown in FIG. 103. At this time, since the sound data of the operating data is "none", no operation sound is produced. The part 3901 proceeds to the position of the part 10301, and then the animation ends.

Next, the part 10202 moves in the direction of the attaching direction vector 9804. At this time, since a digitized operation sound data is set as the operating data 10902, the data is transferred to a DA converter to reproduce the operation sound "frizzle". The part 10202 proceeds to the position of the part 10401 while the operation sound is being produced, and then the animation ends.

Although the operation sound is obtained depending on the kind of the jointing method for the part to be attached in this embodiment, the tone of the sound, the kind of the sound, the source of the sound and the volume of the sound of the operation may be changed depending on the kind of operation or a parameter of the operation.

In the aforementioned embodiments, the amount of the operation is fixed to a constant value. An embodiment where the amount of the operation is calculated from geometrical data will be described below.

Figure 110:
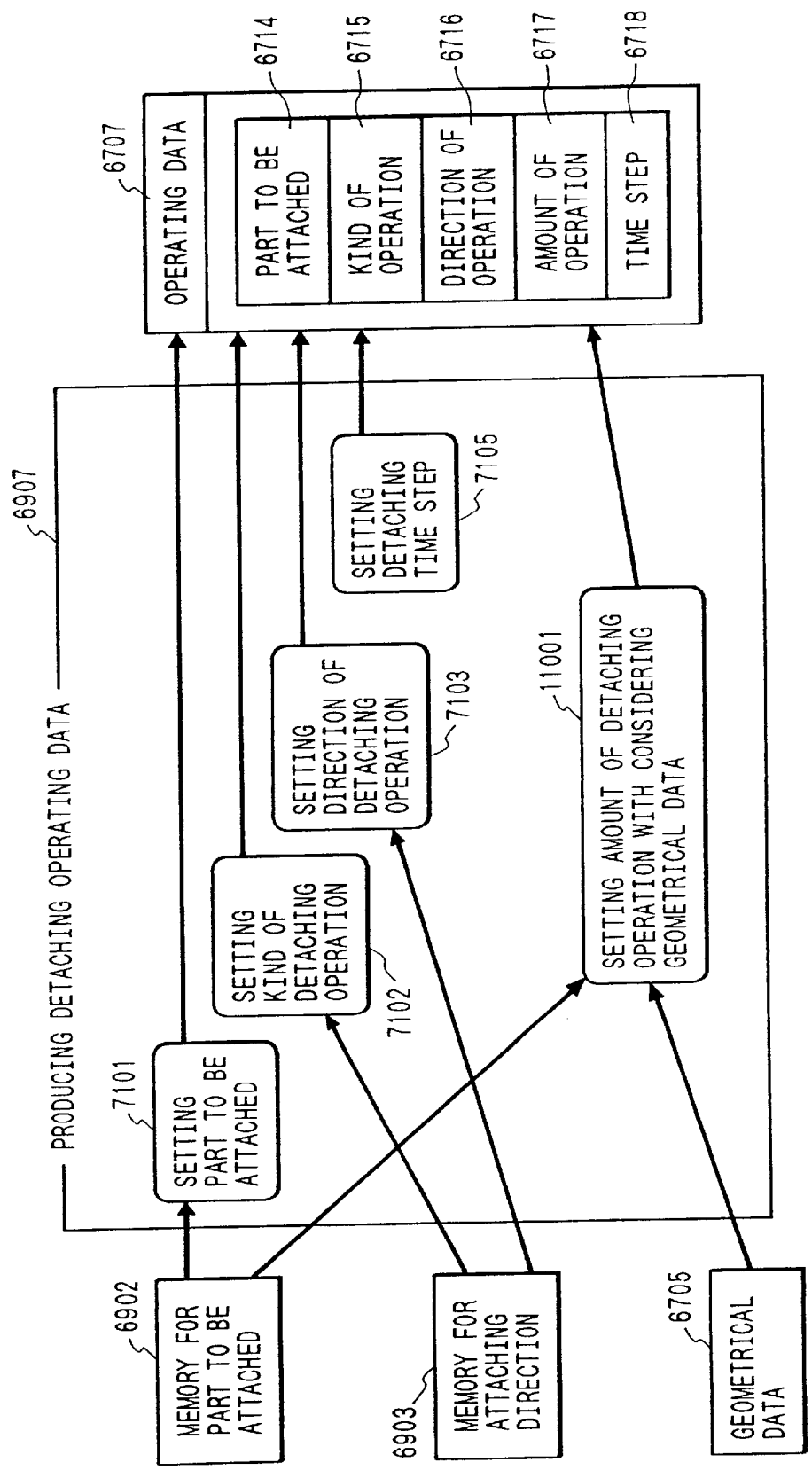
FIG. 110 is a functional diagram showing an apparatus executing detaching operation data producing process.

FIG. 110 is a block diagram showing the construction of an apparatus for producing animation of an assembling operation including the apparatus for producing detaching operating data in FIG. 71, and wherein geometrical data 6705 is added and the program 7104 for setting the amount of the detaching operation is changed to a program 11001 for setting the amount of the detaching operation in consideration of geometrical data.

The program 11001 reads out each part to be attached from the memory area 6902 for a part to be attached and calculates the amount of the detaching operation using the geometrical data, and stores it to the operating data 6707.

Description will be made below using an example of the principle where the program 11001 for setting amount of the detaching movement considering geometrical data calculates the amount of the detaching movement. In this embodiment, the maximum length of the sides in a polygonal column as a bounding box containing all the parts of an assembly is used.

FIG. 111 shows the geometry of an assembly for the purpose of explanation. A part 11101 is a part set at the beginning. A part 11102 is a part to be attached to the part 11101 in a direction 11104. A part 11103 is a part to be attached to the part 11101 in a direction 11105. Firstly, a bounding box containing the parts 11101, 11102, 11103 is obtained from the geometrical data 6705.

FIG. 112 shows the bounding box 11201 containing the three parts. The side lengths of the bounding box are a side length 11202 in the direction of X-axis, a side length 11203 in the direction of Y-axis, a side length 11204 in the direction of Z-axis.

Next, the longest side length 11203 among the three side lengths is obtained. Let the longest side length be $L_{max}$. The amount of the detaching movement D is obtained by the following equation. Therein, n is a predetermined constant value.

$$D = n \times L_{max} \qquad (15)$$

Figure 113:
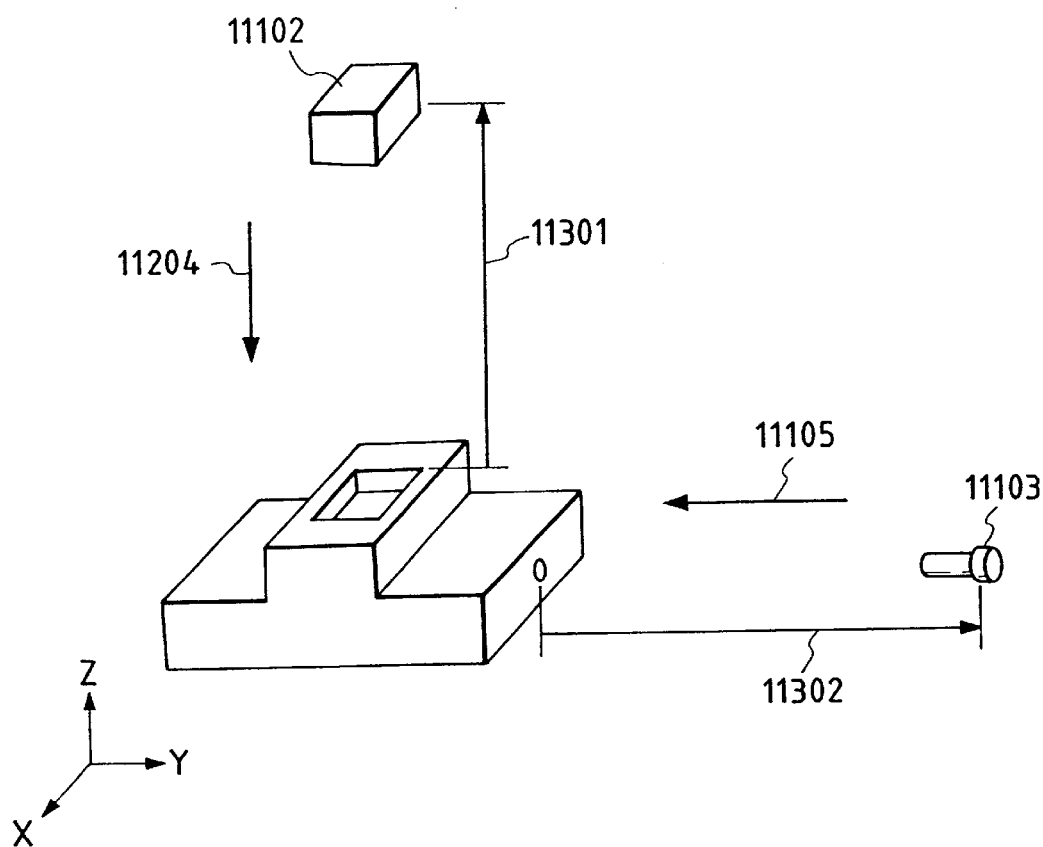
FIG. 113 is a diagram showing an animation display based on the operation data for a detaching operation produced by an embodiment according to the present invention.

FIG. 113 shows a feature of the animation result in which the parts are detached by the amount obtained from the above method. The part to be attached 11102 is moved from the attached state in the direction opposite to the attaching direction 11104 by the distance 11301, and the part to be attached 11103 is moved from the attached state in the direction opposite to the attaching direction 11105 by the distance 11302. The distance 11301 and the distance 11302 are the amount of the detaching movement D.

Figure 114:
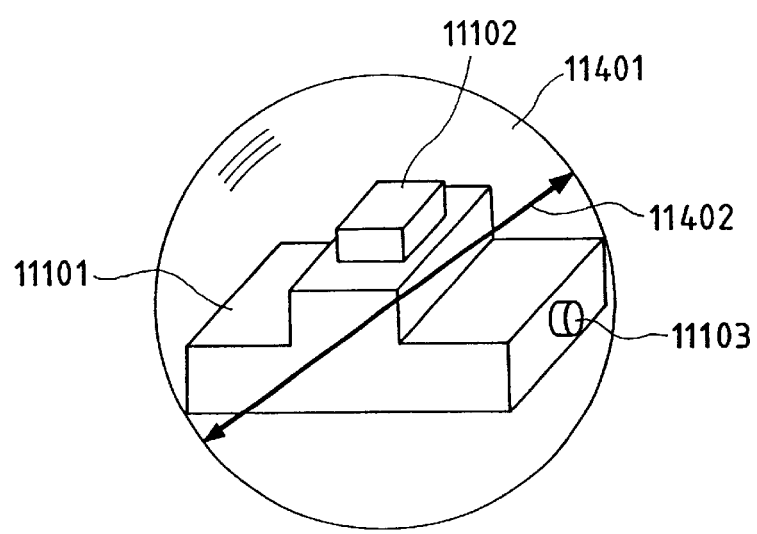
FIG. 114 is a diagram showing a bounding box containing the geometry of the parts of an assembly.

Although a polygonal column is used as a bounding box in the above embodiment, a sphere containing all the parts of an assembly may be used. FIG. 114 shows an example where the diameter of a sphere containing all the parts of an assembly as a bounding box is used.

Firstly, a bounding box 11401 containing the parts 11101, 11102, 11103 is obtained from the geometrical data 6705, and the diameter 11401 is assumed to be $L_{max}$. The process after this is the same as in the case of the bounding box of the polygonal column.

Although the amount of the detaching movement is calculated based on a bounding box containing all the parts of an assembly in this embodiment, the amount of the detaching movement may be calculated based on a bounding box containing only a part of an assembly set in the beginning. By doing so, an amount of movement fit to the size of an assembly can be set and an animation which is easy to be understood can be obtained.

Figure 115:
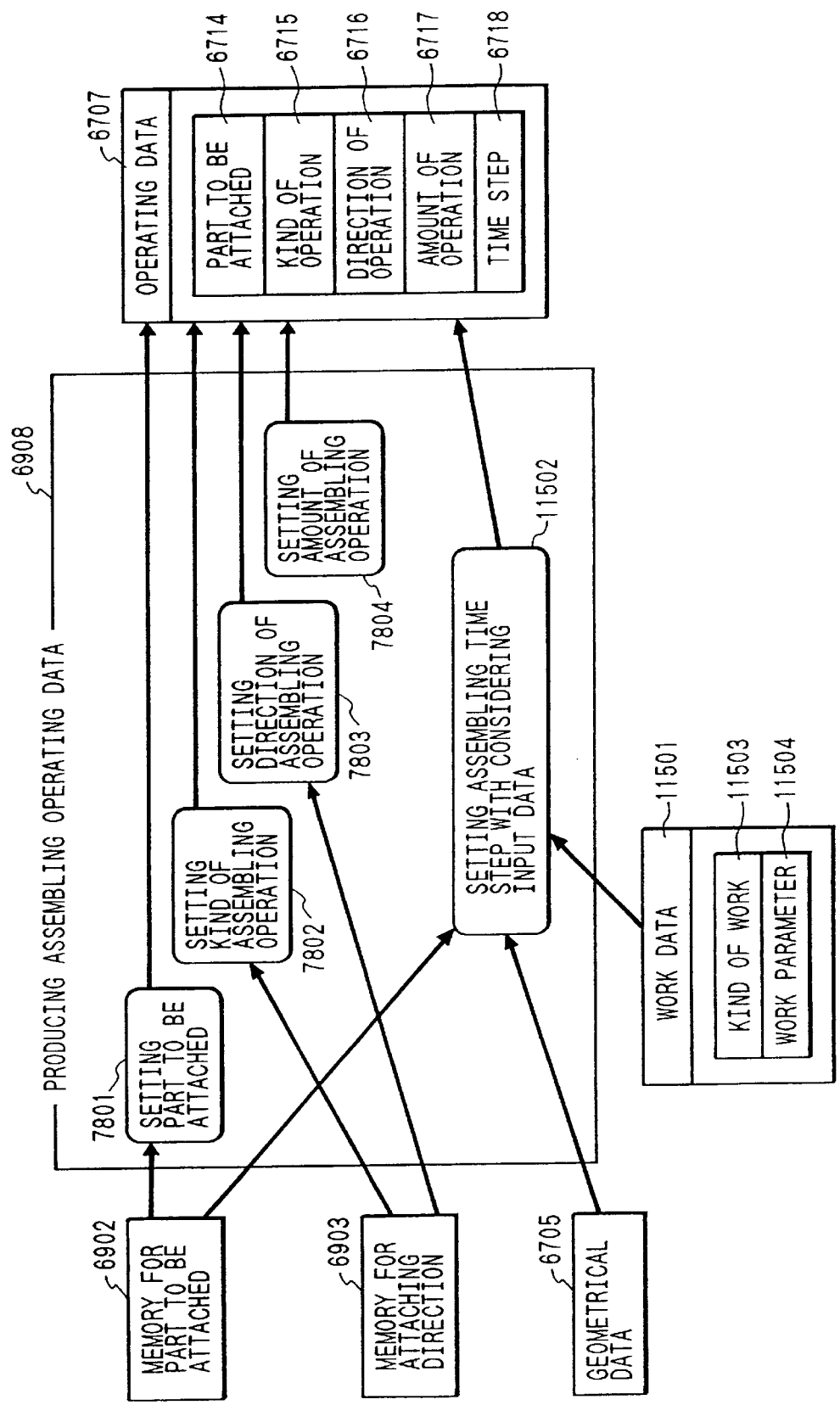
FIG. 115 is a functional diagram showing an apparatus executing operation data producing process.

Another embodiment for setting a time step in the program 6908 producing assembling operation data will be described below. FIG. 115 is a block diagram showing the construction of an apparatus for producing assembling operating data including the construction of the apparatus for producing operating data shown in FIG. 78, and wherein geometrical data 6705 and work data 11501 are added, and the program 7805 for setting an assembling time step is changed to a program 11502 for setting an assembling time step with reference to input data.

The work data 11501 is composed of a kind of work 11503 expressing kinds of work and a work parameter 11504 expressing detailed data of the work.

The program 11502 reads out a part for attaching from the memory area 6902, reads out geometrical data of the part for attaching from the geometrical data 6705, reads out an attaching direction from the memory area 6903 and reads out work data from work data 11501, and calculates an assembling time step using these data, and then the result is stored in the time step 6708 in the operating data 6707.

Description will be made below using an example of the principle where the program 11502 for setting assembling time step considering input data calculates an assembling time step. Firstly, an example of calculating a time step using geometrical data will be described. In this embodiment, the volume of a part to be attached is used.

Figure 116:
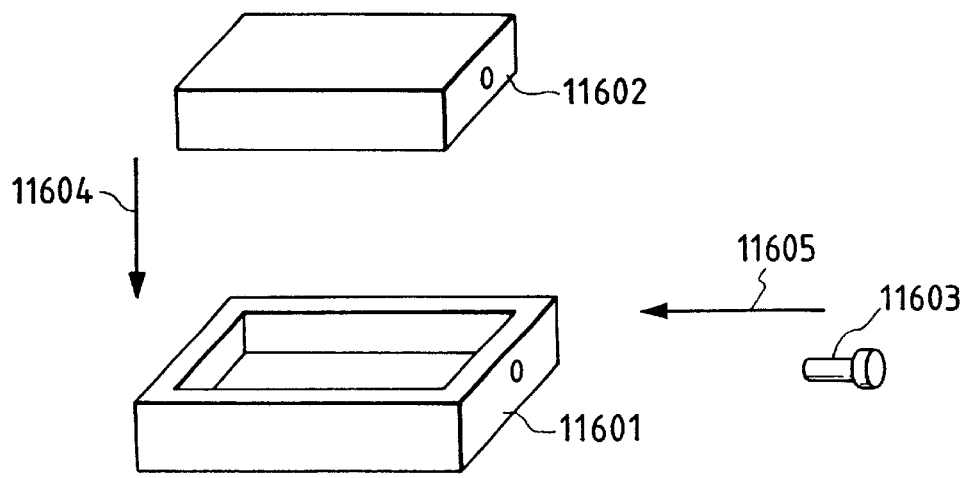
FIG. 116 is a diagram showing an example of an assembly detached by a detaching operation.

FIG. 116 shows the geometries of parts to be attached in a disassembled state for the purpose of explanation. A part 11601 is a part set at the beginning. A part 11602 is a part to be attached to the part 11601 in a direction 11604. Then, a part 11603 is a part to be attached to the part 11601 in a direction 11605. Firstly, the volumes of the part 11602 and 11603 are calculated from the geometrical data of the parts.

Next, a time step is determined having an animation time proportional to the size of the obtained volume of the part. Let the obtained volume of the part 11602 be $Vol_1$, and the obtained volume of the part 11603 be $Vol_2$. The volume of the part 11602 is larger than the volume of the part 11603, as can be understood from the sizes of geometries in FIG. 116, $Vol_1 > Vol_2$. The starting time step (ST1) and the ending time step (ET1) of the part 11602 are obtained by the following equations.

$$ST1 = T_{const} \tag{16}$$

$$ET1 = ST1 + Vol_1/V_{const} \tag{17}$$

where $V_{const}$ is a preset volume per 1 second of animation time.

The starting time step (ST2) and the ending time step (ET2) of the part 11603 are obtained by the following equations.

$$ST2 = ET1 \tag{18}$$

$$ET2 = ST2 + Vol_2/V_{const} \tag{19}$$

In the assembling animation using the assembling time steps obtained above, firstly the part 11602 moves slowly in the attaching direction 11604 to be attached to the part 11601, and then the part 11603 moves rapidly in the attaching direction 11605 to be attached to the part 11601.

Although the time step is determined by the animation time proportional to the size of the volume of a part to be attached in this embodiment, the time step may be obtained by calculating a function for calculating animation time using volume (Vol) as a parameter of the function for calculating animation time. The equations to calculate a time step of the part 11602 are as follows.

Therein, F(Vol) is an arbitrary function of Vol as a parameter, and the content is, for example, $F(Vol) = 3.0 + (Vol + 10.0)/V_{const}$.

$$TS1 = T_{const} \tag{20}$$

$$ET1 = ST1 + F(Vol_1) \tag{21}$$

In another manner, the time step may be calculated using $Vol_1$ or $Vol_2$ obtained from the volume of a bounding box of a part to be attached.

Although the time step is determined from the volume of a part to be attached in the above embodiments, the time step may be calculated from the maximum side length of a bounding box of a polygonal column or the diameter of a bounding box of a sphere for a part to be attached. By doing so, it is possible to obtain an animation in which a large part to be attached moves slowly and a small part to be attached moves rapidly.

An embodiment for calculating a time step from an attaching direction will be described below. In the embodiment, the crossing angle of an attaching direction of a part to be attached and the direction of Z-axis of a coordinate system, that is, the direction of the gravity are used.

Figure 117:
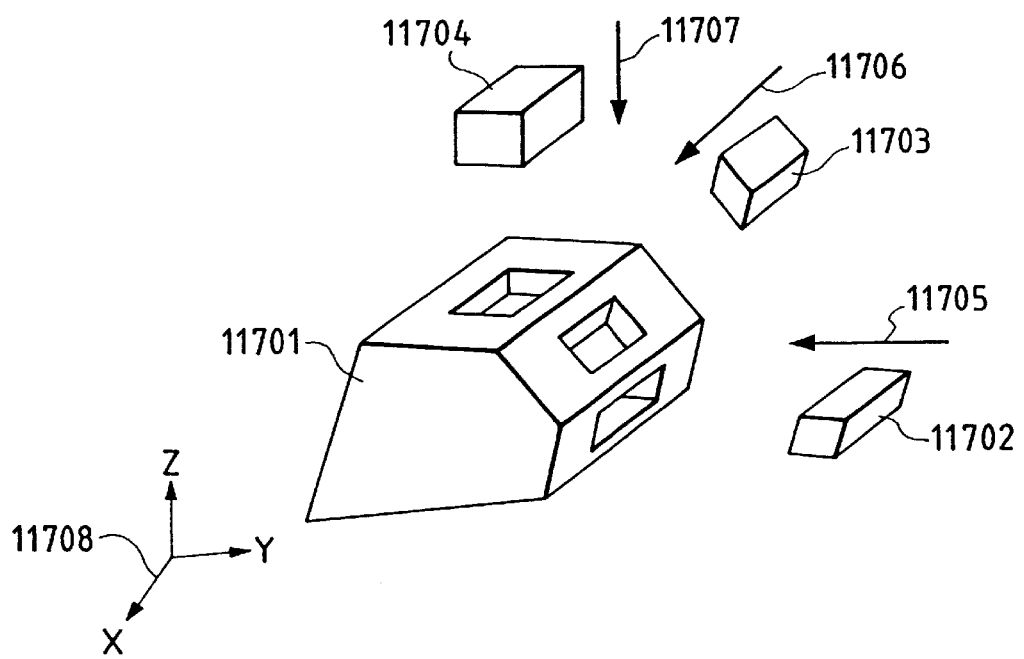
FIG. 117 is a diagram showing an example of an assembly detached by a detaching operation.

FIG. 117 shows the geometries of parts in a disassembled state for the purpose of explanation. A part 11701 is a part set at the beginning. Firstly, a part 11702 is attached to the part 11701 in an attaching direction 11705. Next, a part 11703 is attached to the part 11701 in an attaching direction 11706. Finally, a part 17704 is attached to the part 11701 in an attaching direction 11707.

In the first step, the crossing angles of attaching directions 11705, 11706, 11707 of the parts to be attached 11702, 11703, 11704 and the direction of the -Z-axis of a coordinate system 11708 are obtained. Let the obtained angles be D1, D2, D3, respectively.

FIG. 118 shows the relationship between the direction of the -Z-axis and the obtained angles. In the figure, the line segments shown by dotted lines indicate the directions having angles to the -Z-axis 11801 with units of 45 degrees, and the numbers 11802 shown at the ends of the dotted lines indicate coefficients for obtaining animation time. The angles of the attaching directions 11705, 11706, 11707 are indicated by the arrows 11803, 11804, 11805.

The animation times for the parts are obtained by the following equations.

$$T1 = T_{int} \times (0.2 + 0.2 \times (D1/45.0)) \tag{22}$$

$$T2 = T_{int} \times (0.2 + 0.2 \times (D2/45.0)) \tag{23}$$

$$T3 = T_{int} \times (0.2 + 0.2 \times (D3/45.0)) \tag{24}$$

where T1, T2, T3 are the animation times for the parts 11702, 11703, 11704. $T_{int}$ is the standard animation time explained in FIG. 67.

Next, the starting time and the ending time are obtained from the animation time. As can be understood from FIG. 118, since a decreasing order of the angles is D1>D2>D3, it is obtained that T1>T2>T3. Thereby, the animation times of the three parts become, in the increasing order of the parts to be attached, 11704, 11703, 11702.

As described above, the assembling animation time becomes shorter as the attaching direction becomes closer to the direction of gravity, and the assembling animation time becomes longer as the attaching direction becomes far apart from the direction of gravity.

Next, an embodiment for calculating the time step from work data will be described. In this embodiment, the kind of work and the work parameter composing the operating data for a part to be attached are used. FIG. 119 shows the operating data. The kind of work 11901 expresses a kind of work, such as arc welding, spot welding, soldering and so on.

The work parameter 11902 is detailed data corresponding to the kind of work 11901, and, for example, expresses the length to be welded in a case of arc welding. This embodiment shows an example where the kind of work 5601 is arc welding.

FIG. 120 shows geometries of parts in a disassembled state for the purpose of explanation. A part 12001 is, a part set at the beginning. A part 12002 is attached to the part 12001 in an attaching direction 12003, and an arc portion 12004 of the part 12001 and an arc portion 12005 of the part 12002 are welded together.

The assembling animation time (T1) at this time determined by calculating an animation time ratio using the kind of work and the work parameter and multiplying the standard animation time $T_{int}$ described in FIG. 67. This equation is shown below.

$$T1 = T_{int} \times G(K_{ind}, P_{ara}) \tag{25}$$

where $G(K_{ind}, P_{ara})$ is a function calculating an animation time ratio using a kind of work $K_{ind}$ and a work parameter $P_{ara}$.

Figures 121A, 121B:
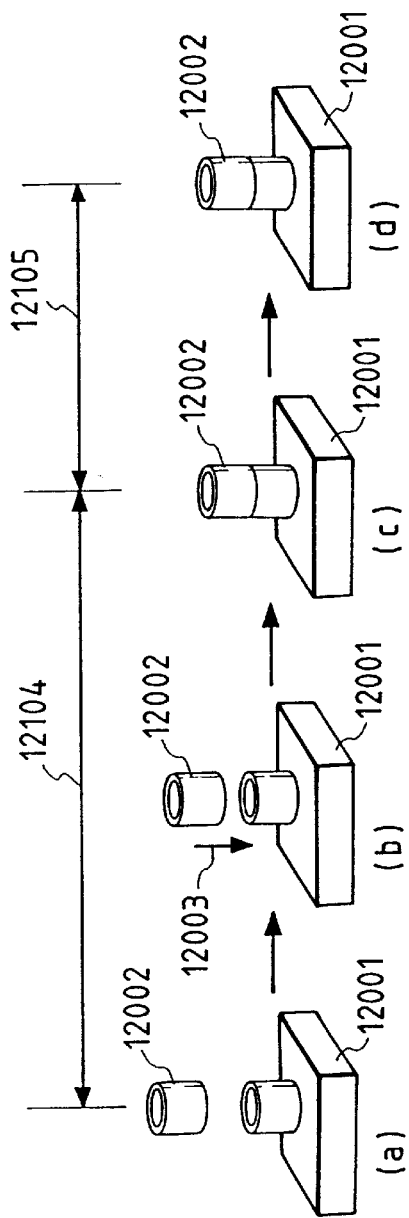

FIG. 121(A) shows the content of the function G. In a case of arc welding, the equation 12102 is specified by an index $K_{ind}$, and the equation 12102 is calculated using an index $P_{ara}$ to determine the value 12103 of the function G. Although a case where the kind of work is arc welding has been described here, the procedure in a case of another kind of work is the same as in this case.

Further, by producing two kinds of assembling operating data expressing an operation in the time period during which the part 12002 moves from the detached position to the position of the part 12001 and an operation in the time period during which the welding is actually performed, the actual welding time is expressed by making the part 12002 motionless.

FIG. 121(B) shows a process of animation where the standard animation time $T_{int}$ is set to the time period in which the part 12002 reaches the position of the part 12001 and the animation time T1 obtained by the function G is set to the time period of actual welding.

In FIG. 121(B), the course of operation (a) shows a state where the part 12002 is a detached state, operation (b) shows a state where the part 12002 is moving in the direction of the attaching direction 12003, and operation (c) is a state where the part 12002 reaches the position of the part 12001. The animation time 12104 from operation (a) to operation (c) becomes $T_{int}$. Then, welding work starts at operation (c) and is completed at operation (d). During operations (c) to (d), the part 12002 is in a motionless state, and the time 12105 is T1.

By using the time step based on geometrical data, an attaching direction and work data, it is possible to obtain an animation by which the degree of difficulty and the detailed sharing of time of the attaching work can be understood from the assembling animation.

An embodiment of operating data to which a display attribution is added will be described below.

Figure 122:
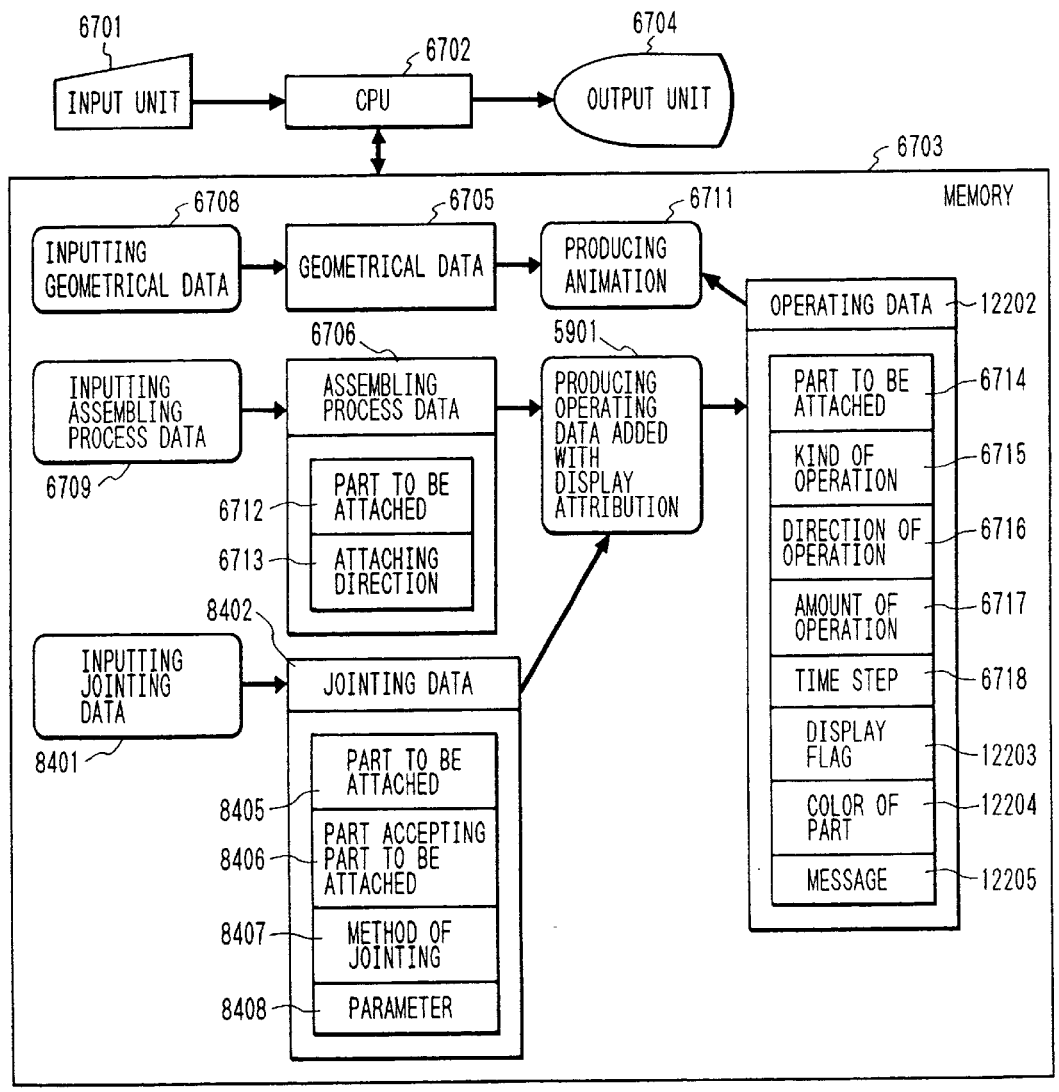

FIG. 122 is a functional diagram showing the construction of an apparatus for producing animation of an assembling operation including the apparatus for producing animation in FIG. 67, and wherein a program 8401 for inputting jointing data and jointing data 8402 described in FIG. 84 are added, and the program 6710 for producing operating data is changed to a program 12201 for producing operating data to which is added a display attribution, and the operating data 6707 is changed to operating data 12202 including a display flag 12203, the color of part 12204, and a message 12205.

The program 12201 produces operating data to which is added a display attribute with reference to the assembling data 6707 and jointing data read out from the jointing data 8402, and stores it in the operating data 12202.

Firstly, description will be made of the method in which the program 12201 sets a display flag 12203 in the operating data 12202.

Figure 123:
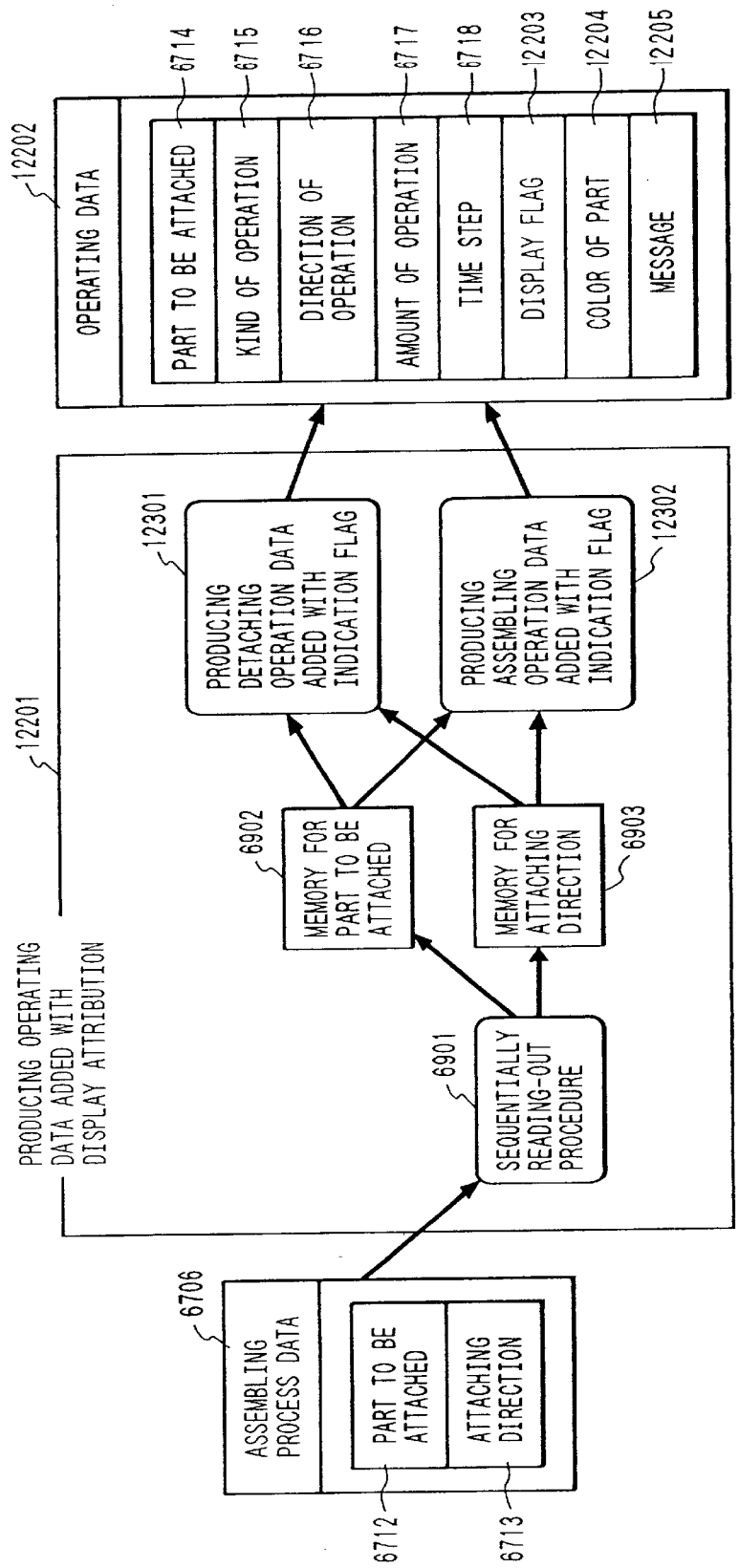

FIG. 123 is a structural diagram showing the function of an embodiment of the program 12201 for producing operating data to which is added a display attribution. The program 6901 reads out the steps of an assembling procedure in the assembling procedure data 6708 one-by-one, and stores it in the memory area 6902 for a part to be attached and the memory area 6903 for indicating the attaching direction.

A program 12301 produces detaching operating data in which the starting point is the position of an assembled state of the part to be attached and the ending point is the position proceeding in the direction opposite to the attaching direction read out from the memory area 6903. The operating data produced is stored as the operating data 12202.

A program 12302 produces assembling operating data in which the starting point is the ending point in the program 12301 and the ending point is the position of an assembled state of the part to be attached. The operating data produced is stored as the operating data 12202.

The process will be described using an example, referring to FIG. 98 and FIG. 99. Since the step 9901 is to set a part in the beginning, operating data is not produced. In step 9902, the display flag 12203 of the detaching operation data is set to "not-display" in the program 12301.

The display flag 12203 of the attaching operation data is set to "display" in the program 12302. The resultant operating data is shown in the rows 12401 and 12403 in FIG. 124.

Figures 124, 125:
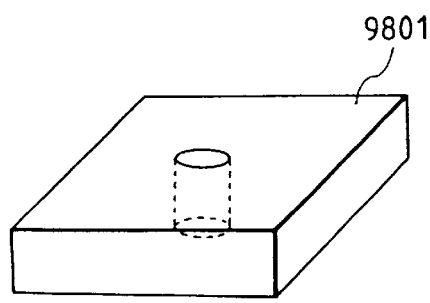
Figure 126:
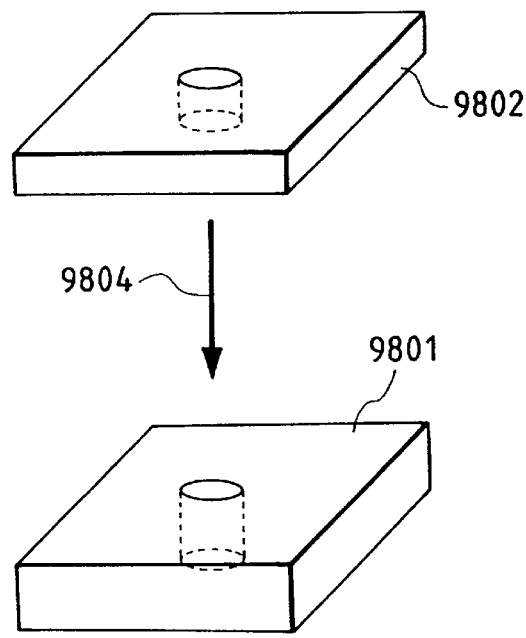
Figure 127:
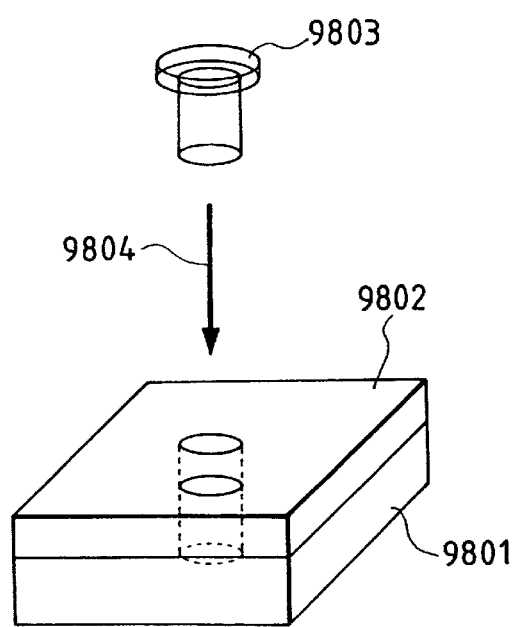

In step 9903, similarly, the operating data 12402 and 12404 is produced. As shown in FIG. 124, the display flag 12405 indicates whether or not a part to be attached is displayed in the animation of the operation. FIG. 125 to FIG. 127 show the course of animation display using the operating data as input data.

In the state where parts to be attached are separated by performing the operation data 12401 and 12502, only the part 9801 is displayed but the parts to be attached 9802 and 9803 are not displayed, as shown in FIG. 125.

Next, as shown in FIG. 126, when the operating data 12403 is performed, the part to be attached 9802 is displayed and the animation is performed by movement of the part in the attaching direction 9804. Then, as shown in FIG. 127, when the operating data 12304 is performed, the part to be attached 9803 is displayed and the animation is performed by moving the part in the attaching direction 9804.

Figure 128:
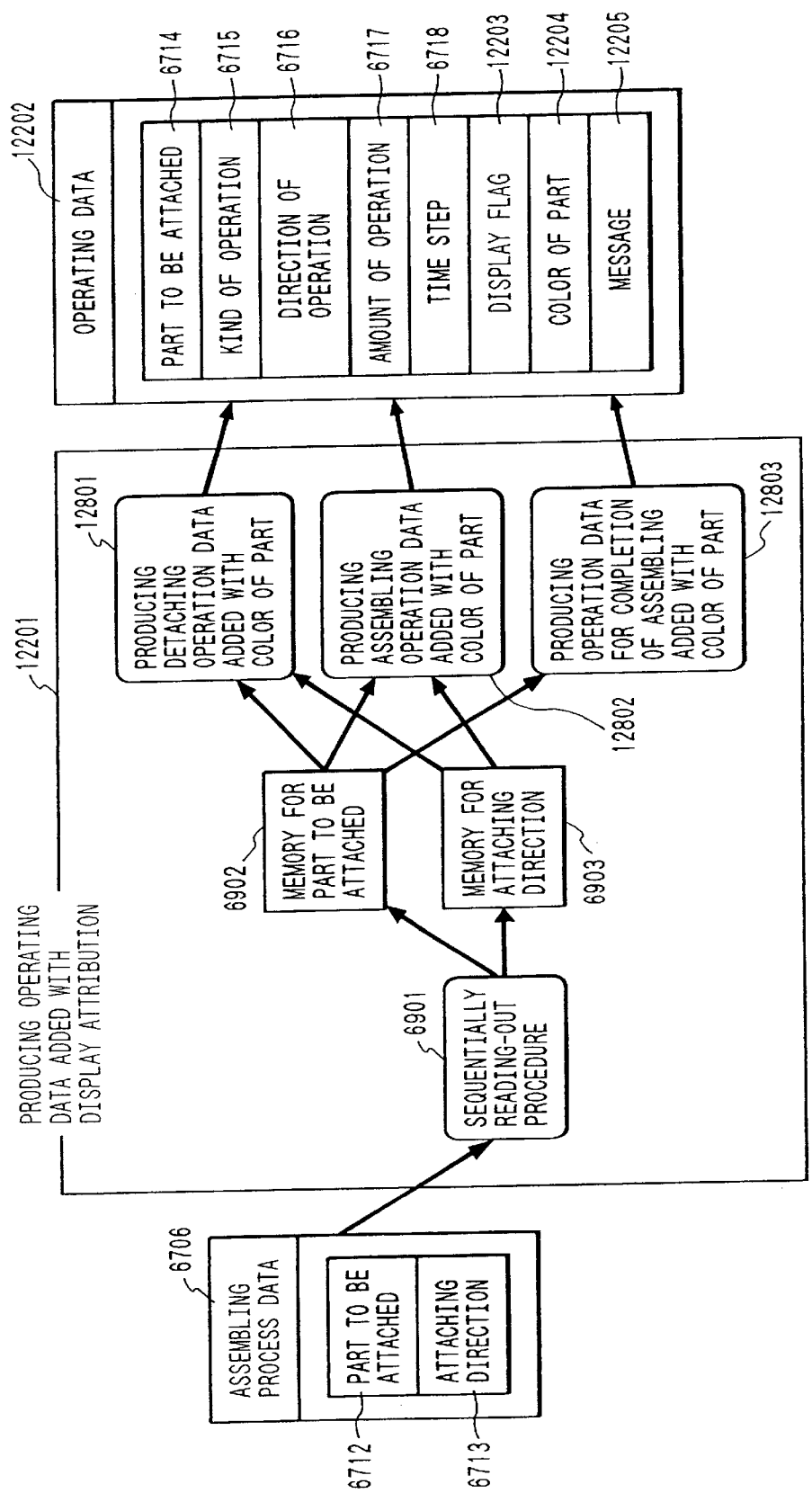

FIG. 128 is a functional diagram showing the structure of an embodiment of the program 12201 for producing operating data with a display attribution. Using this figure, description will be made of the method of setting the color of part 12204 in the operating data 12202 by the program 12201.

The program 6901 for sequentially reading out a procedure reads out the steps of an assembling procedure in the assembling procedure data 6708 one by one, and stores them in the memory area 6902 for a part to be attached and the memory area 6903 for indicating the attaching direction.

A program 12801 for producing detaching operation data including the color of a part produces detaching operating data in which the starting point is the position of an assembled state of the part to be attached and the ending point is the position proceeding in the direction opposite to the attaching direction read out from the memory area 6903. The operating data produced is stored as the operating data 12202.

A program 12802 produces assembling operating data in which the starting point is the ending point in the program 12801 and the ending point is the position of an assembled state of the part to be attached.

The operating data produced is stored as the operating data 12202. The program 12802 produces the assembling operating data in the position of the assembled state, and the operating data produced is stored as the operating data 12202.

The process will be described using an example, referring to FIG. 98 and FIG. 99. Herein, only the steps 9901 and 9902 will be described. Since the step 9901 is to set a part in the beginning, operating data is not produced.

In step 9902, the color of the part for the detaching operation data is set. Let the color of the part be "red". Next, the color of the part for the attaching operation data is set to a different color. Let the color of that part be "blue".

Figures 129, 130:
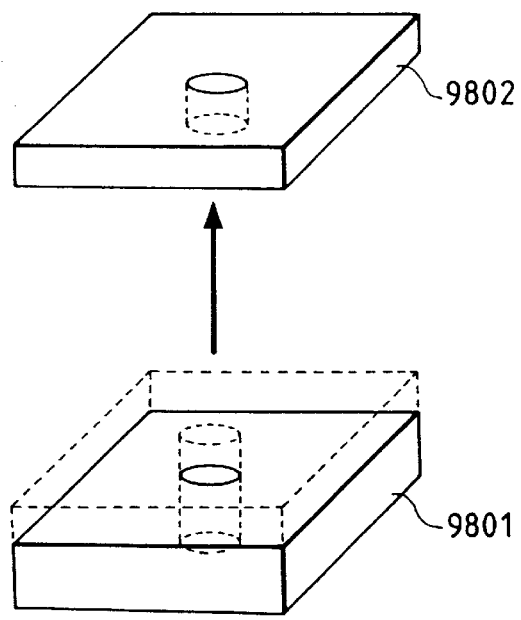

And, the color of the part for assembling completion data is set to a different color from the colors of parts for the detaching operation data and the attaching operation data. Let the color of this part be "green". The resultant operating data is shown in the rows 12901, 12902 and 12903 in FIG. 129. As shown in FIG. 129, the color of part 12904 indicates the displayed color of a part to be attached in the animation of the operation.

FIG. 130 and FIG. 131 show the course of the animation display using the operating data as input data. In FIG. 130, the part to be attached is in a detached state by executing the operating data 12901, and the part to be attached 9802 is displayed with the color "red".

Next, in FIG. 131, the color of part of the part to be attached 9802 is changed to "blue" by executing the operating data 12902, and the animation is performed to move the part in the attaching direction 9804. After the part to be attached 9802 is attached, the part is displayed with "green" by executing the operating data 12903.

FIG. 132 is a functional diagram showing the structure of an embodiment of the program 12201 for producing operating data having a display attribute. Using this figure, description will be made of the method of producing the message 12205 in the operating data 12202 using the program 12201.

The program 6901 for sequentially reading out a procedure reads out the steps of the assembling procedure in the assembling procedure data 6708 one by one, and stores them in the memory area 6902 for a part to be attached and the memory area 6903 for indicating the attaching direction.

The program 6907 produces detaching operating data in which the starting point is the position of an assembled state of the part to be attached and the ending point is the position proceeding in the direction opposite to the attaching direction read out from the memory area 6903. The operating data produced is stored as the operating data 12202.

A program 13201 produces assembling operating data in which the starting point is the ending point in the program 6907 and the ending point is the position of an assembled state of the part to be attached. The operating data produced is stored as the operating data 12202.

The process will be described using an example. FIG. 133 shows an assembled state of two parts 13301 and 13302. FIG. 134 shows the assembling procedure data. It can be understood that the part to be set at the beginning is the part 13301 and the part to be animated is the part 13302.

FIG. 135 shows the input jointing data. Firstly, since the step 13401 is to set the part at the beginning, operating data is not produced. Herein, description will be made only of the assembling operation by the program 13201.

Next, the message of the assembling operating data is set by the step 13402. The details are as follows. Firstly, the part to be attached 13302 is read out from the memory area 6902, and the part to be attached 13302 is retrieved from the jointing data 8402, and then the method of jointing "welding" is obtained.

Using the method of jointing obtained, a message for expressing the content of work is produced. In the case of this example, since the method of jointing is "welding", the message is "under welding work" and the message is set as the message 12205. The result of the operating data is shown in the row 13601 in FIG. 136.

FIG. 137 shows a course of animation display using the operating data as input data. The part to be attached 13302 moves toward the part 13301 in the animation direction 13702 and the message 13701 expressing the content of work is displayed at the same time. By producing operating data with a display attribution as described above, it is possible to identify a part being attached and to understand the content of work for such a part.

The embodiment has shown a method in which this direction of operation, the amount of operation, and the time step in the operating data are produced from the assembling procedure data, the geometrical data for a part to be attached, the jointing data, and the work data.

However, the present invention is not limited to the embodiments where the operating data is produced from one kind of data. It is needless to say that the operating data may be produced by combining plural kinds of data.

Further, the embodiment has shown a method in which the animation data produced is determined by the kind of operation, the direction of operation, the amount of operation, and the time step.

However, the present invention is not limited to a method of such kind. The present invention can be applied to a key-frame method where the positional information of each part corresponding to time is used as operating data.

According to the present invention, there is an effect to decrease man-power in producing an animation of an assembling operation since the animation of the assembling operation can be automatically produced so long as there are at least geometrical data and assembling procedure data.

Further, according to the present invention, there is an effect to make confirmation of the content of assembling work easy, since the animation of a part to be attached with respect to the attaching direction and the animation of the movement of the part to be attached itself are performed at one time by determining the movement of the part to be attached from operating data. Furthermore, according to the present invention, it is possible to animate with an amount of movement fit to the size of whole assembly by determining the amount of operation of the part to be attached from geometrical data.

Therefore, an animation of assembling a product from a huge product, such as ship, to a small and precise product, such as watch and LSI, which is easy to observe can be obtained without specifying the amount of movement.

According to the present invention, there is an effect to make confirmation of difficulty of the assembling work easy since animation can be performed with time corresponding to the content of work by calculating the time steps using the work data, the geometrical data, the attaching direction data and so on.

Further, according to the present invention, there is an effect to make confirmation of the content of the assembling work easier than in an animation displaying only movement of parts, since the sound of actual work can be produced together with animation of the parts to be attached by determining the sound of the work from the jointing data.

Further, according to the present invention, there is an effect to make confirmation of the part being attached, since the display state of the part to be attached and the color of the part to be attached can be changed in the course of animating.

Furthermore, according to the present invention, there is an effect to understand the content of the work involved in the attaching at a glance, since a message indicating the type of work can be displayed together with the animation.

What is claimed is:

1. An apparatus for producing an exploded view of an assembly, comprising:

a geometrical data memory which stores geometrical data of parts composing said assembly;

a calculating unit which displays said assembly on a display unit based on said geometrical data; and means for determining distances between the parts composing said assembly in a disassembled state in an exploded view based on assembling process data and said geometrical data, to thereby display an exploded view of said assembly on said display unit in correspondence with said distances determined by said means for determining distances.

2. An apparatus according to claim 1, wherein said distances between said parts determined by said means for determining distances is set to be the same for all distances.

3. An apparatus according to claim 1, wherein said distances between said parts determined by said means for determining distances is set to be different for at least the distance between two of said parts.

4. An apparatus according to claim 1, wherein said exploded view is a three dimensional view of said assembly.

5. A method of producing an exploded view of an assembly in a calculation unit, comprising the steps of:

processing to determine at least one bounding box of at least one of a plurality of parts included in said assembly by referring to geometric data of said parts stored in a memory unit; and based on said at least one bounding box of at least one of said parts, processing to determine output positions of said parts in said exploded view of said assembly.

6. A method according to claim 5, further comprising the steps of:

in response to an indication to said calculation unit, processing to widen a distance of said parts from each other in said output positions, or processing to shorten said distance of said parts from each other in said output positions.

7. A method according to claim 6, wherein said processing to determine output positions of said parts in said exploded view of said assembly comprises the step of:

based on said at least one bounding box of at least one of said parts, processing to determine at least one bounding box of at least one part for attaching.

8. A method according to claim 7, wherein said processing to determine output positions of said parts in said exploded view of said assembly further comprises the step of:

based on said at least one bounding box of at least one part for attaching, processing to determine an output position of said at least one part for attaching in said exploded view of said assembly.

9. A method according to claim 5, wherein said processing to determine output positions of said parts in said exploded view of said assembly comprises the step of:

based on said at least one bounding box of at least one of said parts, processing to determine at least one bounding box of at least one part for attaching.

10. A method according to claim 9, wherein said processing to determine output positions of said parts in said exploded view of said assembly further comprises the step of:

based on said at least one bounding box of at least one part for attaching, processing to determine an output position of said at least one part for attaching in said exploded view of said assembly.

11. A method according to claim 5, wherein said exploded view is a three dimensional view of said assembly.

12. A method of producing an exploded view of an assembly in a calculation unit, comprising the steps of:

processing to determine at least one bounding box of at least one of a plurality of parts by referring to geometric data which is stored in a memory unit; and processing to determine a distance between said at least one part and another part based on said at least one bounding box of said at least one part and to output an exploded view of said assembly based on said distance determined by said processing to determine a distance step.

13. A method according to claim 12, further comprising the step of:

in response to an indication to said calculation unit, processing to widen said distance or processing to shorten said distance.

14. A method according to claim 13, wherein said processing to determine a distance comprises the steps of:

based on said at least one bounding box of one of said parts, processing to determine at least one bounding box of at least one part for attaching.

15. A method according to claim 14, wherein said processing to determine a distance step further comprises the step of:

based on said at least one bounding box of at least one part for attaching, processing to determine said distance between said at least one part for attaching and a part to be attached in said exploded view of said assembly.

16. A method according to claim 12, wherein said processing to determine a distance step comprises the step of:

based on said at least one bounding box of at least one of said parts, processing to determine at least one bounding box of at least one part for attaching.

17. A method according to claim 16, wherein said processing to determine a distance step further comprises the step of:

based on said at least one bounding box of at least one part for attaching, processing to determine said distance between said at least one part for attaching and a part to be attached in said exploded view of said assembly.

18. A method according to claim 12, wherein said exploded view is a three dimensional view of said assembly.

19. An apparatus for producing an exploded view of an assembly comprising:
- a memory for storing geometric data;
- a calculation unit for obtaining said geometric data from said memory and for calculating at least one bounding box of at least one of a plurality of parts included in said assembly; and
- a determination unit for determining, based on said at least one bounding box of at least one of said parts, output positions of said parts in said exploded view of said assembly.

20. An apparatus according to claim 19, further comprising:
- a unit responsive to an indication, for widening or shortening distances between output positions of said parts in said exploded view of said assembly.

21. An apparatus according to claim 20, wherein said determination unit comprises:
- means for determining, based on said at least one bounding box of at least one of said parts, at least one bounding box of at least one part for attaching.

22. An apparatus according to claim 21, wherein said determination unit further comprises:
- means for determining, based on said at least one bounding box of at least one part for attaching, an output position of said at least one part for attaching in said exploded view of said assembly.

23. An apparatus according to claim 19, wherein said determination unit comprises:
- means for determining, based on said at least one bounding box of at least one of said parts, at least one bounding box of at least one part for attaching.

24. An apparatus according to claim 23, wherein said determination unit further comprises:
- means for determining, based on said at least one bounding box of at least one part for attaching, an output position of said at least one part for attaching in said exploded view of said assembly.

25. An apparatus according to claim 19, wherein said exploded view is a three dimensional view of said assembly.

26. An apparatus for producing an exploded view of an assembly comprising:
- a memory for storing geometric data;
- a calculation unit for obtaining said geometric data from said memory and calculating at least one bounding box of at least one of a plurality of parts included in said assembly; and
- means for determining a distance between said at least one part and another part based on said at least one bounding box of said at least one of said parts and outputting said exploded view of said assembly based on said distance determined by said means for determining a distance.

27. An apparatus according to claim 26, further comprising:
- means, responsive to an indication, for widening said distance or shortening said distance.

28. An apparatus according to claim 27, wherein said means for determining comprises:
- means for determining, based on said at least one bounding box of at least one of said parts, at least one bounding box of at least one part for attaching.

29. An apparatus according to claim 28, wherein said means for determining further comprises:
- means for determining, based on said at least one bounding box of at least one part for attaching, said distance between said at least one part for attaching and a part to be attached in said exploded view of said assembly.

30. An apparatus according to claim 26, wherein said means for determining comprises:
- means for determining, based on said at least one bounding box of at least one of said parts, at least one bounding box of at least one part for attaching.

31. An apparatus according to claim 30, wherein said means for determining further comprises:
- means for determining, based on said at least one bounding box of at least one part for attaching, said distance between said at least one part for attaching and a part to be attached in said exploded view of said assembly.

32. An apparatus according to claim 26, wherein said exploded view is a three dimensional view of said assembly.

33. A method of producing an exploded view of an assembly, comprising the steps of:
- determining distances between parts composing the assembly in a disassembled state on an exploded view based on assembling process data and geometrical data of said parts stored in a geometrical data memory; and
- displaying said exploded view of said assembly on a display unit in correspondence with said distances determined by said means for determining distances.

34. A method according to claim 33, wherein said distances between said parts determined by said determining distances step is set to be the same for all distances.

35. A method according to claim 33, wherein said distances between said parts determined by said determining distances step is set to be different for at least the distance between two of said parts.

36. An method according to claim 33, wherein said exploded view is a three dimensional view of said assembly.

37. An apparatus for producing an exploded view of an assembly comprising:
- a calculation unit for obtaining geometric data and for calculating at least one bounding box of at least one of a plurality of parts included in said assembly; and
- a determination unit for determining, based on said at least one bounding box of at least one of said parts, output positions of said parts in said exploded view of said assembly.

38. An apparatus according to claim 37, further comprising:
- a unit responsive to an indication, for widening or shortening distances between output positions of said parts in said exploded view of said assembly.

39. An apparatus according to claim 38, wherein said determination unit comprises:
- means for determining, based on said at least one bounding box of at least one of said parts, at least one bounding box of at least one part for attaching.

40. An apparatus according to claim 39, wherein said determination unit further comprises:
- means for determining, based on said at least one bounding box of at least one part for attaching, an output position of said at least one part for attaching in said exploded view of said assembly.

41. An apparatus according to claim 37, wherein said determination unit comprises:
- means for determining, based on said at least one bounding box of at least one of said parts, at least one bounding box of at least one part for attaching.

42. An apparatus according to claim 41, wherein said determination unit further comprises:
- means for determining, based on said at least one bounding box of at least one part for attaching, an output position of said at least one part for attaching in said exploded view of said assembly.

43. An apparatus according to claim 37, wherein said exploded view is a three dimensional view of said assembly.

44. An apparatus for producing an exploded view of an assembly comprising:

a calculation unit for obtaining geometric data and calculating at least one bounding box of at least one of a plurality of parts included in said assembly; and means for determining a distance between said at least one part and another part based on said at least one bounding box of said at least one of said parts and outputting said exploded view of said assembly based on said distance determined by said means for determining a distance.

45. An apparatus according to claim 44, further comprising:

means, responsive to an indication, for widening said distance or shortening said distance.

46. An apparatus according to claim 45, wherein said means for determining comprises:

means for determining, based on said at least one bounding box of at least one of said parts, at least one bounding box of at least one part for attaching.

47. An apparatus according to claim 46, wherein said means for determining further comprises:

means for determining, based on said at least one bounding box of at least one part for attaching, said distance between said at least one part for attaching and a part to be attached in said exploded view of said assembly.

48. An apparatus according to claim 44, wherein said means for determining comprises:

means for determining, based on said at least one bounding box of at least one of said parts, at least one bounding box of at least one part for attaching.

49. An apparatus according to claim 48, wherein said means for determining further comprises:

means for determining, based on said at least one bounding box of at least one part for attaching, said distance between said at least one part for attaching and a part to be attached in said exploded view of said assembly.

50. An apparatus according to claim 44, wherein said exploded view is a three dimensional view of said assembly.

* * * * *